(12) United States Patent
Francini et al.

(10) Patent No.: US 11,336,582 B1
(45) Date of Patent: May 17, 2022

(54) PACKET SCHEDULING

(71) Applicant: NOKIA SOLUTIONS AND NETWORKS OY, Espoo (FI)

(72) Inventors: Andrea Francini, Providence, NJ (US); Larry Hsiao Chang, Madison, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/135,845

(22) Filed: Dec. 28, 2020

(51) Int. Cl.
*H04L 47/10* (2022.01)
*H04L 47/52* (2022.01)
*H04L 47/60* (2022.01)
*H04L 47/28* (2022.01)
*H04L 47/70* (2022.01)

(52) U.S. Cl.
CPC ............ *H04L 47/527* (2013.01); *H04L 47/28* (2013.01); *H04L 47/528* (2013.01); *H04L 47/60* (2013.01); *H04L 47/826* (2013.01)

(58) Field of Classification Search
CPC ..... H04L 47/527; H04L 47/28; H04L 47/528; H04L 47/60; H04L 47/826
See application file for complete search history.

(56) References Cited

U.S. PATENT DOCUMENTS

| 6,598,792 | B1 * | 7/2003 | Michot | B67D 7/145 |
| | | | | 235/382 |
| 9,037,631 | B2 * | 5/2015 | Dietrich | H04W 12/033 |
| | | | | 709/201 |
| 11,218,383 | B2 * | 1/2022 | Albrecht | H04L 45/745 |
| 2014/0229519 | A1 * | 8/2014 | Dietrich | H04W 74/0858 |
| | | | | 709/201 |
| 2016/0182394 | A1 * | 6/2016 | Kiessling | H04L 29/06884 |
| | | | | 370/230 |
| 2021/0320851 | A1 * | 10/2021 | Albrecht | H04L 45/745 |

OTHER PUBLICATIONS

IEEE, "IEEE Standard for Local and Metropolitan Area Networks, Bridges and Bridged Networks," IEEE Standard 802.1Q-2018, IEEE Computer Society, 2018, 1993 pages.
(Continued)

*Primary Examiner* — Abdelnabi O Musa
(74) *Attorney, Agent, or Firm* — Tong, Rea, Bentley & Kim, LLC

(57) ABSTRACT

Various example embodiments for supporting packet scheduling in packet networks are presented. Various example embodiments for supporting packet scheduling in packet networks may be configured to support scheduling-as-a-service. Various example embodiments for supporting packet scheduling in packet networks based on scheduling-as-a-service may be configured to support a virtualized packet scheduler which may be provided as a service over a general-purpose hardware platform, may be instantiated in customer hardware, or the like, as well as various combinations thereof. Various example embodiments for supporting packet scheduling in packet networks may be configured to support scheduling of packets of packet queues based on association of transmission credits with timeslots of a periodic service sequence used to provide service to the packet queues.

26 Claims, 23 Drawing Sheets

(56) References Cited

OTHER PUBLICATIONS

Wroclawski, J., "The Use of RSVP with IETF Integrated Services," RFC 2210, Network Working Group, Sep. 1997, 33 pages.
Blake, S. et al., "An Architecture for Differentiated Services," Network Working Group, RFC 2475, Dec. 1998, 36 pages.
Rexford, J. L., et al., "Hardware-Efficient Fair Queueing Architectures for High-Speed Networks," Proceedings of IEEE Infocom 1996, San Francisco, CA, Mar. 1996, 9 pages.
Stephens, D.C., et al., "Implementing Scheduling Algorithms in High-Speed Networks," IEEE Journal on Selected Areas in Communications, vol. 17, No. 6, Jun. 1999, 30 pages.
Francini A., et al., "Minimum-Latency Dual-Leaky-Bucket Shapers for Packet Multiplexers: Theory and Implementation," Proceedings of IEEE/ACM IWQoS 2000, Jun. 2000, 10 pages.
Parekh, A.K., et al., "A Generalized Processor Sharing Approach to Flow Control in Integrated Services Networks—The Single Node Case," Proceedings of IEEE Infocom 1992, Florence, Italy, May 1992.
Stiliadis, D., et al., "Rate-Proportional Servers: A Design Methodology for Fair Queuing Algorithms," IEEE/ACM Transactions on Networking, vol. 6, Issue 2, Apr. 1998, 11 pages.
Goyal, P., et al., "Fair Airport Scheduling Algorithms," Proceedings of ACM NOSSDAV 1997, St. Louis, Missouri, USA, May 1997, 16 pages.
Chiussi, F. M., et al., "A Distributed Scheduling Architecture for Scalable Packet Switches," IEEE Journal on Selected Areas in Communications, vol. 18, Issue 12, Dec. 2000, 19 pages.
Stiliadis, D., et al., "Design and Analysis of Frame-Based Fair Queuing: A New Traffic Scheduling Algorithm for Packet Switched Networks," Proceedings of ACM SIGMETRICS 1996, vol. 24, Issue 1, Philadelphia, PA, May 1996, 12 pages.
Stiliadis, D., et al., "Efficient Fair Queueing Algorithms for Packet-Switched Networks," IEEE/ACM Transactions on Networking, vol. 6, Issue 2, Apr. 1998, 11 pages.
Zhang, L., "VirtualClock: A New Traffic Control Algorithm for Packet-Switched Networks," ACM Transactions on Computer Systems, vol. 9, Issue 2, Apr. 1991, 11 pages.
Chiussi, F. M., et al., "Minimum-Delay Self-Clocked Fair Queueing for Packet-Switched Networks," Proceedings of IEEE INFOCOM 1998, San Francisco, CA, Apr. 1998, 10 pages.
Stiliadis, D., et al., "A General Methodology for Designing Efficient Traffic Scheduling and Shaping Algorithms," Proceedings of IEEE INFOCOM 1997, Kobe, Japan, Apr. 1997, 10 pages.
NSNAM, "Ns-3 Network Simulator," printed from <https://www.nsnam.org/> on Jan. 11, 2022, 5 pages.
Karol, M., et al., "Input Versus Output Queuing on a Space-Division Packet Switch," IEEE Transactions on Communications, vol. 35, No. 12, Dec. 1987, 10 pages.
The Linux Foundation Projects, "Data Plane Development Kit," printed from https://www.dpdk.org/ on Jan. 11, 2022, 5 pages.
Heinanen, J., et al., "A Single Rate Three Color Marker," IETF RFC 2697, Sep. 1999, 6 pages.
Heinanen, J., et al., "A Two-Rate Three-Color Marker," IETF RFC 2698, Sep. 1999, 5 pages.
Bennett, J. C. R., et al., "Hierarchical Packet Fair Queuing Algorithms," IEEE ACM Transactions on Networking vol. 5, Issue 5, Oct. 1997, 14 pages.
Francini, A., et al, "Enhanced Weighted Round Robin Schedulers for Accurate Bandwidth Distribution in Packet Networks," Computer Networks, vol. 37, Issue 5, Nov. 2001, 39 pages.

\* cited by examiner

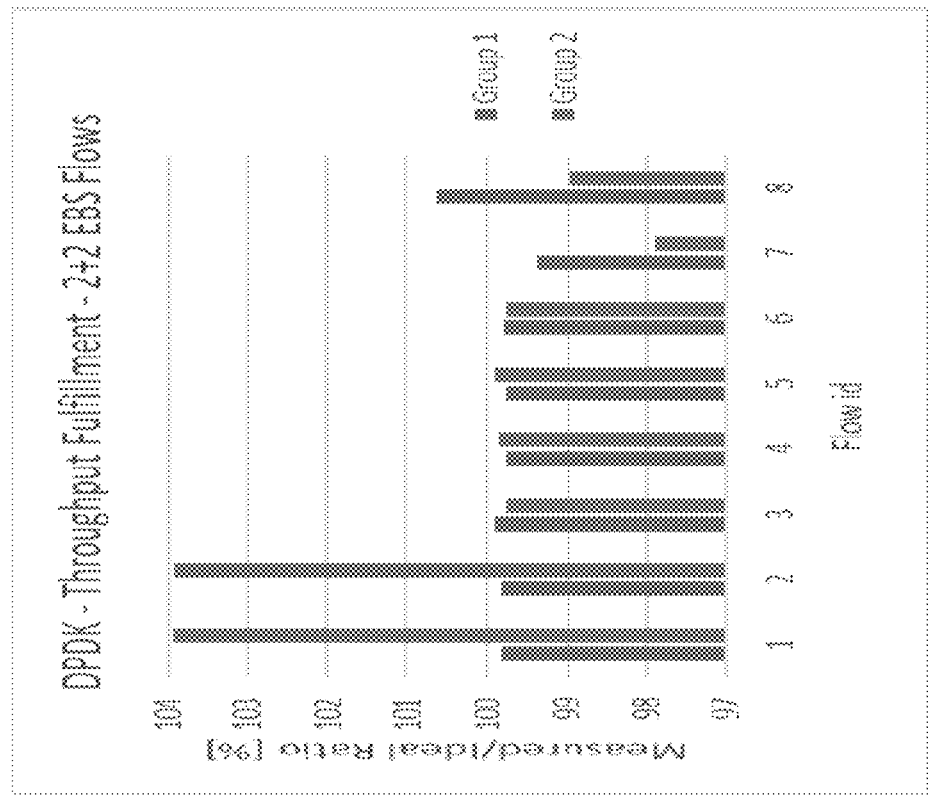
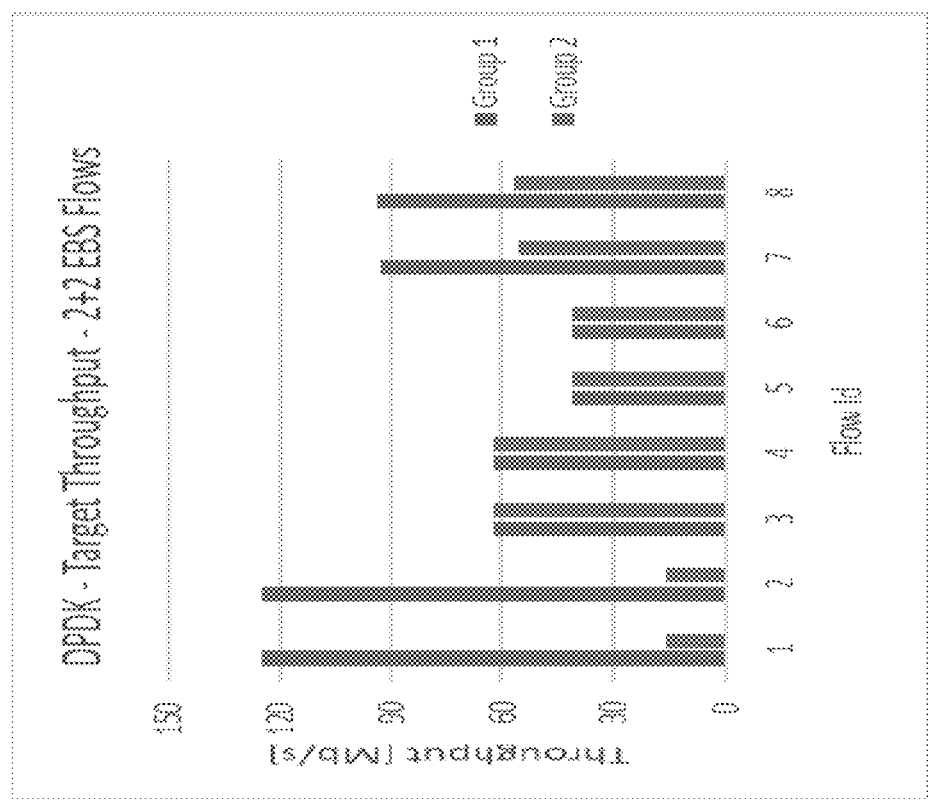
FIG. 22

PACKET SCHEDULING

TECHNICAL FIELD

Various example embodiments relate generally to communication systems, more particularly but not exclusively, to packet scheduling in packet networks.

BACKGROUND

Packet networks may support communication of packets in various ways. For example, packet networks may support communication of packets based on various packet queuing techniques, such as based on use of various packet classification schemes, various types of packet queues, various types of packet schedulers, and the like.

SUMMARY

In at least some example embodiments, an apparatus includes at least one processor and at least one memory including a set of instructions, wherein the set of instructions is configured to, when executed by the at least one processor, cause the apparatus to support, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots. In at least some example embodiments, each of the timeslots has associated therewith a respective queuing element identifier indicative of the one of the queuing elements with which the timeslot is associated and a respective transmission credit counter configured to track the respective set of transmission credits for the respective timeslots. In at least some example embodiments, the transmission credits associated with the respective timeslots are indicative as to respective amounts of transmission permitted from the respective ones of the queuing elements during the respective timeslots. In at least some example embodiments, the packet scheduler is configured to, during a first cycle of the periodic service sequence based on a determination that data from a first one of the queuing elements associated with a first one of the timeslots is transmitted during a second one of the timeslots, increase the transmission credits for the second one of the timeslots. In at least some example embodiments, the packet scheduler is configured to, during a second cycle of the periodic service sequence based on a determination that the set of transmission credits for the first one of the timeslots is zero during the first one of the timeslots, schedule transmission of data from a second one of the queuing elements associated with the second one of the timeslots during the first one of the timeslots. In at least some example embodiments, the first cycle of the periodic service sequence and the second cycle of the periodic service sequence are adjacent cycles of the period service sequence. In at least some example embodiments, the first cycle of the periodic service sequence and the second cycle of the periodic service sequence are separated by at least one additional cycle of the periodic service sequence. In at least some example embodiments, the packet scheduler is configured to, based on a determination that data from a first one of queuing elements associated with a first one of the timeslots is transmitted during a second one of the timeslots, schedule transmission of data from a second one of the queuing elements associated with the second one of the timeslots during the first one of the timeslots. In at least some example embodiments, the transmission of data from the second one of the queuing elements associated with the second one of the timeslots during the first one of the timeslots is based on an additional transmission credit associated with the second one of the timeslots based on the determination that data from the first one of queuing elements associated with the first one of the timeslots is transmitted during the second one of the timeslots. In at least some example embodiments, the additional transmission credit associated with the second one of the timeslots is based on a length of time during which the data from the first one of queuing elements associated with the first one of the timeslots is transmitted during the second one of the timeslots. In at least some example embodiments, the set of instructions is configured to, when executed by the at least one processor, cause the apparatus to at least perform, by the packet scheduler during a first cycle of the periodic service sequence, transmission of data from a first one of the queuing elements associated with a first one of the timeslots using the first one of the timeslots associated with the first one of the queuing elements and at least a portion of a second one of the timeslots associated with a second one of the queuing elements and associate, by the packet scheduler with the second one of the timeslots based on the transmission of the data using the at least a portion of the second one of the timeslots during the first cycle of the periodic service sequence, an additional transmission credit configured to support transmission of data of the second one of the queuing elements using the first one of the timeslots during a second cycle of the periodic service sequence. In at least some example embodiments, the set of instructions is configured to, when executed by the at least one processor, cause the apparatus to at least determine, by the packet scheduler based on the additional transmission credit, scheduling of transmission of at least a portion of at least one packet of the second one of the queuing elements using the first one of the timeslots during the second cycle of the periodic service sequence. In at least some example embodiments, the timeslots of the periodic service sequence have a fixed duration. In at least some example embodiments, a number of timeslots in the periodic service sequence is based on a ratio between a link capacity of the link and a minimum throughput guaranteed by the packet scheduler. In at least some example embodiments, a length of the periodic service sequence is calculated based on running of a Shaped Virtual Clock (Sh-VC) algorithm for a time that is based on a time duration of a period of the periodic service sequence. In at least some example embodiments, the periodic service sequence is updated based on at least one quality-of-service guarantee associated with a new flow provisioned on the link. In at least some example embodiments, the set of instructions is configured to, when executed by the at least one processor, cause the apparatus to at least identify, by the packet scheduler, a given timeslot in the periodic service sequence that corresponds to a current time, increase, by the packet scheduler, a credit counter for the given timeslot in the periodic service sequence by an amount based on a time since a previous credit update for the given timeslot in the periodic service sequence, determine, by the packet scheduler for the given timeslot in the periodic service sequence based on the credit counter for the given timeslot in the periodic service sequence and a credit counter of a previous timeslot in the periodic service sequence, whether the given timeslot in the periodic service sequence is eligible for service, and determine, by the packet scheduler based on a determination that the given timeslot in the periodic service sequence is eligible for service, whether the one of the queuing elements associated with the given timeslot in the periodic service sequence is empty. In at least some example embodiments, the set of instructions is configured to, when executed by the at least one processor, cause the apparatus to at least designate, based on a determination that the given timeslot in the periodic service sequence is not eligible for service or that the one of the queuing elements associated with the given timeslot in the periodic service sequence is empty, the next timeslot adjacent to the given timeslot in the periodic service sequence as the given timeslot. In at least some example embodiments, the set of instructions is configured to, when executed by the at least one processor, cause the apparatus to at least pass, by the packet scheduler to a second packet scheduler based on a determination that the given timeslot in the periodic service sequence is not eligible for service or that the one of the queuing elements associated with the given timeslot in the periodic service sequence is empty, control of a scheduling decision. In at least some example embodiments, the set of instructions is configured to, when executed by the at least one processor, cause the apparatus to at least decrease, by the packet scheduler based on a determination that the one of the queuing elements associated with the given timeslot in the periodic service sequence is not empty, the credit counter for the given timeslot in the periodic service sequence by an amount that depends on the time that it will take to transmit the packet multiplied by the number of timeslots in the periodic service sequence. In at least some example embodiments, the packet scheduler is a guaranteed bandwidth scheduler configured to cooperate with an excess bandwidth scheduler. In at least some example embodiments, the set of instructions is configured to, when executed by the at least one processor, cause the apparatus to at least pass, by the packet scheduler to a second packet scheduler, control of a scheduling decision. In at least some example embodiments, the second packet scheduler is a hierarchical packet scheduler. In at least some example embodiments, the set of instructions is configured to, when executed by the at least one processor, cause the apparatus to at least receive, via an application programming interface, an indication of a hierarchical configuration for the second packet scheduler and configure a scheduling hierarchy of the second packet scheduler based on the indication of the hierarchical configuration for the second packet scheduler.

In at least some example embodiments, a non-transitory computer-readable medium stores a set of instructions configured to cause an apparatus to support, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots. In at least some example embodiments, each of the timeslots has associated therewith a respective queuing element identifier indicative of the one of the queuing elements with which the timeslot is associated and a respective transmission credit counter configured to track the respective set of transmission credits for the respective timeslots. In at least some example embodiments, the transmission credits associated with the respective timeslots are indicative as to respective amounts of transmission permitted from the respective ones of the queuing elements during the respective timeslots. In at least some example embodiments, the packet scheduler is configured to, during a first cycle of the periodic service sequence based on a determination that data from a first one of the queuing elements associated with a first one of the timeslots is transmitted during a second one of the timeslots, increase the transmission credits for the second one of the timeslots. In at least some example embodiments, the packet scheduler is configured to, during a second cycle of the periodic service sequence based on a determination that the set of transmission credits for the first one of the timeslots is zero during the first one of the timeslots, schedule transmission of data from a second one of the queuing elements associated with the second one of the timeslots during the first one of the timeslots. In at least some example embodiments, the first cycle of the periodic service sequence and the second cycle of the periodic service sequence are adjacent cycles of the period service sequence. In at least some example embodiments, the first cycle of the periodic service sequence and the second cycle of the periodic service sequence are separated by at least one additional cycle of the periodic service sequence. In at least some example embodiments, the packet scheduler is configured to, based on a determination that data from a first one of queuing elements associated with a first one of the timeslots is transmitted during a second one of the timeslots, schedule transmission of data from a second one of the queuing elements associated with the second one of the timeslots during the first one of the timeslots. In at least some example embodiments, the transmission of data from the second one of the queuing elements associated with the second one of the timeslots during the first one of the timeslots is based on an additional transmission credit associated with the second one of the timeslots based on the determination that data from the first one of queuing elements associated with the first one of the timeslots is transmitted during the second one of the timeslots. In at least some example embodiments, the additional transmission credit associated with the second one of the timeslots is based on a length of time during which the data from the first one of queuing elements associated with the first one of the timeslots is transmitted during the second one of the timeslots. In at least some example embodiments, the set of instructions is configured to cause the apparatus to at least perform, by the packet scheduler during a first cycle of the periodic service sequence, transmission of data from a first one of the queuing elements associated with a first one of the timeslots using the first one of the timeslots associated with the first one of the queuing elements and at least a portion of a second one of the timeslots associated with a second one of the queuing elements and associate, by the packet scheduler with the second one of the timeslots based on the transmission of the data using the at least a portion of the second one of the timeslots during the first cycle of the periodic service sequence, an additional transmission credit configured to support transmission of data of the second one of the queuing elements using the first one of the timeslots during a second cycle of the periodic service sequence. In at least some example embodiments, the set of instructions is configured to cause the apparatus to at least determine, by the packet scheduler based on the additional transmission credit, scheduling of transmission of at least a portion of at least one packet of the second one of the queuing elements using the first one of the timeslots during the second cycle of the periodic service sequence. In at least some example embodiments, the timeslots of the periodic service sequence have a fixed duration. In at least some example embodiments, a number of timeslots in the periodic service sequence is based on a ratio between a link capacity of the link and a minimum throughput guaranteed by the packet scheduler. In at least some example embodiments, a length of the periodic service sequence is calculated based on running of a Shaped Virtual Clock (Sh-VC) algorithm for a time that is based on a time duration of a period of the periodic service sequence. In at least some example embodiments, the periodic service sequence is updated based on at least one quality-of-service guarantee associated with a new flow provisioned on the link. In at least some example embodiments, the set of instructions is configured to cause the apparatus to at least identify, by the packet scheduler, a given timeslot in the periodic service sequence that corresponds to a current time, increase, by the packet scheduler, a credit counter for the given timeslot in the periodic service sequence by an amount based on a time since a previous credit update for the given timeslot in the periodic service sequence, determine, by the packet scheduler for the given timeslot in the periodic service sequence based on the credit counter for the given timeslot in the periodic service sequence and a credit counter of a previous timeslot in the periodic service sequence, whether the given timeslot in the periodic service sequence is eligible for service, and determine, by the packet scheduler based on a determination that the given timeslot in the periodic service sequence is eligible for service, whether the one of the queuing elements associated with the given timeslot in the periodic service sequence is empty. In at least some example embodiments, the set of instructions is configured to cause the apparatus to at least designate, based on a determination that the given timeslot in the periodic service sequence is not eligible for service or that the one of the queuing elements associated with the given timeslot in the periodic service sequence is empty, the next timeslot adjacent to the given timeslot in the periodic service sequence as the given timeslot. In at least some example embodiments, the set of instructions is configured to cause the apparatus to at least pass, by the packet scheduler to a second packet scheduler based on a determination that the given timeslot in the periodic service sequence is not eligible for service or that the one of the queuing elements associated with the given timeslot in the periodic service sequence is empty, control of a scheduling decision. In at least some example embodiments, the set of instructions is configured to cause the apparatus to at least decrease, by the packet scheduler based on a determination that the one of the queuing elements associated with the given timeslot in the periodic service sequence is not empty, the credit counter for the given timeslot in the periodic service sequence by an amount that depends on the time that it will take to transmit the packet multiplied by the number of timeslots in the periodic service sequence. In at least some example embodiments, the packet scheduler is a guaranteed bandwidth scheduler configured to cooperate with an excess bandwidth scheduler. In at least some example embodiments, the set of instructions is configured to cause the apparatus to at least pass, by the packet scheduler to a second packet scheduler, control of a scheduling decision.

In at least some example embodiments, the second packet scheduler is a hierarchical packet scheduler. In at least some example embodiments, the set of instructions is configured to cause the apparatus to at least receive, via an application programming interface, an indication of a hierarchical configuration for the second packet scheduler and configure a scheduling hierarchy of the second packet scheduler based on the indication of the hierarchical configuration for the second packet scheduler.

In at least some example embodiments, a method includes supporting, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots. In at least some example embodiments, each of the timeslots has associated therewith a respective queuing element identifier indicative of the one of the queuing elements with which the timeslot is associated and a respective transmission credit counter configured to track the respective set of transmission credits for the respective timeslots. In at least some example embodiments, the transmission credits associated with the respective timeslots are indicative as to respective amounts of transmission permitted from the respective ones of the queuing elements during the respective timeslots. In at least some example embodiments, the packet scheduler is configured to, during a first cycle of the periodic service sequence based on a determination that data from a first one of the queuing elements associated with a first one of the timeslots is transmitted during a second one of the timeslots, increase the transmission credits for the second one of the timeslots. In at least some example embodiments, the packet scheduler is configured to, during a second cycle of the periodic service sequence based on a determination that the set of transmission credits for the first one of the timeslots is zero during the first one of the timeslots, schedule transmission of data from a second one of the queuing elements associated with the second one of the timeslots during the first one of the timeslots. In at least some example embodiments, the first cycle of the periodic service sequence and the second cycle of the periodic service sequence are adjacent cycles of the period service sequence. In at least some example embodiments, the first cycle of the periodic service sequence and the second cycle of the periodic service sequence are separated by at least one additional cycle of the periodic service sequence. In at least some example embodiments, the packet scheduler is configured to, based on a determination that data from a first one of queuing elements associated with a first one of the timeslots is transmitted during a second one of the timeslots, schedule transmission of data from a second one of the queuing elements associated with the second one of the timeslots during the first one of the timeslots. In at least some example embodiments, the transmission of data from the second one of the queuing elements associated with the second one of the timeslots during the first one of the timeslots is based on an additional transmission credit associated with the second one of the timeslots based on the determination that data from the first one of queuing elements associated with the first one of the timeslots is transmitted during the second one of the timeslots. In at least some example embodiments, the additional transmission credit associated with the second one of the timeslots is based on a length of time during which the data from the first one of queuing elements associated with the first one of the timeslots is transmitted during the second one of the timeslots. In at least some example embodiments, the method includes performing, by the packet scheduler during a first cycle of the periodic service sequence, transmission of data from a first one of the queuing elements associated with a first one of the timeslots using the first one of the timeslots associated with the first one of the queuing elements and at least a portion of a second one of the timeslots associated with a second one of the queuing elements and associating, by the packet scheduler with the second one of the timeslots based on the transmission of the data using the at least a portion of the second one of the timeslots during the first cycle of the periodic service sequence, an additional transmission credit configured to support transmission of data of the second one of the queuing elements using the first one of the timeslots during a second cycle of the periodic service sequence. In at least some example embodiments, the method includes determining, by the packet scheduler based on the additional transmission credit, scheduling of transmission of at least a portion of at least one packet of the second one of the queuing elements using the first one of the timeslots during the second cycle of the periodic service sequence. In at least some example embodiments, the timeslots of the periodic service sequence have a fixed duration. In at least some example embodiments, a number of timeslots in the periodic service sequence is based on a ratio between a link capacity of the link and a minimum throughput guaranteed by the packet scheduler. In at least some example embodiments, a length of the periodic service sequence is calculated based on running of a Shaped Virtual Clock (Sh-VC) algorithm for a time that is based on a time duration of a period of the periodic service sequence. In at least some example embodiments, the periodic service sequence is updated based on at least one quality-of-service guarantee associated with a new flow provisioned on the link. In at least some example embodiments, the method includes identifying, by the packet scheduler, a given timeslot in the periodic service sequence that corresponds to a current time, increasing, by the packet scheduler, a credit counter for the given timeslot in the periodic service sequence by an amount based on a time since a previous credit update for the given timeslot in the periodic service sequence, determining, by the packet scheduler for the given timeslot in the periodic service sequence based on the credit counter for the given timeslot in the periodic service sequence and a credit counter of a previous timeslot in the periodic service sequence, whether the given timeslot in the periodic service sequence is eligible for service, and determining, by the packet scheduler based on a determination that the given timeslot in the periodic service sequence is eligible for service, whether the one of the queuing elements associated with the given timeslot in the periodic service sequence is empty. In at least some example embodiments, the method includes designating, based on a determination that the given timeslot in the periodic service sequence is not eligible for service or that the one of the queuing elements associated with the given timeslot in the periodic service sequence is empty, the next timeslot adjacent to the given timeslot in the periodic service sequence as the given timeslot. In at least some example embodiments, the method includes passing, by the packet scheduler to a second packet scheduler based on a determination that the given timeslot in the periodic service sequence is not eligible for service or that the one of the queuing elements associated with the given timeslot in the periodic service sequence is empty, control of a scheduling decision. In at least some example embodiments, the method includes decreasing, by the packet scheduler based on a determination that the one of the queuing elements associated with the given timeslot in the periodic service sequence is not empty, the credit counter for the given timeslot in the periodic service sequence by an amount that depends on the time that it will take to transmit the packet multiplied by the number of timeslots in the periodic service sequence. In at least some example embodiments, the packet scheduler is a guaranteed bandwidth scheduler configured to cooperate with an excess bandwidth scheduler. In at least some example embodiments, the method includes passing, by the packet scheduler to a second packet scheduler, control of a scheduling decision. In at least some example embodiments, the second packet scheduler is a hierarchical packet scheduler. In at least some example embodiments, the method includes receiving, via an application programming interface, an indication of a hierarchical configuration for the second packet scheduler and configuring a scheduling hierarchy of the second packet scheduler based on the indication of the hierarchical configuration for the second packet scheduler.

In at least some example embodiments, an apparatus includes means for supporting, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots. In at least some example embodiments, each of the timeslots has associated therewith a respective queuing element identifier indicative of the one of the queuing elements with which the timeslot is associated and a respective transmission credit counter configured to track the respective set of transmission credits for the respective timeslots. In at least some example embodiments, the transmission credits associated with the respective timeslots are indicative as to respective amounts of transmission permitted from the respective ones of the queuing elements during the respective timeslots. In at least some example embodiments, the packet scheduler is configured to, during a first cycle of the periodic service sequence based on a determination that data from a first one of the queuing elements associated with a first one of the timeslots is transmitted during a second one of the timeslots, increase the transmission credits for the second one of the timeslots. In at least some example embodiments, the packet scheduler is configured to, during a second cycle of the periodic service sequence based on a determination that the set of transmission credits for the first one of the timeslots is zero during the first one of the timeslots, schedule transmission of data from a second one of the queuing elements associated with the second one of the timeslots during the first one of the timeslots. In at least some example embodiments, the first cycle of the periodic service sequence and the second cycle of the periodic service sequence are adjacent cycles of the period service sequence. In at least some example embodiments, the first cycle of the periodic service sequence and the second cycle of the periodic service sequence are separated by at least one additional cycle of the periodic service sequence. In at least some example embodiments, the packet scheduler is configured to, based on a determination that data from a first one of queuing elements associated with a first one of the timeslots is transmitted during a second one of the timeslots, schedule transmission of data from a second one of the queuing elements associated with the second one of the timeslots during the first one of the timeslots. In at least some example embodiments, the transmission of data from the second one of the queuing elements associated with the second one of the timeslots during the first one of the timeslots is based on an additional transmission credit associated with the second one of the timeslots based on the determination that data from the first one of queuing elements associated with the first one of the timeslots is transmitted during the second one of the timeslots. In at least some example embodiments, the additional transmission credit associated with the second one of the timeslots is based on a length of time during which the data from the first one of queuing elements associated with the first one of the timeslots is transmitted during the second one of the timeslots. In at least some example embodiments, the apparatus includes means for performing, by the packet scheduler during a first cycle of the periodic service sequence, transmission of data from a first one of the queuing elements associated with a first one of the timeslots using the first one of the timeslots associated with the first one of the queuing elements and at least a portion of a second one of the timeslots associated with a second one of the queuing elements and means for associating, by the packet scheduler with the second one of the timeslots based on the transmission of the data using the at least a portion of the second one of the timeslots during the first cycle of the periodic service sequence, an additional transmission credit configured to support transmission of data of the second one of the queuing elements using the first one of the timeslots during a second cycle of the periodic service sequence. In at least some example embodiments, the apparatus includes means for determining, by the packet scheduler based on the additional transmission credit, scheduling of transmission of at least a portion of at least one packet of the second one of the queuing elements using the first one of the timeslots during the second cycle of the periodic service sequence. In at least some example embodiments, the timeslots of the periodic service sequence have a fixed duration. In at least some example embodiments, a number of timeslots in the periodic service sequence is based on a ratio between a link capacity of the link and a minimum throughput guaranteed by the packet scheduler. In at least some example embodiments, a length of the periodic service sequence is calculated based on running of a Shaped Virtual Clock (Sh-VC) algorithm for a time that is based on a time duration of a period of the periodic service sequence. In at least some example embodiments, the periodic service sequence is updated based on at least one quality-of-service guarantee associated with a new flow provisioned on the link. In at least some example embodiments, the apparatus includes means for identifying, by the packet scheduler, a given timeslot in the periodic service sequence that corresponds to a current time, means for increasing, by the packet scheduler, a credit counter for the given timeslot in the periodic service sequence by an amount based on a time since a previous credit update for the given timeslot in the periodic service sequence, means for determining, by the packet scheduler for the given timeslot in the periodic service sequence based on the credit counter for the given timeslot in the periodic service sequence and a credit counter of a previous timeslot in the periodic service sequence, whether the given timeslot in the periodic service sequence is eligible for service, and means for determining, by the packet scheduler based on a determination that the given timeslot in the periodic service sequence is eligible for service, whether the one of the queuing elements associated with the given timeslot in the periodic service sequence is empty. In at least some example embodiments, the apparatus includes means for designating, based on a determination that the given timeslot in the periodic service sequence is not eligible for service or that the one of the queuing elements associated with the given timeslot in the periodic service sequence is empty, the next timeslot adjacent to the given timeslot in the periodic service sequence as the given timeslot. In at least some example embodiments, the apparatus includes means for passing, by the packet scheduler to a second packet scheduler based on a determination that the given timeslot in the periodic service sequence is not eligible for service or that the one of the queuing elements associated with the given timeslot in the periodic service sequence is empty, control of a scheduling decision. In at least some example embodiments, the apparatus includes means for decreasing, by the packet scheduler based on a determination that the one of the queuing elements associated with the given timeslot in the periodic service sequence is not empty, the credit counter for the given timeslot in the periodic service sequence by an amount that depends on the time that it will take to transmit the packet multiplied by the number of timeslots in the periodic service sequence. In at least some example embodiments, the packet scheduler is a guaranteed bandwidth scheduler configured to cooperate with an excess bandwidth scheduler. In at least some example embodiments, the apparatus includes means for passing, by the packet scheduler to a second packet scheduler, control of a scheduling decision. In at least some example embodiments, the second packet scheduler is a hierarchical packet scheduler. In at least some example embodiments, the apparatus includes means for receiving, via an application programming interface, an indication of a hierarchical configuration for the second packet scheduler and means for configuring a scheduling hierarchy of the second packet scheduler based on the indication of the hierarchical configuration for the second packet scheduler.

In at least some example embodiments, an apparatus includes at least one processor and at least one memory including a set of instructions, wherein the set of instructions is configured to, when executed by the at least one processor, cause the apparatus to support, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element, determine, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence, and associate, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence. In at least some example embodiments, a non-transitory computer-readable medium stores a set of instructions configured to cause an apparatus to support, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element, determine, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence, and associate, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence. In at least some example embodiments, a method includes supporting, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element, determining, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence, and associating, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence. In at least some example embodiments, an apparatus includes means for supporting, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element, means for determining, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence, and means for associating, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence.

BRIEF DESCRIPTION OF THE DRAWINGS

The teachings herein can be readily understood by considering the following detailed description in conjunction with the accompanying drawings, in which:

FIG. 22 depicts the throughput measured in a DPDK realization of the simulation experiment of FIG. 20.

DETAILED DESCRIPTION

Various example embodiments for supporting packet scheduling in packet networks are presented. Various example embodiments for supporting packet scheduling in packet networks may be configured to support scheduling-as-a-service. Various example embodiments for supporting packet scheduling in packet networks based on scheduling-as-a-service may be configured to support a virtualized packet scheduler which may be provided as a service over a general-purpose hardware platform, may be instantiated in custom hardware, or the like, as well as various combinations thereof. Various example embodiments for supporting packet scheduling in packet networks may be configured to support scheduling of packets of packet queues based on association of transmission credits with timeslots of a periodic service sequence used to provide service to the packet queues. It will be appreciated that these and various other example embodiments and associated advantages or potential advantages of supporting packet scheduling in packet networks may be further understood by way of reference to the various figures, which are discussed further below.

Figure 1:
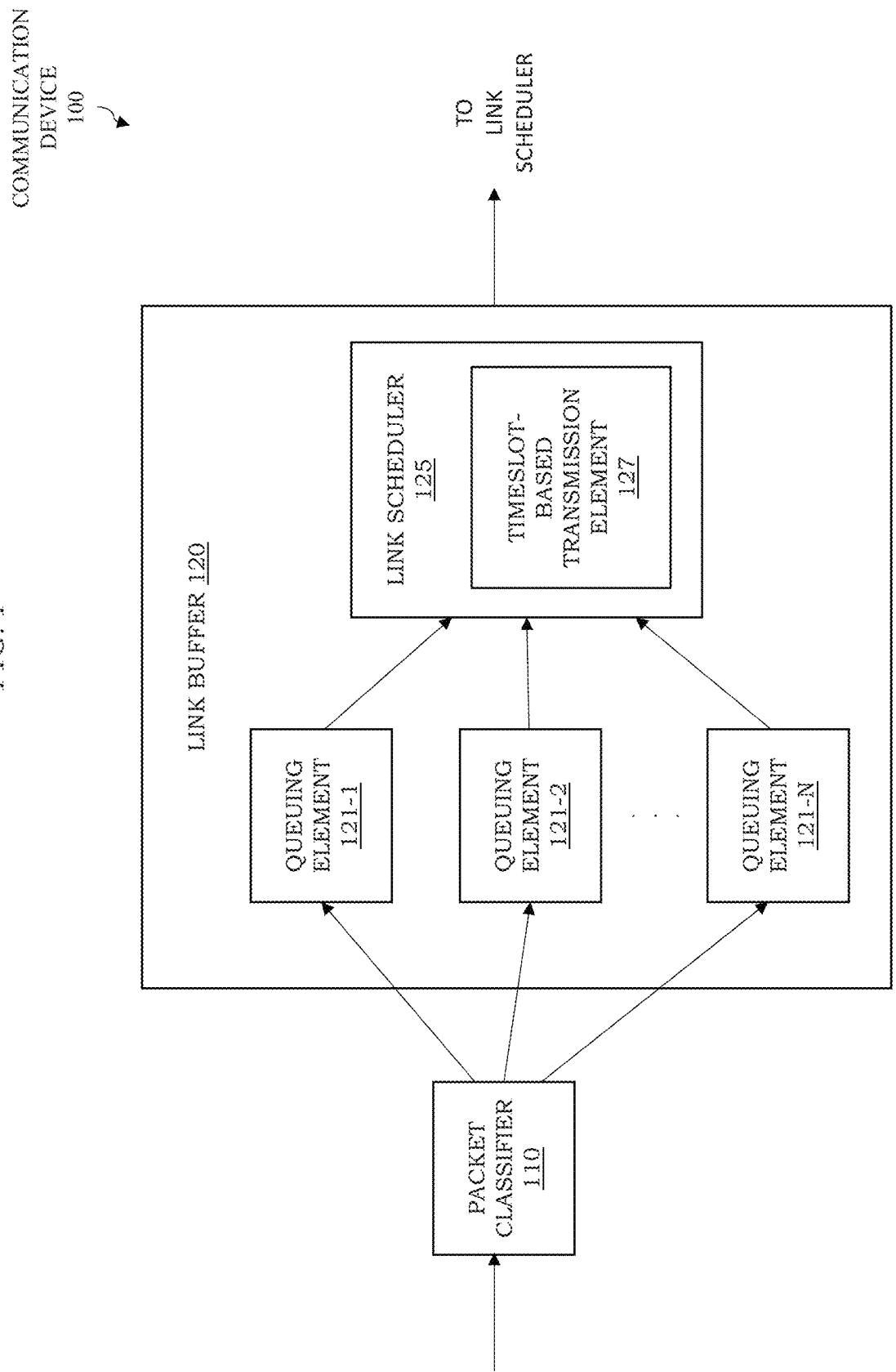
FIG. 1 depicts an example embodiment of a communication device having a link buffer including a packet scheduler configured to support scheduling of packets for transmission using a timeslot-based transmission credit scheme.

FIG. 1 depicts an example embodiment of a communication device having a link buffer including a packet scheduler configured to support scheduling of packets for transmission using a timeslot-based transmission credit scheme.

The communication device 100 may be any device which may include a link buffer configured to buffer packets for transmission via a communication link. For example, the communication device 100 may be a switch or a portion thereof, a router or a portion thereof, a network interface card of a compute server or a portion thereof, or the like. The communication device 100 may be deployed at various locations (e.g., endpoint, access, aggregation, metro, transport, core, data center, or the like) within various types of communication networks (e.g., wireline networks, wireless networks, enterprise networks, data center networks, home networks, or the like, as well as various combinations thereof).

The communication device 100 is configured to support queuing of packets at the communication device and scheduling of packets queued at the communication device 100 for transmission via a link at the communication device 100. The communication device 100 is configured to support scheduling of packets that are buffered in front of a network link when the network link is oversubscribed (e.g., when the packet arrival rate is higher than the packet transmission rate). It is noted that, if over-subscription persists, packets accumulate in the link buffer for the network link and the link becomes congested. The longer the duration of the oversubscription condition, the heavier the congestion and its consequences on the performance of the applications whose packets are queued in the link buffer. A large number of packets buffered in front of the link will delay the transmission of packets that arrive next, hindering their respective applications if they rely on the timely delivery of their packets. The communication device 100 is configured to support scheduling of packets, based on a timeslot-based transmission credit scheme, in order to manage such conditions and their effects.

The communication device 100 is configured to support queuing of packets at the communication device 100 and scheduling of packets queued at the communication device 100 for transmission via a link at the communication device 100 based on a packet classifier 110 and a link buffer 120 that includes a set of queuing elements 121-1 to 121-N (collectively, queuing elements 121) and a link scheduler 125. The packet classifier 110 receives packets to be transmitted via an outgoing link of the communication device 100 (omitted for purposes of clarity). The packets may be received from an application on the communication device 100 (e.g., where the packet originates on the communication device 100), from a link receiver associated with an incoming link to the communication device 100 (e.g., where the packet is received by the communication device 100), or the like. The packet classifier 110 classifies the packets for handling by the queuing elements 121. The queuing elements 121 include elements configured to support queuing of packets received at the communication device 100 while the packets are awaiting transmission from the communication device 100. The link scheduler 125 extracts packets from the queuing elements 121 and provides the packets to a link transmitter for transmission via an outgoing link of the communication device 100 (omitted for purposes of clarity).

The packet classifier 110, as indicated above, receives packets to be transmitted via an outgoing link of the communication device 100 and maps the packets to the queuing elements 121 of the link buffer 120. The packet classifier 110 may map packets to queuing elements 121 such that each of the packets for a given flow are mapped onto the same queuing element 121 (e.g., based on fields of the packet header that are identical for packets of the same flow)). The packet classifier 110 may map packets onto queuing elements 121 such that multiple flows are mapped onto the same queuing element 121 (e.g., the packet classifier 110 can try to distribute flows of different applications into different queuing elements 121; however, due to the larger number of existing applications and the smaller number of queuing elements 121 that may be available, it is possible to have flows of applications of different types mapped onto the same queuing element 121).

The queuing elements 121 are configured to support queuing of packets to be transmitted via an outgoing link of the communication device 100. The queuing elements 121 may be physical packet queues (e.g., a first-in-first-out (FIFO) queue, which may be implemented as a linked list of packet descriptors or using other suitable FIFO queue implementations, logical packet queues (e.g., a group of queues, a scheduler that in turn selects packet queues for service based on its own selection criteria, or the like, as well as various combinations thereof), or the like, as well as various combinations thereof. It will be appreciated that, in the case of logical queues, the logical queues which are schedulers may in turn control other sets of queuing elements which in turn may be schedulers, and so on, to provide a multi-layered scheduling hierarchy.

The link scheduler 125, as indicated above, extracts packets from the queuing elements 121 and provides the packets to a link transmitter for transmission via an outgoing link of the communication device 100 (omitted for purposes of clarity). The link scheduler 125 may be configured to service the queuing elements 121 based on various scheduling algorithms and criteria. The link scheduler 125 may be configured to service the queuing elements 121 based on use of a periodic service sequence including a set of timeslots associated with the queuing elements 121. The link scheduler 125 may be configured to service the queuing elements 121 based on association of transmission credits with timeslots of the periodic service sequence to support improved enforcement of both throughput and delay guarantees. The link scheduler 125 includes a timeslot-based transmission element 127 configured to support servicing of the queuing elements 121 based on association of transmission credits with timeslots of the periodic service sequence used by the link scheduler 125 for servicing the queuing elements 121 for transmission of packets from the communication device 100. It will be appreciated that the link scheduler 125 may service the queuing elements 121 in various other ways for extracting packets from the queuing elements 121 and providing the packets to a link transmitter for transmission via an outgoing link of the communication device 100 (omitted for purposes of clarity).

It will be appreciated that the communication device 100 may be configured to provide various other functions configured to support queuing of packets at the communication device 100 and scheduling of packets queued at the communication device 100 for transmission via a link at the communication device 100.

As indicated above, in packet networks, such as in a packet network that includes communication devices such as the communication device 100 presented with respect to FIG. 1, packet scheduling is the function that chooses the next packet to be transmitted over a network link. Packet scheduling is essential to the enforcement of QoS guarantees in network links that may become oversubscribed at any time during their operation. During a period of oversubscription, more packets arrive to the link than the link can transmit. A packet buffer is used for temporary storage of packets that cannot be transmitted immediately after their arrival. The packet scheduler determines the sequence of transmission for the packets that are stored in the buffer.

QoS guarantees are defined with respect to performance metrics such as throughput (amount of data traversing an observation point per unit of time), delay (time between the transmission of a packet at a first observation point and the arrival of the same packet at a second observation point), and delay jitter (variation of the delay between two observation points). QoS guarantees are associated with packet flows. A packet flow is a sequence of packets that share identical values for some of the fields in the headers of the packets. In a typical packet network, only a subset of packet flows may demand QoS guarantees. Packet scheduling is used to provide enforcement of the QoS guarantees of packet flows that demand QoS guarantees.

Packet scheduling, which may be used to provide enforcement of the QoS guarantees of packet flows that demand QoS guarantees, may be based on a packet scheduling policy. The packet scheduling policy may vary with the position of the link within the network and with the level of sophistication of the code (e.g., hardware, software, or a combination thereof) that controls the transmission of packets over the link. First-In-First-Out (FIFO) is one of the simplest packet scheduling policies available, in which the packet buffer is organized as a single queue and packets are transmitted in the order of their arrival to the queue. A Strict-Priority Scheduler (SPS) maps flows onto a small set of queues, visits the queues in order of decreasing priority, and selects for service the first non-empty queue. A Weighted Round Robin (WRR) scheduler assigns weights to the queues and serves the queues proportionally to their weights. A Weighted Fair Queuing (WFQ) scheduler assigns service rates to the queues and serves the queues proportionally to the service rates of the queues. The difference between WRR and WFQ is that the service rates of WFQ are assigned out of a finite scheduling capacity that the scheduler is not allowed to oversubscribe, whereas the WRR weights are taken out of a virtually infinite pool. If properly implemented, a WFQ scheduler can enforce both throughput and delay guarantees. A Worst-case Fair Weighted Fair Queuing (WF2Q) scheduler adds to WFQ a notion of service eligibility, which enables the enforcement of jitter guarantees in addition to throughput and delay guarantees.

The QoS framework of the network may drive the choice of packet scheduler for each network link. Time Sensitive Networking (TSN) is a QoS framework for layer-2 bridged networks specified in recent revisions of the IEEE 802.1Q standard. The framework requires that all links in the network instantiate the same type of scheduling policy, which may be chosen out of the variety of options that are specified in the TSN extensions of IEEE 802.1Q. The Integrated Services (Intserv) QoS framework handles end-to-end flows individually with respect to resource allocation and packet scheduling. Different combinations of schedulers may be used at each IntServ network link, but in any such combination the presence of at least one scheduler like WFQ or WF2Q is required for the enforcement of hard guarantees on throughput and delay. The Differentiated Services (DiffServ) QoS framework places most of the scheduling complexity at the edge of the network (WF2Q schedulers for server and edge router links) while relaxing the scheduling requirements in the core (strict priority scheduling is deemed sufficient for core network links).

Deterministic flows support applications with tight end-to-end delay requirements, such as Augmented Reality (AR), Virtual Reality (VR), real-time video streaming for remotely controlled vehicles, game streaming, and so forth. The ability to enforce delay guarantees implies the existence of a well-defined upper bound on the data rate of the flow. It also requires that the flow be explicitly provisioned end-to-end, to ensure that sufficient resources are available to enforce its QoS guarantees at every link along its network path. The provisioning of the flow at a network link involves, in a scheduler that is capable of enforcing throughput and delay guarantees, reservation of bandwidth resources (out of the finite capacity of the link) and possibly the association with a dedicated queue. Within the set of policies reviewed above, only WFQ and WF2Q can enforce such guarantees, and WF2Q is the only policy that can also enforce jitter guarantees (such capability is a defining feature of the traffic shaping function). In highly virtualized networks that pervasively support applications with stringent QoS requirements, WFQ and WF2Q schedulers should be relatively easy to deploy and operate. Virtualized instances of those schedulers that run as a service on general-purpose hardware platforms may be most desirable, although it will be appreciated that other implementations may be supported.

While WFQ and WF2Q schedulers are useful for supporting deterministic flows under various QoS frameworks, their implementation is far from trivial and can even prevent their deployment. The main reason for the complexity of existing WFQ and WF2Q implementations is the fundamental assumption that only non-empty queues should be included in the search for the next queue to be served. In other words, the current state of occupancy of the queues served by the scheduler contributes the majority of the scheduling complexity when it is included in the set of conditions that drive the operation of the scheduler. In a WFQ scheduler, the order of queue selection is typically determined by per-queue timestamps that express the latest time that the non-empty queues can tolerate until they receive the next service visit from the scheduler. The next queue to be visited is the one with the smallest timestamp. The WF2Q policy adds a notion of eligibility that restricts the set of timestamps to be considered for selection. The ineligible timestamp of a non-empty queue may become eligible at any increment of the scheduler's time reference. In a WFQ scheduler that serves N queues, the complexity of sorting the timestamp is O(log 2N) if the sorting is done with a binary tree. Lower complexity can be achieved with alternative sorting structures like a calendar queue; however, any simplification of the sorting structure introduces restrictions to the range of configurable service rates and degradations of the delay guarantees. The eligibility condition of WF2Q adds complexity to the plain binary tree implementation and also to its possible simplifications.

The primary source of complexity in conventional implementations of WFQ and WF2Q schedulers is the inclusion of the current state of occupancy of the queues in the set of conditions that drive the scheduling decision. Since only non-empty queues are considered for selection, queues are removed from the timestamp sorting structure when they are empty and added again when they receive the next packet. The insertion of a previously empty queue in the sorting structure must be done at the right position given the state of occupancy and service of all other queues. The new queue should be served not too late, in order not to violate its QoS guarantees, and not too early, in order not to violate the QoS guarantees of the other queues. The insertion in the sorting structure is done using a queue variable (the timestamp) that tracks the amount of service received so far by the queue. The timestamp is computed based on another variable (which may be referred to as the virtual time or the system potential) that tracks the service received so far by all queues. The timestamp is yet another variable that keeps changing with time, together with its eligibility condition and the queue occupancy state. The overall scheduling complexity results from the continuous evolution of the variables that control the scheduling decision before it is made. The scheduling parameters (service rate) and variables (timestamp) also occupy space in memories that have to be accessed at line-rate speed in order not to slow down the transmission rate of the link. Such memories are relatively expensive in high-end chipsets for packet switching. Their cost may limit the number of queues that a WFQ or WF2Q scheduler can support.

Additionally, another potential limitation of conventional WFQ schedulers is the coupling of the throughput guarantees with the criterion for distribution of bandwidth in excess of those guarantees. If, for example, a scheduler has allocated 50% of its capacity to two flows, with a 40% allocation to the first flow and 10% to the second, it can only distribute the remaining 50% proportionally to the two allocations (40% to the first flow, 10% to the second). If the two flows are receiving packets at higher rate than the link capacity, the first flow will receive service at 80% of the link capacity and the second flow at 20%. It would be much better, instead, if the network operator could freely choose how to distribute the bandwidth in excess of the minimum throughput guarantees based on criteria that are independent of those guarantees (e.g., in equal shares for the two flows, so that in the above example the first flow ends up with 65% of the link capacity and the second flows receives a 35% share; or in a 3:1 ratio in favor of the second flow, yielding 52.5% and 47.5%, respectively). In other words, conventional WFQ implementations generally do not allow for flexibility in the distribution of bandwidth in excess of the throughput guarantees.

WFQ schedulers are practical instantiations of a Packet-by-Packet Generalized Processor Sharing (PGPS) scheduler. Among PGPS-derived schedulers, Packet-by-Packet Rate-Proportional Servers (PRPSs) achieve the tightest upper bounds on single-node and multi-node packet delays. For a flow i with allocated rate $r_i$, the worst-case delay experienced by a packet that arrives to an empty queue is $D_i = L_i/r_i + L_{max}/r$, where $L_i$ is the size of the largest packet of flow i, $L_{max}$ is the size of the largest packet across all flows, and r is the link capacity. The delay experienced by subsequent packets reflects the burstiness of their arrival to the queue and does not express relevant differences between fair queuing schedulers. PRPS instances include Frame-Based Fair Queuing (FFQ), Starting-Potential Fair Queuing (SPFQ), Virtual Clock (VC), and Minimum-Delay Self-Clocked Fair Queuing (MD-SCFQ).

PRPS schedulers generally follow the same principle of operation. When the k-th packet of flow i arrives to the flow queue, it is associated with a timestamp $F_i^k = \max(V(t), F_i^{k-1}) + l_i^k/r_i$, where $F_i^{k-1}$ is the timestamp of the previous packet of the same flow, $l_i^k$ is the size of the new packet, $r_i$ is the service rate allocated to flow i, and V(t) is the function, called virtual time or system potential, that tracks the total amount of work distributed by the PRPS. The definition of V(t) distinguishes the PRPS instances from one another. In order for the PRPS to enforce the tightest bound on queuing delay, V(t) must always grow at least as fast as real time. VC has the slowest-growing and simplest virtual-time function: $V_{VC}(t) = t$.

In practice, timestamps do not need to be stored for every packet in a flow queue. Instead, the timestamp of the head-of-queue packet is sufficient to accurately track the amount of service received by the queue. The timestamp is updated according to the above rule every time a new packet arrives to the head of the queue, after either the arrival of a packet to an empty queue or the completion of a previous packet transmission. A scheduler that serves N queues stores N service rates and N timestamps in high-speed memory and keeps the N timestamps sorted for identification of the next queue to be served. Using a balanced binary tree for sorting, the minimum timestamp can be found after $\log_2 N$ timestamp comparisons.

A Shaped Rate-Proportional Server (SRPS) adds an eligibility condition to the queue selection process. In order for a queue i to be eligible for service at time t, its current timestamp $F_i^k$ must satisfy the following condition: $F_i^k - l_i^k/r_i \leq V(t)$. The eligibility condition yields a more even distribution of service to competing queues in the short term, minimizing the probability of back-to-back services to the same queue. The shaped version of Virtual Clock (Sh-VC), where $V_{Sh-VC} = t$, is effectively a non-work-conserving traffic shaper that enforces the same tight upper bound on delay as other PRPS instances while also limiting the throughput of each queue i to its nominal service rate $r_i$. The introduction of the eligibility condition increases the complexity of the timestamp sorting function A calendar queue is an alternative to the binary tree for sorting the timestamps of a WFQ scheduler. A calendar queue generally consists of an array of bins, each associated with a future time interval. When a packet queue receives a new timestamp, it is queued in a linked list of packet queues associated with the bin whose time interval includes the value of the timestamp. When the network link becomes available for a new transmission, the scheduler selects the queue at the head of the list for the non-empty bin associated with the lowest time. A two-dimensional calendar queue may be used for sorting the timestamps when the eligibility condition is also applied. While the calendar queue reduces the complexity of the sorting function, it typically remains rather expensive to implement and configure, and it imposes limitations on the range of service rates that the scheduler can support.

A practical application of interest for realization of a virtualized, as-a-service packet scheduler with tight delay guarantees is the Data Plane Development Kit (DPDK) programming environment. DPDK is an open source project managed by the Linux Foundation. With a conventional Network Interface Card (NIC), the DPDK code runs in the host Central Processing Unit (CPU). With a Smart NIC, which combines an Ethernet controller with an embedded multi-core CPU, the DPDK code may run directly on the embedded CPU to offload packet processing from the host CPU. DPDK offers a pre-defined, configurable scheduling structure that includes multiple scheduling layers for the hierarchical segregation of bandwidth. As an example, the DPDK scheduling structure for a NIC that controls a 10 Gb/s Ethernet interface may be configured as follows. The root of the hierarchical tree is the port scheduler. Lower scheduling layers are associated with sub-ports, pipes, and traffic classes. The port and sub-port schedulers are round-robin schedulers that handle child nodes that are individually shaped using token buckets. The combination of the round-robin scheduler with the shaping of the scheduled children yields a potentially non-work-conserving WRR scheduler. Most critically, every scheduling visit to a child yields consecutive transmissions of packets out of the child until its credits are exhausted. The pipe scheduler visits traffic classes in strict priority order. The traffic classes may also be shaped by respective token buckets. A traffic class typically handles a single queue. The lowest-priority class may handle multiple queues, served by a WRR scheduler.

The default scheduling structure of DPDK may present certain limitations with respect to the flexibility in the hierarchical distribution of bandwidth and to the enforcement of tight delay guarantees. Given the time cost of searching through the hierarchy for the next packet to transmit, the scheduler relies on the transmission of multiple packets out of the same node in the hierarchy to minimize the number and the depth of the scheduling searches. As a result, multiple packets are typically transmitted back-to-back out of the same queue, which increases the time in between consecutive visits to the same queue, and therefore also the queuing delay that individual packets may experience. Despite this simplification, aimed at increasing the port throughput at the expense of larger queuing delays, the scheduler easily falls behind in keeping up with the transmission rate of the network interface. For example, in an experiment with the DPDK scheduling structure discussed above and a 10 Gb/s Ethernet interface (namely an Intel X710-DA4 NIC, which does not include an embedded CPU), it was determined that the port throughput drops from 10 Gb/s down to 4.6 Gb/s when all 16 queues are loaded with respective flows, the queue token buckets are configured with minimal size to force the interleaving of services to different queues, and the size of every packet is 160 bytes. It was determined that the loss rate is slightly higher than the forwarding rate, consistently with the port throughput dropping from 10 Gb/s to 4.6 Gb/s.

Various example embodiments presented herein are configured to reduce or even remove the complexity overhead of executing scheduling decisions in real time based on the current state of the queues (e.g., eliminating the complexity of ensuring that the current state of all queues is known right before the scheduling decision is made), while preserving the accurate enforcement of bandwidth and delay guarantees. Various example embodiments presented herein, rather than ensuring that the current state of all queues is known right before the scheduling decision is made, may instead make the scheduling decision without using the current queue states and then react to the state of the queue after it has been selected for service in the scheduling decision. Various example embodiments presented herein are configured to support a scheduler for variable-size packets that enforces tight throughput, delay, and jitter guarantees at fine granularity of flow identification with reduced or minimum implementation complexity and without loss of link utilization, where the accurate enforcement of throughput guarantees may be supported based on a timeslot-based (as opposed to queue-based) credit accounting method that handles the balancing of the service shares in response to transmission spillovers between contiguous timeslots.

Various example embodiments presented herein are amenable to the realization of a Fair Airport scheduler, where a non-work-conserving WF2Q scheduler (which also may be referred to as a shaper) operates as a primary scheduler for enforcing throughput, delay, and jitter guarantees, and a second scheduler with reduced or minimal complexity operates as a secondary scheduler for distributing bandwidth in excess of the throughput guarantees according to independent criteria. Various example embodiments presented herein are configured to provide a close approximation of a non-work-conserving WF2Q shaper, such as the Shaped Virtual Clock (Sh-VC) SRPS. In the approximation provided by a scheduler configured to make scheduling decisions based on use of timeslot credits, the assignment of service opportunities to the packet queues is determined offline and is independent of the occupancy state of the queues. For realization of a work-conserving scheduler, the scheduler configured to make scheduling decisions based on use of timeslot credits may be utilized as a non-work-conserving Guaranteed Bandwidth Scheduler (GBS) component of a link scheduler that also may include an Excess Bandwidth Scheduler (EBS) component. This arrangement of schedulers is discussed further below.

Various example embodiments presented herein may provide improved scheduling in a scheduling architecture of a link scheduler that includes a GBS as a primary scheduler for packet queues, an EBS as a secondary scheduler for packet queues, and an SPS that serves the GBS and the EBS, giving high priority (HP) to the GBS and low priority (LP) to the EBS. It will be appreciated that a packet queue generally can be served by both the GBS and the EBS, but that configurations also may exist in which a queue is served exclusively by the GBS (no access to excess bandwidth) or exclusively by the EBS (no throughput, delay, and jitter guarantees). It will be appreciated that the EBS may be realized in various ways, such as based on use of WRR, SPS, or the like, as well as various combinations, possibly arranged hierarchically, thereof. Various example embodiments presented herein may provide an improved approach for implementation of the GBS.

Various example embodiments presented herein may provide improved scheduling in a scheduling architecture of a link scheduler by providing a non-work-conserving GBS that supports use of a periodic service sequence of timeslots configured to provide service opportunities to queues and supports use of credit counters to ensure that service lost to a transmission time spillover from a previous timeslot does not translate into a violation of throughput guarantees for a queue in both the short term and the long term.

Various example embodiments presented herein may provide improved scheduling in a scheduling architecture of a link scheduler by providing a non-work-conserving GBS that supports use of a periodic service sequence of timeslots configured to provide service opportunities to queues, where all timeslots have the same fixed duration and each timeslot provides service opportunities to a single queue. Every time the network link becomes available for transmission of a packet, the GBS identifies the timeslot corresponding to the current time and determines if the timeslot is assigned to a queue. If a queue is found and is currently not empty, the queue is served; otherwise the service opportunity is relinquished by the GBS. If an EBS is available for distribution of excess bandwidth, every service opportunity relinquished by the GBS is passed to the EBS; otherwise, the service remains unassigned. The duration of a GBS timeslot will be at least as long as the time required for transmission of the largest packet handled by the network link. The delay guarantees enforced by the GBS may degrade as the duration of a single timeslot grows longer. The number of timeslots in the periodic service sequence depends on the ratio between the link capacity and the minimum throughput guaranteed by the scheduler (e.g., the sequence contains 1,000 timeslots if the link capacity is 1 Gb/s and the minimum guaranteed throughput is 1 Mb/s). The method used for assignment of scheduling timeslots to the queues defines the tightness of the QoS guarantees enforced by the scheduler. The most natural option for calculation of the periodic service sequence includes running the Sh-VC algorithm offline for a time equal to the time duration of the whole sequence, under the assumption that all queues are persistently occupied by packets and that all transmitted packets have the same size, with transmission time equal to the duration of a timeslot in the periodic service sequence. The periodic service sequence may be updated when new flows are provisioned on the link with their throughput and delay guarantees (the same update is not necessary, although it may be performed, in response to the decommissioning of previously provisioned flows). When an update of the scheduling sequence becomes available, it may be installed by incremental replacement of the existing timeslot assignments to the queues, by establishment of the new assignments right before the respective timeslots are visited by the scheduler, or the like. The periodic service sequence also or alternatively may be supported by maintaining two scheduling sequences, one in active mode and the other in standby mode, and then activating the standby sequence right after it is refreshed with the latest update.

Various example embodiments presented herein may provide improved scheduling in a scheduling architecture of a link scheduler by providing a non-work-conserving GBS that supports use of credit counters to ensure that service lost to a transmission time spillover from a previous timeslot does not translate into a violation of throughput guarantees in both the short and the long term. It is noted that, while the credit counters may be associated with the queues in order to allow queues with positive credit to grab service time from the timeslots that immediately precede and follow their designated service timeslots, this approach fails to achieve short-term and long-term enforcement of throughput guarantees because it can systematically grab transmission time from one queue to compensate transmission time lost to another queue. Thus, in at least some example embodiments, the credit counters used to ensure that service lost to a transmission time spillover from a previous timeslot does not translate into a violation of throughput guarantees in both the short and the long term may be associated with the timeslots of the scheduler rather than being associated with the queues served by the scheduler. This ensures that the compensation of service times is guaranteed to occur within the queue pairs where the service spillovers occur, without involving other queues. The GBS may seamlessly interact with the EBS for distribution of service opportunities that are not consumed based on the designations of the GBS. Irrespective of its design, every service that the EBS distributes is charged to the GBS timeslot during which it takes place, whereas charging the service to the queue that should have received it, or not charging it at all, would create unsolvable imbalances in the enforcement of throughput guarantees for individual queues.

Figure 2:
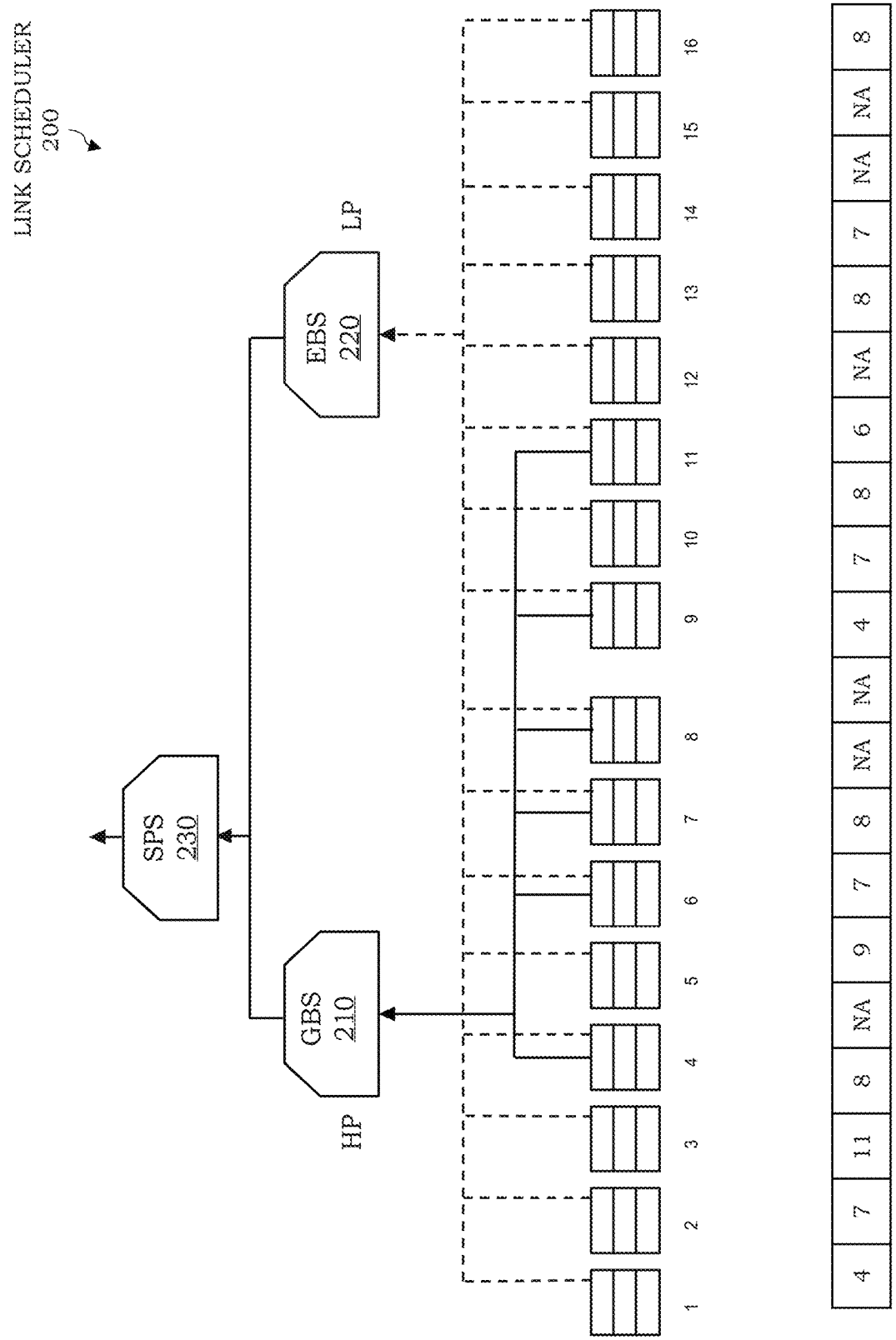
FIG. 2 depicts an example embodiment of a scheduling architecture for a link scheduler and an example of a periodic service sequence based on the scheduling architecture for the link scheduler.

It is noted that an example of such a scheduling architecture that may use an improved implementation of the GBS is presented in FIG. 2.

FIG. 2 depicts an example embodiment of a scheduling architecture for a link scheduler and an example of a periodic service sequence based on the scheduling architecture for the link scheduler.

FIG. 2, as indicated above, depicts a scheduling architecture for a link scheduler 200. The link scheduler 200 includes a set of sixteen flow queues (numbered 1-16), a GBS 210, an EBS 220, and an SPS 230. In the link scheduler 200, only flow queues 4, 6, 7, 8, 9, and 11 are served by the GBS 210, while the flow queues 1-16 are served by the EBS 220. The GBS 210 and the EBS 220 are served by the SPS 230. The GBS 210 is a non-work-conserving GBS that supports a periodic service sequence of timeslots, where all timeslots have the same fixed duration and each timeslot provides service opportunities to a single queue. Every time the network link becomes available for transmission of a packet, the GBS 210 identifies the timeslot corresponding to the current time and determines if the timeslot is assigned to a queue. If a queue is found, the queue is currently not empty, and the timeslot has transmission credits available, the queue is served, otherwise the service opportunity is relinquished for that queue and possibly also for any other queue served by the GBS 210. Since the EBS 220 is available for distribution of excess bandwidth, every service opportunity relinquished by the GBS 210 is passed to the EBS 220. Without the EBS 220, the service would remain unassigned.

FIG. 2, as indicated above, also depicts an example of realization of the periodic service sequence based on the scheduling configuration of the link scheduler 200. In the example, not all queues have throughput and delay guarantees enforced by the GBS 210. In fact, some queues may not have QoS requirements that are explicitly quantified. On the contrary, all queues in FIG. 2 are considered by the EBS 220 for distribution of excess bandwidth (the case where a queue is served only by the GBS 210 and not by the EBS 220 is also possible but is not shown in FIG. 2). The GBS service sequence of FIG. 2 has unassigned slots (marked as NA), which are consumed by the EBS 220 any time at least one of the sixteen queues is not empty.

In the link scheduler 200, the duration of a GBS timeslot will be at least as long as the time required for transmission of the largest packet handled by the network link. The delay guarantees enforced by the scheduler may degrade as the duration of a single timeslot grows longer. The number of timeslots in the periodic service sequence depends on the ratio between the link capacity and the minimum throughput guaranteed by the scheduler (e.g., the sequence contains 1,000 timeslots if the link capacity is 1 Gb/s and the minimum guaranteed throughput is 1 Mb/s). The method used for assignment of scheduling timeslots to the queues defines the tightness of the QoS guarantees enforced by the scheduler. The most natural option for calculation of the periodic service sequence consists in running offline the Sh-VC algorithm for a time equal to the time duration of the whole sequence, under the assumption that all queues are persistently occupied by packets and that all transmitted packets have the same size, with transmission time equal to the duration of a timeslot in the periodic service sequence.

In the link scheduler 200, the scheduling sequence may be updated when new flows are provisioned on the link with their throughput and delay guarantees (the same update is not necessary in response to the decommissioning of provisioned flows). When an update of the scheduling sequence becomes available, it may be installed by incremental replacement of the existing timeslot assignments to the queues, by establishment of the new assignments right before the respective timeslots are visited by the scheduler, or the like. Another possibility is to maintain two scheduling sequences, one in active mode and the other in standby mode, and then activate the standby sequence right after it is refreshed with the latest update. It will be appreciated that the scheduling service sequence may be updated in other ways.

It will be appreciated that the link scheduler 200 may be configured to support various other functions for supporting throughput and delay guarantees.

Various example embodiments presented herein may be configured to provide a GBS implementation that assigns services to queues based on a pre-computed service sequence. Various example embodiments may be configured to achieve accurate enforcement of throughput guarantees through a credit accounting method in which credits are associated with the timeslots of the service sequence and not directly with the packet queues that are served by the GBS. The service sequence is a periodic, recurring sequence of timeslots. The service sequence, including the timeslots of the service sequence, may be managed using an array of service timeslot entries, where each of the service timeslot entries includes a queue identifier that identifies the respective packet queue with which the service timeslot is associated and a credit accumulator configured to track transmission credits for the respective service timeslot. The credit accumulator for a timeslot may track transmission credits for the timeslot in various ways, such as by using time units, data units (e.g., bits, bytes, or the like), bandwidth units, or the like, as well as various combinations thereof.

Various example embodiments presented herein for achieving accurate enforcement of throughput guarantees, through a credit accounting method in which credits are associated with the timeslots of the service sequence and not directly with the packet queues that are served by the GBS, may be further understood by first considering various aspects of the 802.1Qbv extension of the IEEE 802.1Q standard for time-sensitive bridged networks. The 802.1Qbv extension of the IEEE 802.1Q standard for time-sensitive bridged networks provides a scheduling framework based on a time-driven, pre-computed distribution of service opportunities offered to pre-provisioned queues. The scheduling sequence of 802.1Qbv may include timeslots with different durations, and multiple queues may be eligible for service within each timeslot. A time guard band is enforced before the end of each timeslot to block the transmission of a new packet from any of the queues that are designated for service by the timeslot, to ensure that the transmission does not spill over the next timeslot. As a consequence, the 802.1Qbv scheduler typically cannot achieve high utilization of the link bandwidth, because a fixed portion of every timeslot in the transmission schedule cannot be used for the transmission of packets from scheduled flows. The adoption of frame preemption, as specified in the 802.1Qbu extension of the IEEE 802.1Q standard, reduces the duration of the guard band for low-priority packets, but still does not eliminate it completely. As a consequence, the continuity of the packet transmissions is interrupted at every timeslot boundary. The 802.1Qbv scheduler can find alternative queues for service distribution if the top-priority queue designated for service during the timeslot is empty; however, the distribution of service to the secondary queues is strictly controlled by queue priority, with no other criteria available. Moreover, the 802.1Qbv scheduler is designed for operation with a small set of class queues (up to 8), which makes it impossible to allocate throughput and delay guarantees for a large number of flows. Finally, the ability of the 802.1Qbv scheduler to enforce tight end-to-end delay guarantees relies on the calculation of a network-wide schedule where all link schedulers in the entire network are tightly synchronized. The complexity of the schedule calculation and the physical constraints on the accuracy of clock synchronization in a distributed environment impose heavy constraints on the size of the network for which the schedule can be computed and enforced, with respect to geographical spread, number of switching nodes, and number of end-to-end flows. Various example embodiments presented herein may be configured to provide various improvements or potential improvements over a typical 802.1Qbv scheduler by supporting a capability to fully balance the enforcement of throughput guarantees against the inaccuracies induced by the discrepancy between the packet size and the duration of the timeslot, and to seamlessly combine with a secondary scheduler for distribution of excess bandwidth without loss of service continuity and without altering the throughput guarantees of the queues.

Various example embodiments presented herein may be configured to use credit counters to ensure that service lost by a queue to a transmission time spillover from a previous timeslot does not translate into a violation of throughput guarantees for the same queue in both the short and the long term. Various example embodiments, rather than associating the credit counters with the queues and allowing queues with positive credit to grab service time from the timeslots that immediately precede and follow their designated service timeslots (since it has been determined that this approach fails to achieve short-term and long-term enforcement of throughput guarantees because it can systematically grab transmission time from one queue to compensate transmission time lost to another queue), may associate the credit counters with the timeslots of the scheduler such that the compensation of service times is guaranteed to occur within the queue pairs where the service spillovers occur without involving other queues. Various example embodiments presented herein may be configured to support seamless interaction by a primary scheduler (e.g., GBS) with a secondary scheduler (e.g., EBS) for distribution of service opportunities that are not consumed based on the designations of the primary scheduler. Various example embodiments may be configured such that, irrespective of its design, every service that the EBS distributes is charged to the GBS timeslot during which it takes place, whereas charging the service to the queue that should have received it, or not charging it at all, would create unsolvable imbalances in the enforcement of throughput guarantees for individual queues.

Various example embodiments presented herein may be configured to provide a scheduler for variable-size packets that enforces tight throughput, delay, and jitter guarantees at fine granularity of flow identification with minimum implementation complexity and without loss of link utilization. Various example embodiments presented herein may be configured to provide such a scheduler that supports accurate enforcement of throughput guarantees by using a timeslot-based (as opposed to queue-based) credit accounting method that handles the balancing of the service shares in response to transmission spillovers between contiguous timeslots.

Figure 3:
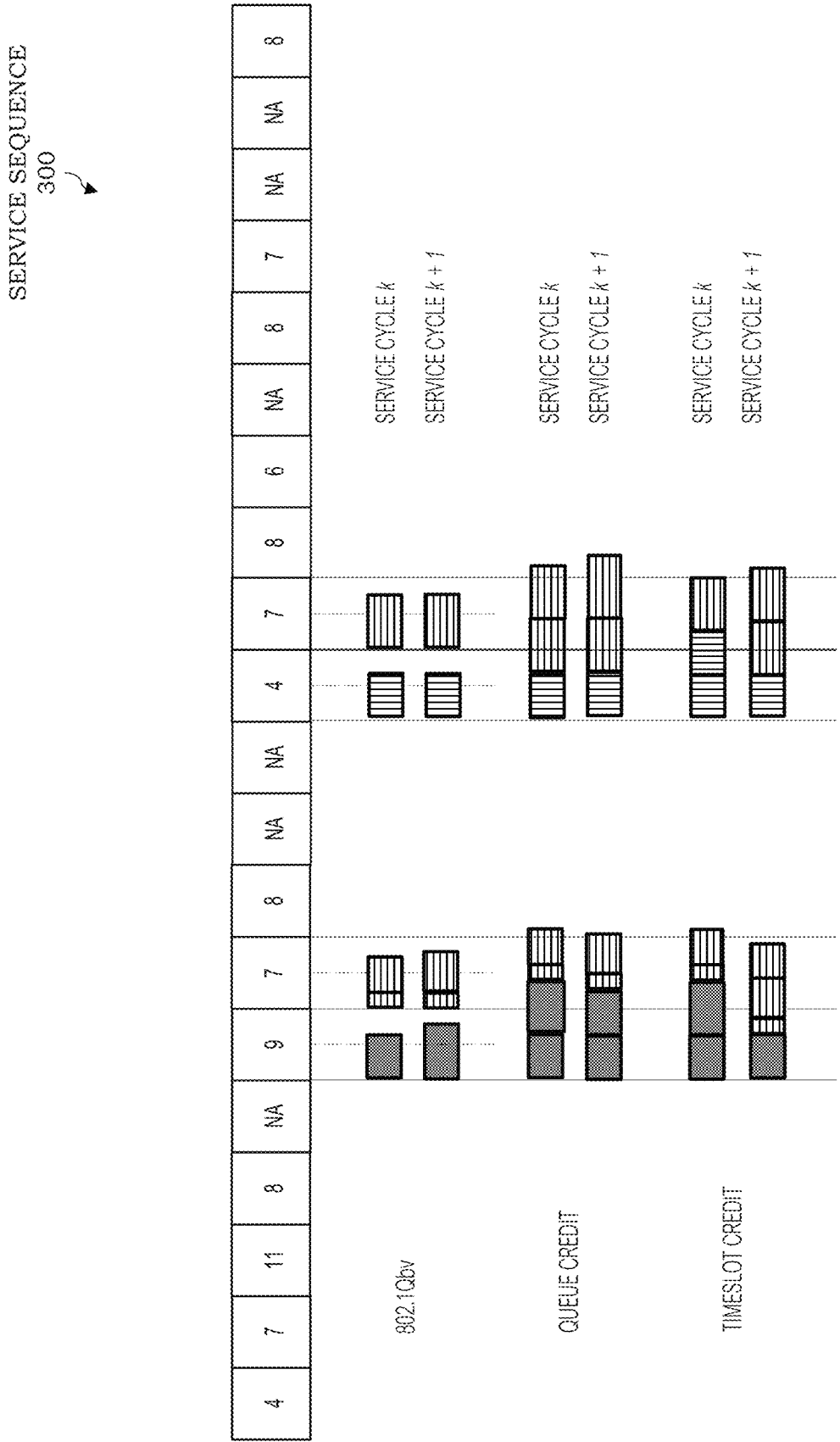
FIG. 3 depicts an example service sequence that compares a timeslot credit method with a queue credit method and with a method based on the 802.1Qbv standard.

FIG. 3 depicts an example service sequence that compares a timeslot credit method with a queue credit method and with a method based on the 802.1Qbv standard. The example service sequence 300 covers two consecutive service cycles, highlighting the effects of the discrepancy between packet and timeslot size on the accuracy of bandwidth distribution to individual queues. The 802.1Qbv scheduler uses a time guard band to prevent the transmission of a packet if the transmission of that packet may end after conclusion of the current timeslot and, thus, the scheduler interrupts the transmission of packets towards the end of the timeslot, lowering the utilization of the network link. The queue credit method allows packet transmissions started in one timeslot to spill over onto the following timeslot. It also allows a queue with positive credit to grab bandwidth from neighboring timeslots for recovery of the bandwidth lost to other queues. In the example, the transmission of packets from Queue 9 spills over the timeslot allocated to Queue 7 in two consecutive service cycles. The queue credit method allows Queue 7 to recover its service credit when the scheduler visits it again in the service sequence. The service recovery occurs at the expense of Queue 4. The net result is that Queue 9 takes bandwidth away from Queue 4. The service imbalance cannot be fixed in the long run because the queue credit system does not keep track of the queues that gain and lose bandwidth in every service spillover event. The timeslot credit method closely keeps track of the same events and, therefore, can quickly compensate any service imbalance induced by those events.

Figure 4:
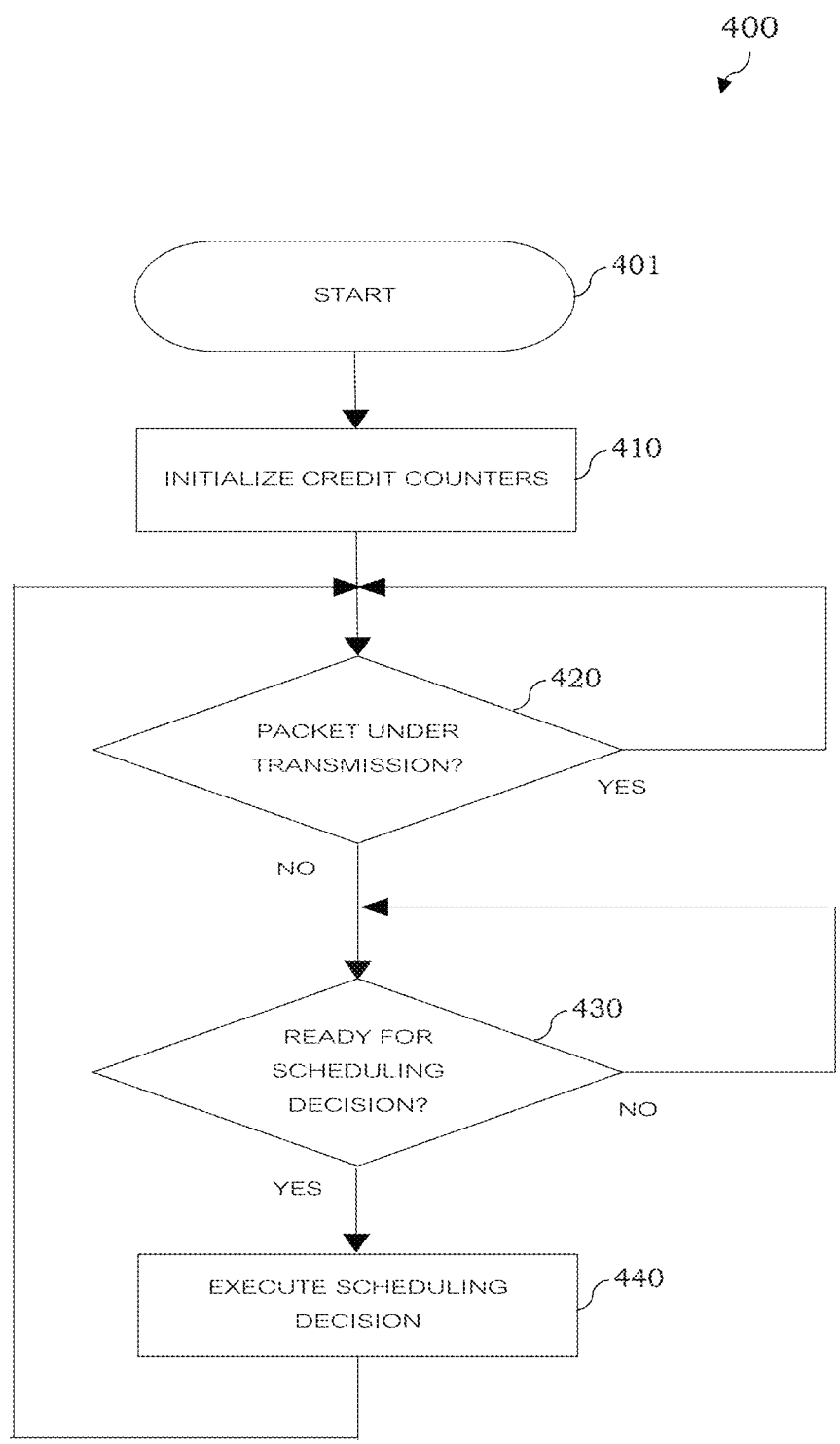
FIG. 4 depicts an example embodiment of a method for use by a scheduler for making a scheduling decision based on use of timeslot credits.

FIG. 4 depicts an example embodiment of a method for use by a scheduler for making a scheduling decision based on use of timeslot credits. It will be appreciated that the scheduler may be a GBS and, thus, the method 400 is described within the context of embodiments in which the scheduler is a GBS. It will be appreciated that, although primarily presented as being performed serially, at least a portion of the functions of method 400 may be performed contemporaneously or in a different order than as presented with respect to FIG. 4. At block 401, the method 400 begins. At block 410, the GBS initializes (e.g., to zero) the credit counters of the timeslots. At block 420, the GBS checks if a packet is currently under transmission. If a packet is currently under transmission, the GBS cannot select a new packet for transmission and the method 400 returns to block 420. If no packet is under transmission, the GBS proceeds to block 430, where the GBS checks if a new scheduling decision can be made. Scheduling decisions may be spaced, for example, by at least a fixed amount of time, so that the GBS may be ready for a new scheduling decision only after that amount of time has elapsed since the previous check. The fixed amount of time between scheduling decisions may be equal, for example, to the inter-packet gap between consecutive packets transmitted over the network link of the scheduler. If, at block 423, the GBS is not ready for a scheduling decision, the method 400 returns to block 430; otherwise, the method 400 proceeds to block 440, where the GBS executes the scheduling decision. After the execution of the scheduling decision is complete, the method 400 returns to block 420.

Figure 5:
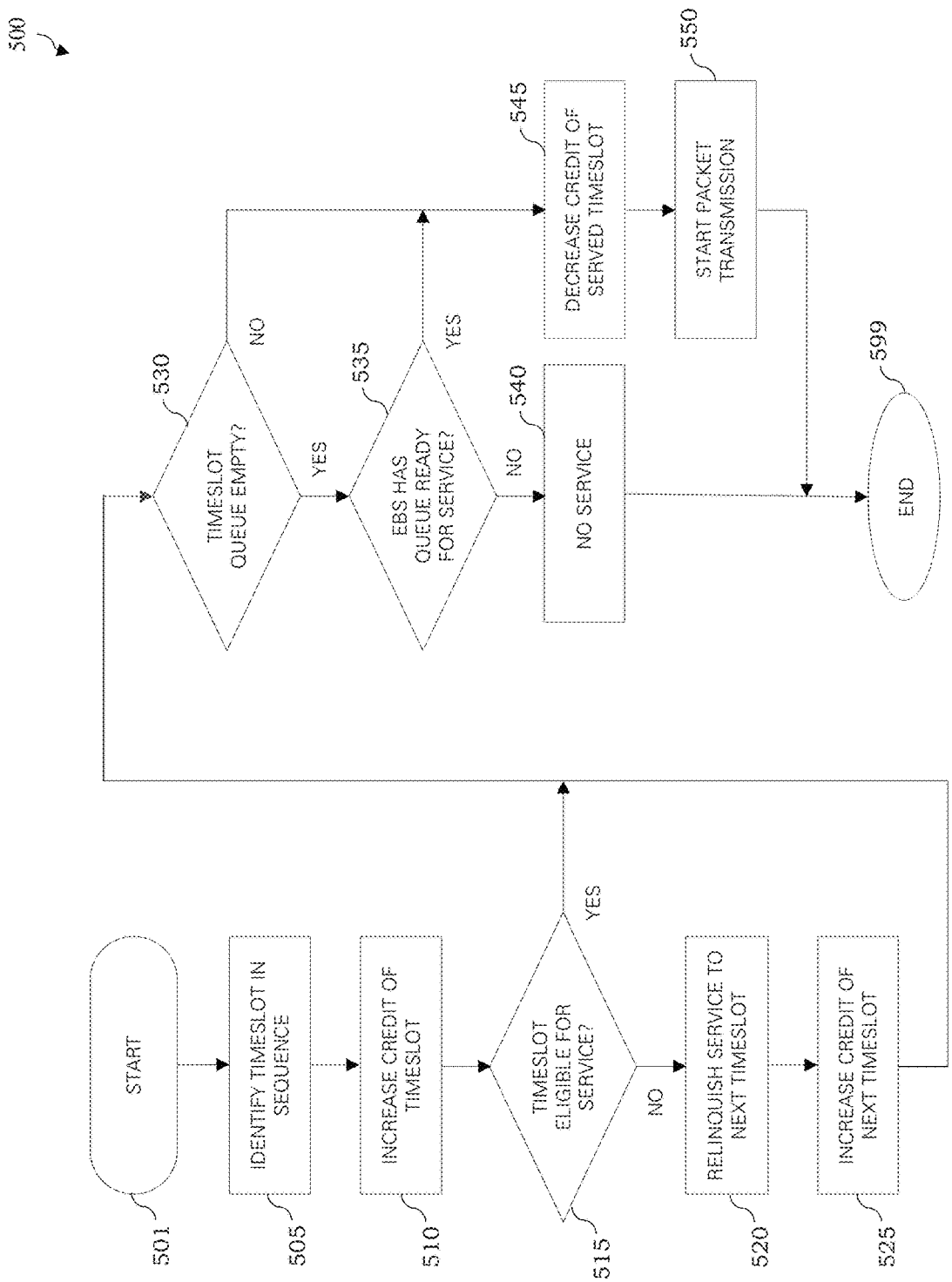
FIG. 5 depicts an example embodiment of a method for use by a scheduler for making a scheduling decision based on use of timeslot credits.

FIG. 5 depicts an example embodiment of a method for use by a scheduler for making a scheduling decision based on use of timeslot credits. It will be appreciated that the method 500 may be used to execute the scheduling decision of block 440 of FIG. 4. It will be appreciated that the scheduler may be a GBS and, thus, the method 500 is described within the context of embodiments in which the scheduler is a GBS. It will be appreciated that, although primarily presented with respect to example embodiments in which transmission credits for timeslots are based on time units, transmission credits for timeslots may be supported in various other ways. It will be appreciated that, although primarily presented as being performed serially, at least a portion of the functions of method 500 may be performed contemporaneously or in a different order than as presented with respect to FIG. 5.

At block 501, the method 500 begins.

At block 505, the GBS identifies the timeslot in the service sequence that corresponds to the current time. The identification of the timeslot is determined by the value of the current time, the time interval associated with a timeslot, and the total number of timeslots in the service sequence.

At block 510, the GBS increases the credit counter for the identified timeslot. For example, where the timeslot credits are counted in time units, the credit increase is equal to the time since the previous credit update for the same timeslot. After adding such time to the previous value of the credit counter, the GBS sets the credit counter equal to the minimum of its current value and the total duration of the service sequence, which is equal to the time interval of one timeslot times the number of timeslots in the service sequence.

At block 515, the GBS checks if the current timeslot is eligible for service. The timeslot is eligible for service if its current credit and the current debit (opposite of the negative credit, or null if the credit is positive) of the previous timeslot add up to a non-negative number. The inclusion of the debit of the previous timeslot is to ensure that a timeslot does not give away service opportunities that are created by a temporary over-service of the previous timeslot. The temporary credit boost does not go unaccounted for, because any extra service that may derive from it will later cause a regular credit decrease for the timeslot that receives the extra service. If the timeslot is not eligible for service, the method 500 proceeds to block 520, otherwise the method 500 proceeds to block 530.

At block 520, the GBS, based on the determination that the timeslot is not eligible for service, operates such that the timeslot relinquishes its service opportunity to the next timeslot. From block 520, the method 500 proceeds to block 525.

At block 525, the GBS increases, and possibly clamps, the credit counter of the next timeslot. From block 525, the method 500 proceeds to block 530.

At block 530, the GBS checks if the queue designated by the timeslot selected for service (either the current timeslot or the next) is currently empty. If the queue designated by the timeslot selected for service is empty, the queue cannot be served and the method 500 proceeds to block 535, otherwise the queue can be served and the method 500 proceeds to block 545. At block 535, the GBS passes the control of the scheduling decision to the EBS (if any), which checks if it has at least one queue that it can serve. If such a queue does not exist, the method 500 proceeds to block 540, otherwise the method 500 proceeds to block 545.

At block 540, a determination is made that no service is to be provided. From block 540, the method 500 proceeds to block 599, where the method 500 ends (which may include returning to block 420 of FIG. 4 where the method 500 is used as block 440 of the method 400 of FIG. 4).

At block 545, the scheduler decreases the counter for the credits available to the timeslot that is receiving the service. For example, where the timeslot credits are counted in time units, the credit reduction is equal to the time that it will take to transmit the packet, multiplied by the number of timeslots in the service sequence. The decrease amount is the same independent of the scheduler that assigns the service (GBS or EBS). From block 545, the method 500 proceeds to block 550.

At block 550, the GBS sends the packet to the link transmitter. From block 550, the method 500 proceeds to block 599, where the method 500 ends (which may include returning to block 420 of FIG. 4 where the method 500 is used as block 440 of the method 400 of FIG. 4).

Figure 6:
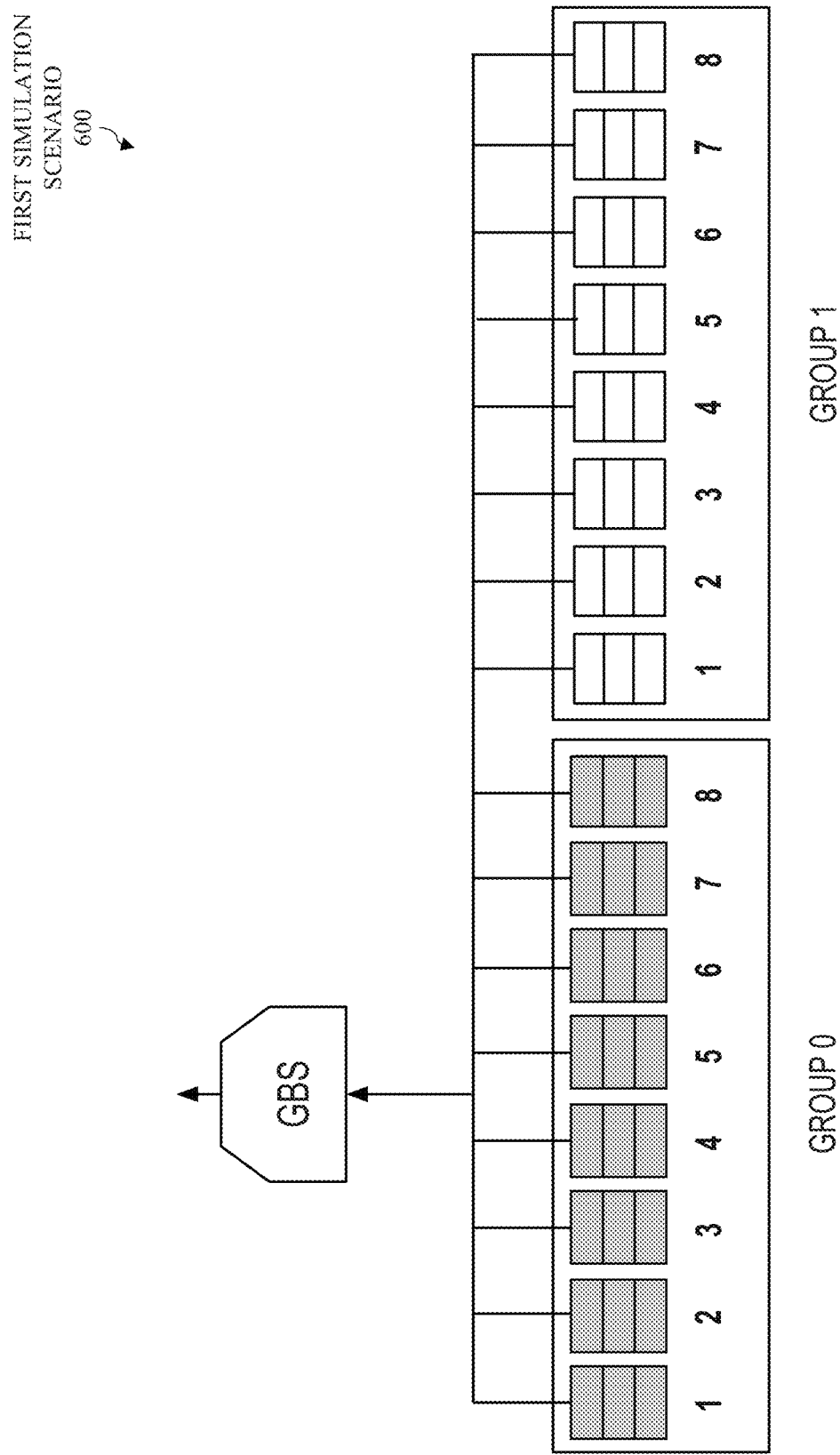
FIG. 6 depicts a first simulation scenario for use in understanding the performance of a guaranteed bandwidth scheduler (GBS) configured to make scheduling decisions based on use of timeslot credits.

FIG. 6 depicts a first simulation scenario for use in understanding the performance of a GBS for making scheduling decisions based on use of timeslot credits. FIG. 6 illustrates the queuing structure and scheduling configuration for the first simulation scenario 600. The performance of the GBS configured to make scheduling decisions based on use of timeslot credits is demonstrated in a first simulation scenario that is based on the set of queues shown in FIG. 6 (the simulation experiments are executed on the Ns-3 open source platform). The simulation scenario features 16 queues divided into 2 groups. The queues of Group 0 are oversubscribed by the corresponding flows, with packet arrival rates that exceed the rate allocations in the GBS. Instead, the queues in Group 1 receive packets at rates that are only slightly lower than the respective GBS service rates. Each group includes 4 pairs of queues with identical arrival and service rates. The characteristics of each flow are listed in Table 1. Table 1 shows the scheduling and arrival rate of each pair of queues in each group in the simulation scenario of FIG. 6. GPS Max Delay is the theoretical worst-case delay enforced by a GPS scheduler for a flow with the same traffic profile. All flows are purely constant bit rate (CBR), with no variations of the packet inter-arrival time. All rates are Layer-2 (1534-byte Frame including the inter-packet gap, 1500-byte IP packet, 1472-byte application payload). The Layer-2 link rate is 1 Gb/s. The EBS weight set to 0 indicates that the scheduler is purely non-work-conserving and does not include an EBS component.

TABLE 1

| | Group 0 | | | | Group 1 | | | |
|---|---|---|---|---|---|---|---|---|
| Flow ID | GBS Rate [Mb/s] | EBS Queue Weight | Arrival Rate [Mb/s] | GPS Max Delay [µs] | GBS Rate [Mb/s] | EBS Queue Weight | Arrival Rate [Mb/s] | GPS Max Delay [µs] |
| 1,2 | 125 | 0 | 187.582 | N/A | 125 | 0 | 118.803 | 111 |
| 3,4 | 62.5 | 0 | 93.792 | N/A | 62.5 | 0 | 59.402 | 210 |
| 5,6 | 41.667 | 0 | 62.528 | N/A | 41.667 | 0 | 39.602 | 308 |
| 7,8 | 20.833 | 0 | 31.264 | N/A | 20.833 | 0 | 19.801 | 604 |

Figure 7:
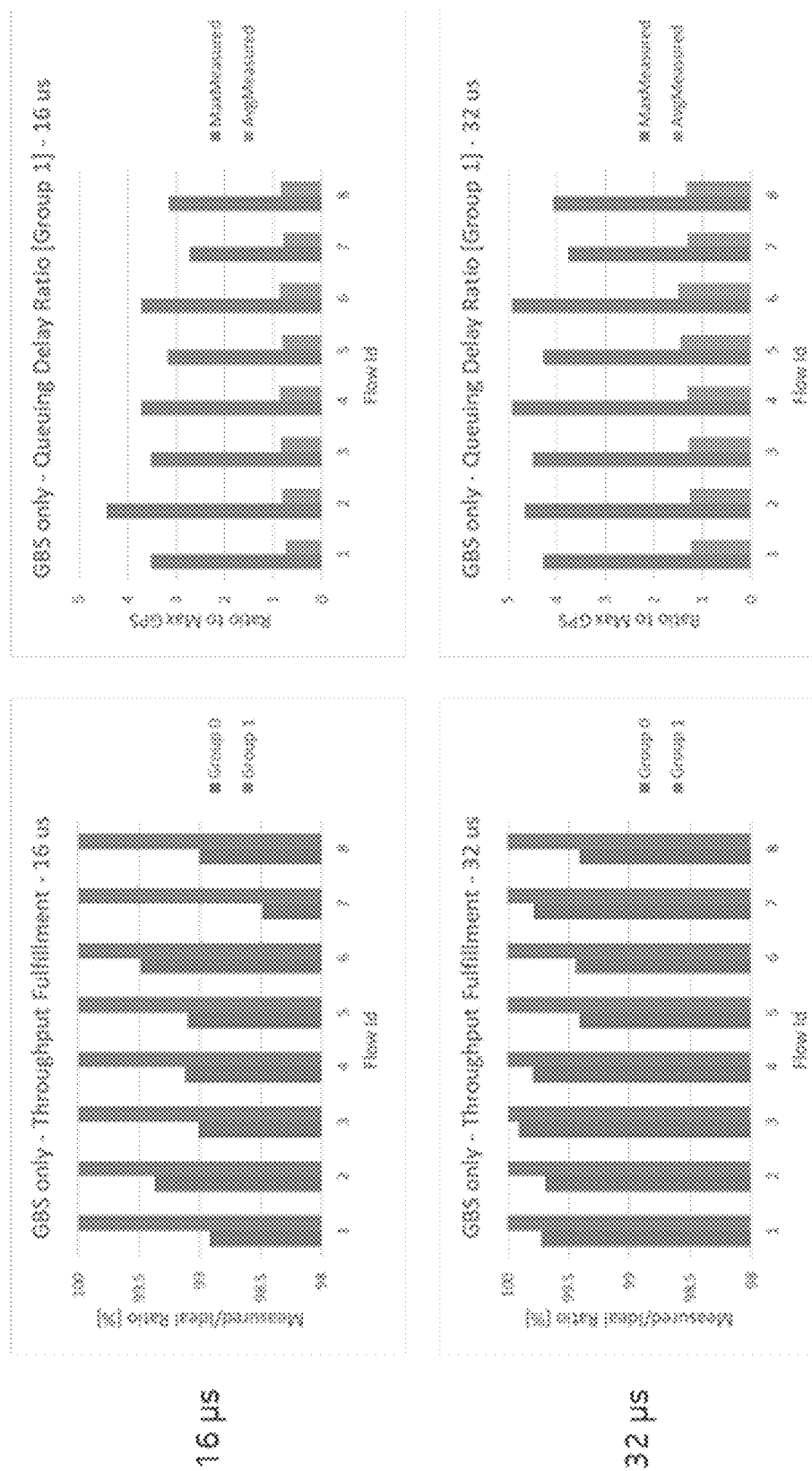
FIG. 7 illustrates the experimental results from the first simulation scenario depicted in FIG. 6.

FIG. 7 illustrates the experimental results from the first simulation scenario depicted in FIG. 6. The experiment is repeated with two different values of the timeslot duration, namely 16 µs and 32 µs. At 1 Gb/s link rate, the transmission of one frame of the scheduled flows takes 1.534*8=12.272 µs. With the 16 µs timeslot, the typical GBS visit to a queue yields one or two packet transmissions out of the queue. With 32 µs per timeslot, a typical queue visit yields between two and three consecutive packet transmissions. The periodic transmission sequence consists of 48 timeslots.

The plots on the left-hand side of FIG. 7 show the level of fulfilment of the provisioned throughput guarantee that the GBS achieves in the experiments. The results underscore the ability of the GBS configured to make scheduling decisions based on use of timeslot credits to approximate or at least closely approximate the behavior of an ideal implementation of a Sh-VC shaper. It will be appreciated that the non-work-conserving nature of the scheduler makes it impossible for a flow that misses a due service at a given time to recover that same service at a later time. Only a full-blown implementation of the Sh-VC scheduler, with per-queue timestamps and eligibility times, can avoid occasional losses of service opportunities and achieve 100% throughput for all flows. The lowest throughput fulfilment measured within the set of oversubscribed flows is a good indication of the quality of the simplified GBS implementation. Indeed, only the oversubscribed flows can miss the 100% target, because the well-behaved flows are sufficiently overprovisioned, with 5% headroom between arrival rate and provisioned service rate. The lowest throughput fulfilment level is 98.5% with 16 µs timeslots and more than 99.3% with 32 µs timeslots. The longer timeslot lowers the probability of bad synchronization between packet arrivals and the availability of service opportunities relinquished by earlier timeslots. The marginal throughput losses suffered by the oversubscribed flows (less than 1.5%) demonstrate that the 5% headroom chosen for the well-behaved flows is more than sufficient to honor their guarantees.

The plots on the right-hand side of FIG. 7 show the average and maximum delay measured for the 8 undersubscribed flows, normalized by the ideal GPS bound of Table 1. The longer timeslot causes larger delays for all flows, indicating a clear trade-off between throughput and delay performance (higher throughput comes with higher delay). The most important indication from the plots is the accuracy of the approximated GBS implementation in the enforcement of throughput and delay guarantees. Most of the delay increase is caused by the unavoidable possibility of having more than one packet served out of a queue during a GBS visit. It is expected that only the use of fixed-size packets and perfectly matching timeslot durations could eliminate this deviation from the ideal delay bound.

Figure 8:
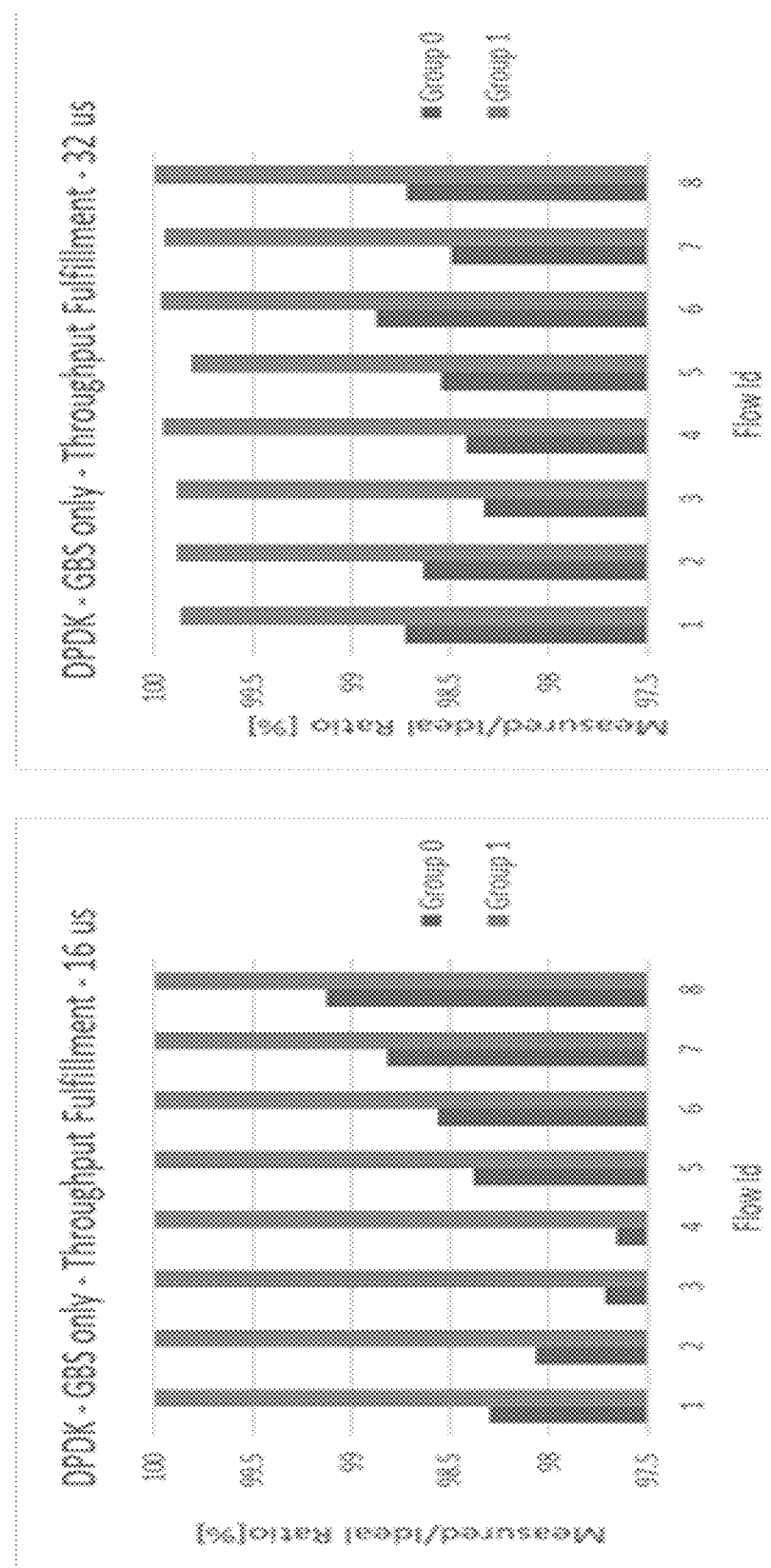
FIG. 8 shows throughput measurements from a Data Plane Development Kit (DPDK) implementation of a 1 Gb/s timeslot-credit GBS on a 10 Gb/s Intel X710-DA4 Network Interface Card (NIC)

FIG. 8 shows throughput measurements from a DPDK implementation of a 1 Gb/s timeslot-credit GBS on a 10 Gb/s Intel X710-DA4 NIC. The measurements are collected over a 10 s time interval, just like the 10 s simulation time used for the plots of FIG. 7. Despite the variety of differences between the simulation and actual NIC environments (not least the presence in the NIC of occasional service interruptions that are independent of the scheduler implementation and may last several packet transmission times), the results of FIG. 8 align quite well with those of FIG. 7. In a separate test where the scheduler is configured to control a 10 Gb/s Ethernet interface under the same conditions of the DPDK experiments that yields only 4.6 Gb/s throughput (the size of all packets is 160 bytes), the timeslot-credit GBS achieves 8.86 Gb/s throughput.

Figure 9:
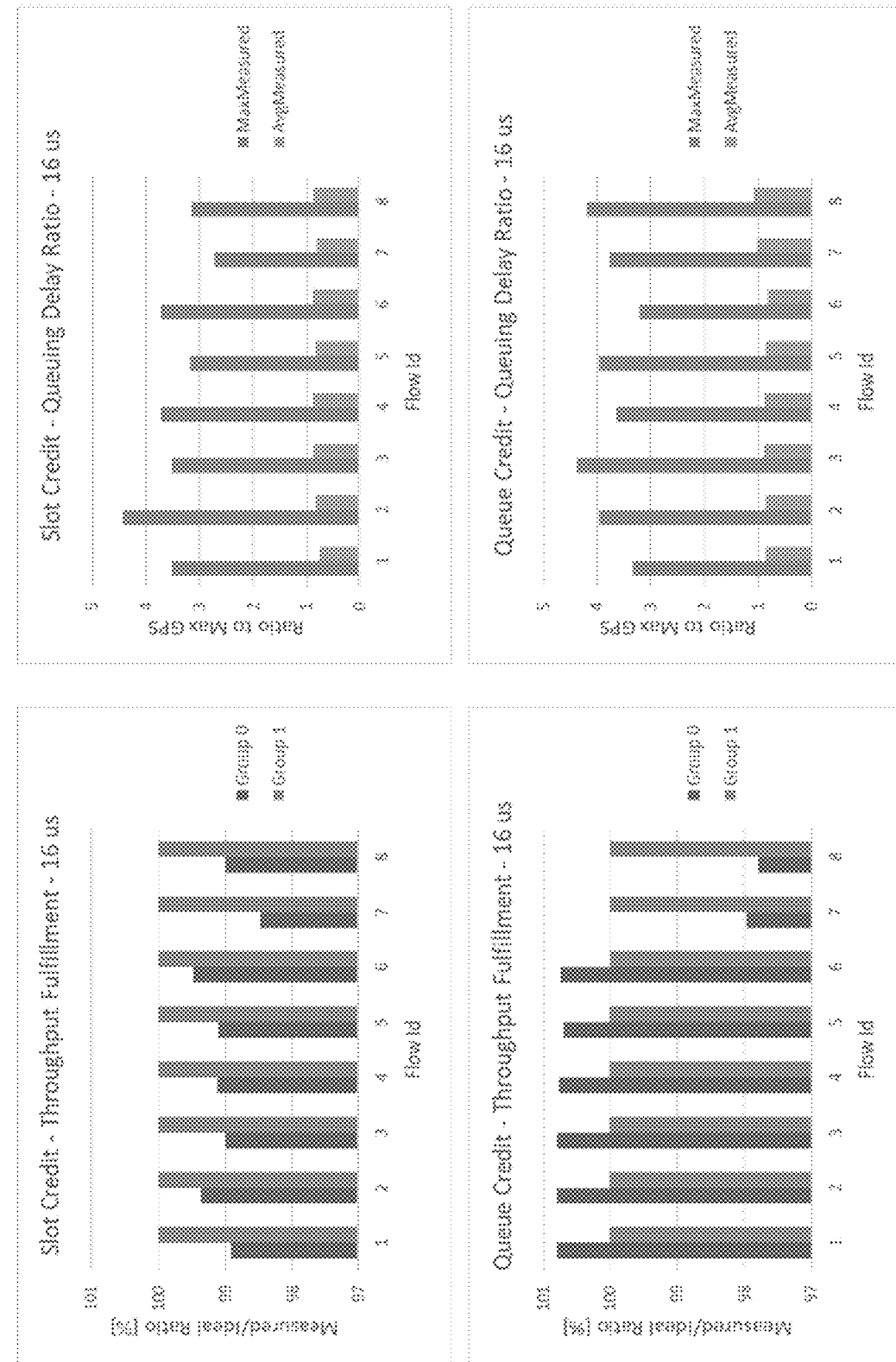
FIG. 9 compares the results of FIG. 7 (16 μs case) with those obtained with a GBS implementation that uses queue credits instead of timeslot credits.

FIG. 9 compares the results of FIG. 7 (16 µs case) with those obtained with a GBS implementation that uses queue credits instead of timeslot credits. The packet arrival patterns are identical in the two cases. The performance of the well-behaved flows is practically the same with the two implementations: the scheduling headroom ensures that the service rate matches the packet arrival rate and yields similar delay distributions. Instead, the treatment of the oversubscribed flows is qualitatively very different between use of queue credits and use of timeslot credits. First, the queue credit version serves some of those flows at higher rates than the allocated service rates of the flows. This violates the definition of the non-work-conserving scheduler (or "traffic shaper") that may be approximated by a scheduler configured to make scheduling decisions based on use of timeslot credits. Allowing flows to transmit packets faster than their configured shaping rates can compromise the end-to-end QoS guarantees of other flows that share downstream network links with the over-served flows and forces the deployment of more costly network nodes if the same guarantees remain to be attained. Second, the distribution of throughput fulfilment levels is much less uniform in the queue credit case, expressing the type of service unfairness that was expected from the discussion of FIG. 3.

Figure 10:
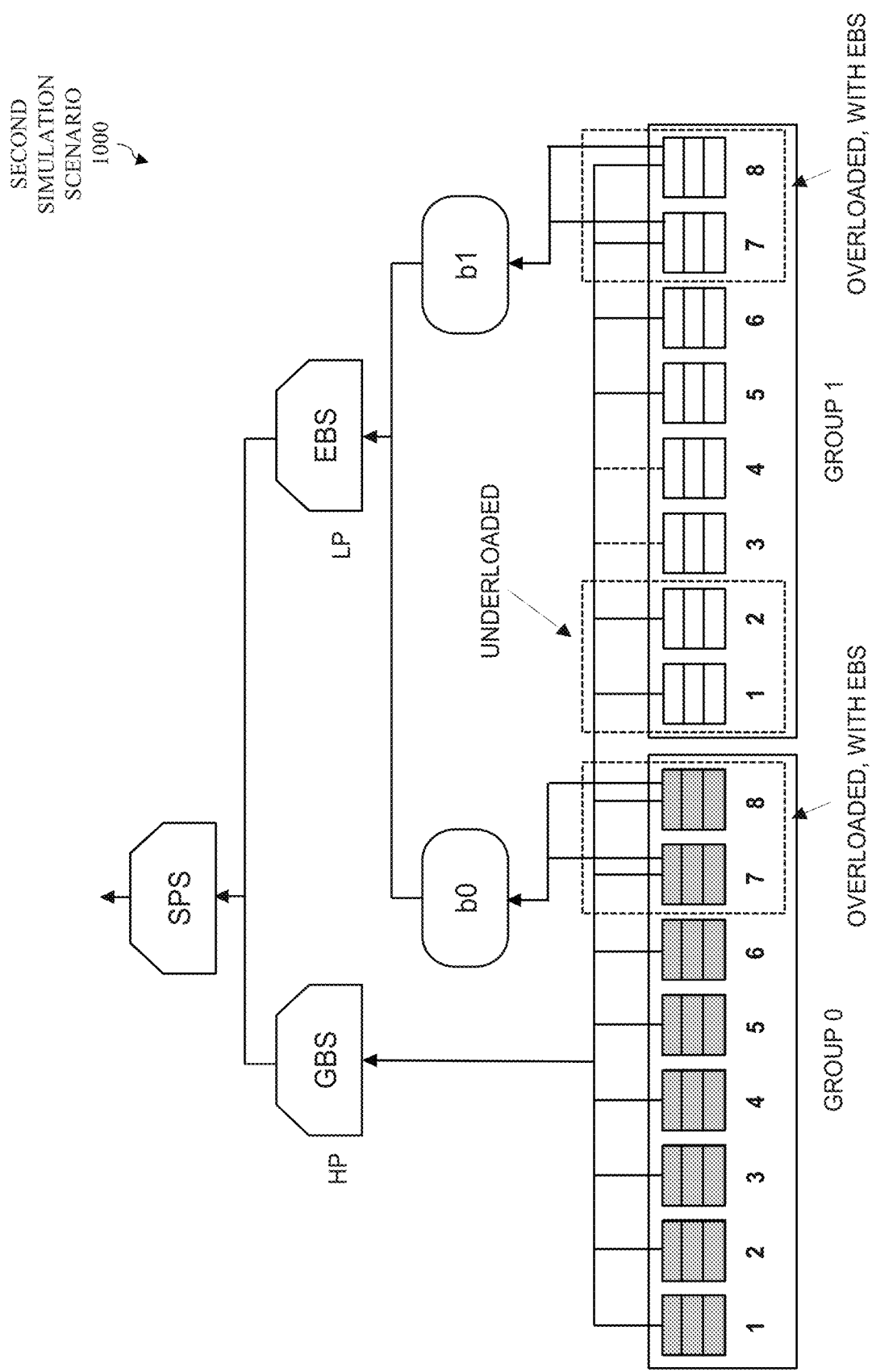
FIG. 10 depicts a second simulation scenario where a GBS configured to make scheduling decisions based on use of timeslot credits is working in conjunction with an excess bandwidth scheduler (EBS) that distributes excess bandwidth according to a hierarchical partition.

FIG. 10 depicts a second simulation experiment where the GBS configured to make scheduling decisions based on use of timeslot credits is no longer working in isolation, as in the first experiment, but in conjunction with an EBS that distributes excess bandwidth according to a hierarchical partition. FIG. 10 illustrates the queuing structure and scheduling configuration for the second simulation scenario 1000. Namely, the scheduler includes a hierarchical EBS component that visits the queue bundle b0 twice as frequently as the queue bundle b1. Within each group of queues, queues 1-6 are served exclusively by the GBS. Queues 7 and 8, instead, can also receive service from the EBS. The EBS hierarchy is such that Queues 7 and 8 in Group 0 are served by the EBS twice as frequently as Queues 7 and 8 in Group 1.

shows the absolute throughput measured for the flows of the 16 queues (left-hand plot) and the ratio between the measured throughput and the throughput that is expected based on the flow arrival rates and the scheduler configuration (right-hand plot). The expected throughput is derived from the bandwidth that the GBS transfers to the EBS and the hierarchical configuration of the EBS. The Throughput fulfilment plot of FIG. 11, never lower than 99.45%, testifies to the accuracy of the GBS-EBS pair in distributing service per their configuration. Most prominently, the GBS-EBS pair manages to distribute excess bandwidth in a way that is independent of the GBS rate configuration. This way of handling the distribution of excess bandwidth is not achievable with a plain WFQ or WF2Q scheduler. The configuration of the GBS to make scheduling decisions based on use of timeslot credits enables flexible distribution of excess bandwidth, because it simplifies the realization of the GBS-EBS pair without compromising the accuracy of the GBS component.

Figure 11:
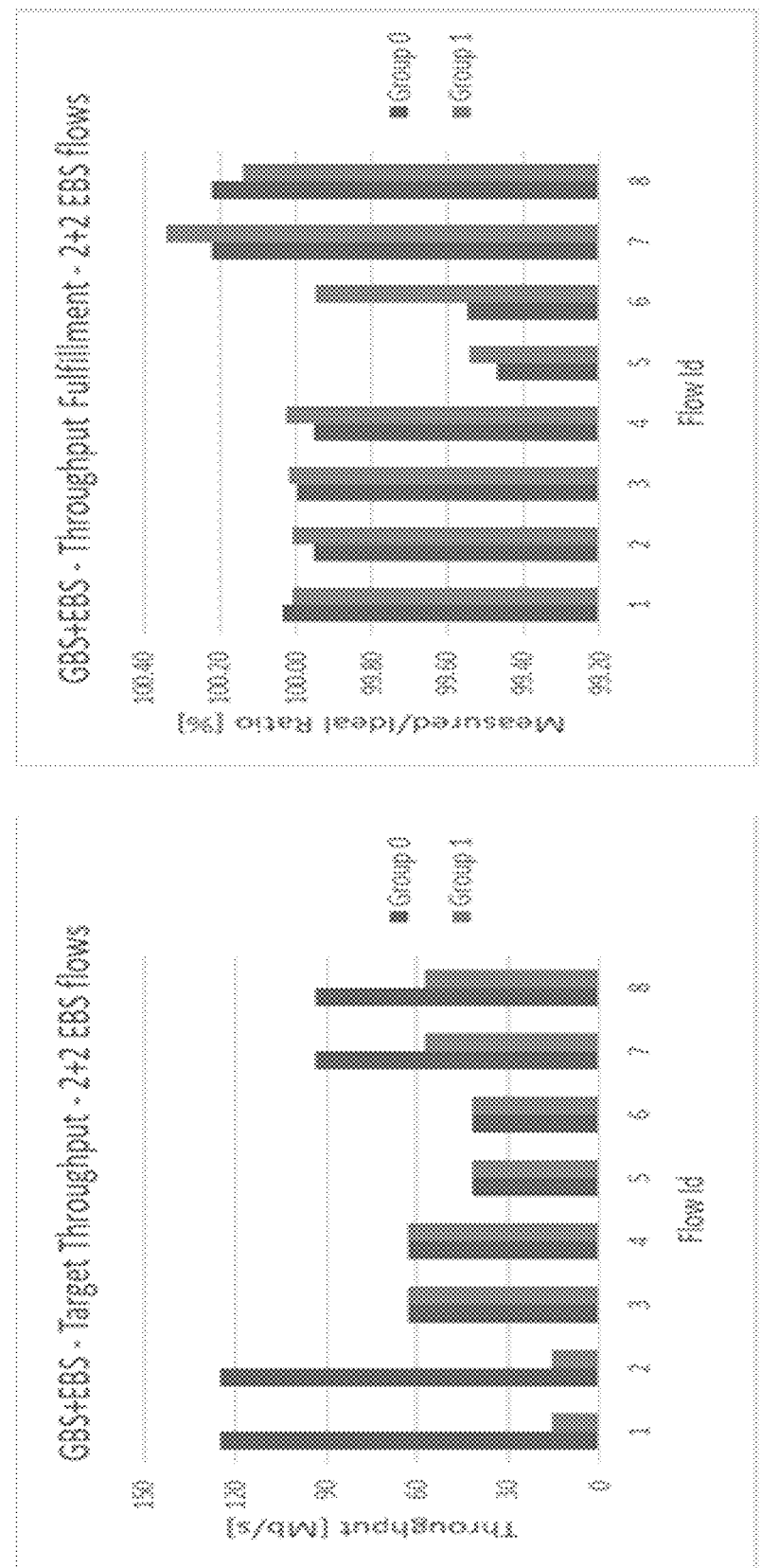
FIG. 11 illustrates the experimental results from the second simulation scenario depicted in FIG. 10.
Figure 12:
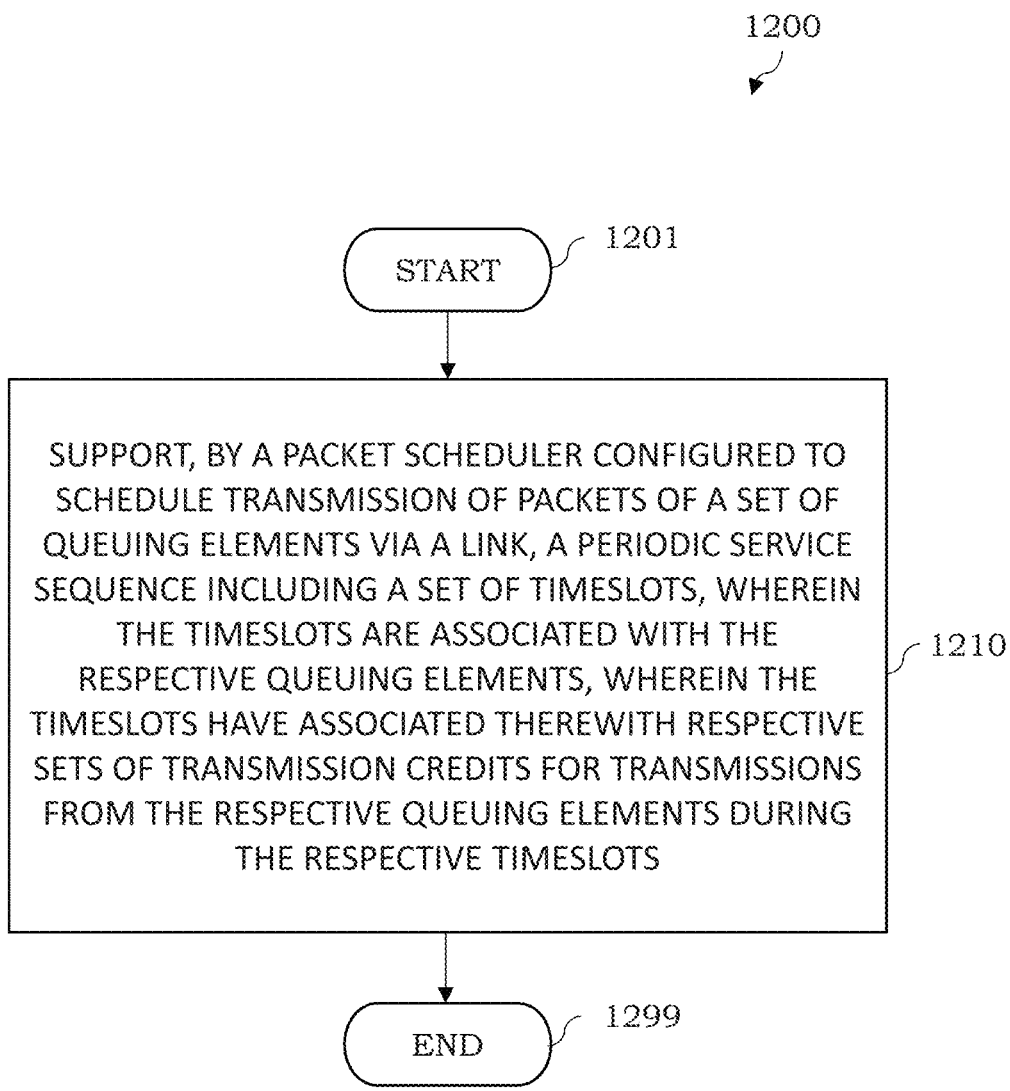
FIG. 12 depicts an example embodiment of a method for use by a communication device for supporting packet scheduling based on association of transmission credits with timeslots of a periodic service sequence.

FIG. 12 depicts an example embodiment of a method for use by a communication device for supporting packet scheduling based on association of transmission credits with timeslots of a periodic service sequence. It will be appreciated that, although primarily presented as being performed serially, at least a portion of the functions of method 1200 may be performed contemporaneously or in a different order than as presented with respect to FIG. 12. At block 1201, method 1200 begins. At block 1210, support, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots. At block 1299, the method 1200 ends. It will be appreciated that various aspects of FIGS. 1-11 may be incorporated within the method 1200 of FIG. 12.

Figure 13:
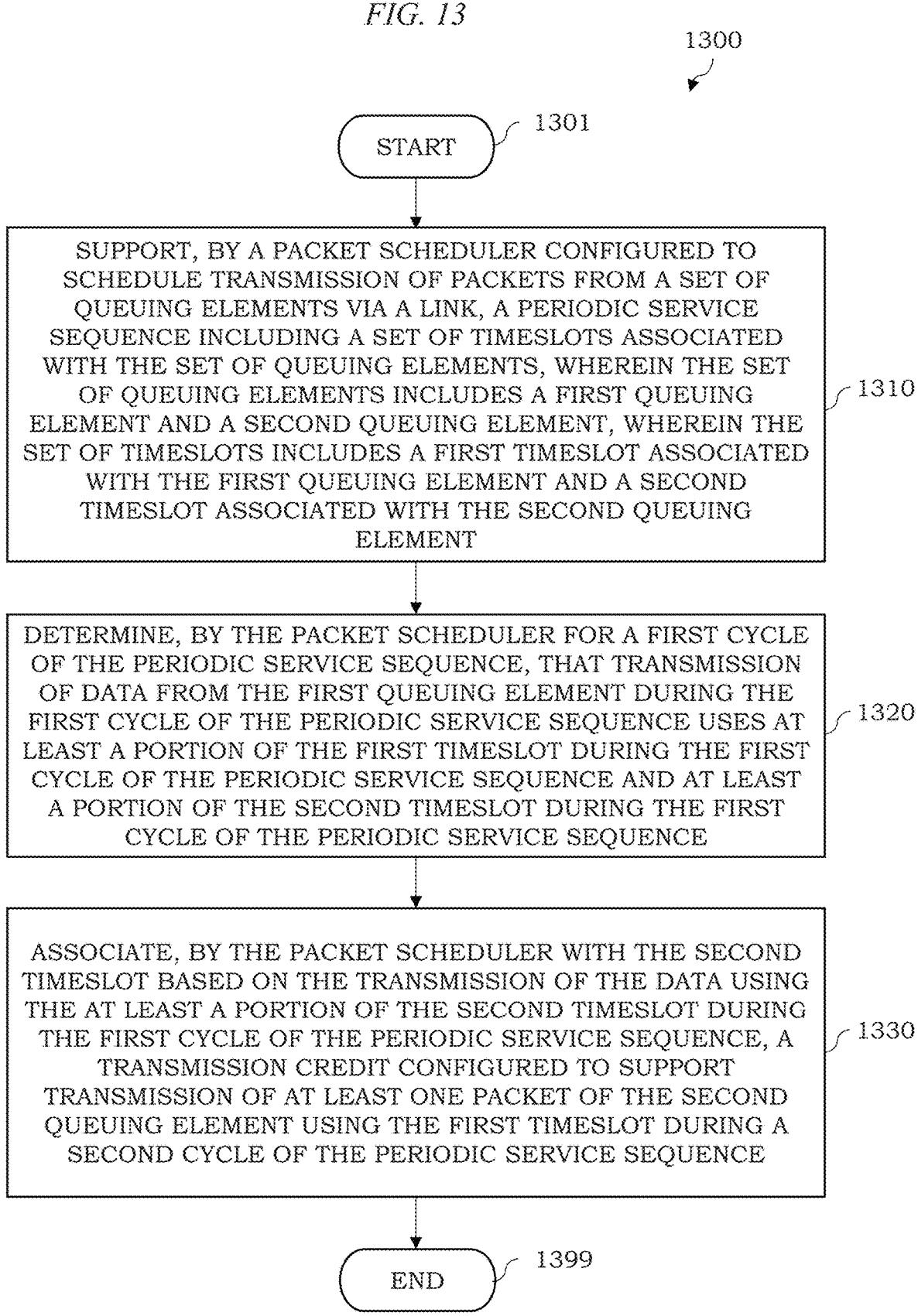
FIG. 13 depicts an example embodiment of a method for use by a communication device for supporting packet scheduling based on association of transmission credits with timeslots of a periodic service sequence.

FIG. 13 depicts an example embodiment of a method for use by a communication device for supporting packet scheduling based on association of transmission credits with

TABLE 2

| | Group 0 | | | | Group 1 | | | |
|---|---|---|---|---|---|---|---|---|
| Flow ID | GBS Rate [Mb/s] | EBS Queue Weight | Arrival Rate [Mb/s] | GPS Max Delay [µs] | GBS Rate [Mb/s] | EBS Queue Weight | Arrival Rate [Mb/s] | GPS Max Delay [µs] |
| 1,2 | 125 | 0 | 187.582 | N/A | 125 | 0 | 15.633 | N/A |
| 3,4 | 62.5 | 0 | 93.792 | N/A | 62.5 | 0 | 93.792 | N/A |
| 5,6 | 41.666 | 0 | 62.528 | N/A | 41.666 | 0 | 62.528 | N/A |
| 7,8 | 20.833 | 1 | 312.64 | N/A | 20.833 | 1 | 312.64 | N/A |

Table 2 shows the flow arrival rate and configured scheduling parameters for the queues of FIG. 10. The EBS visits the queues of Group 0 twice as frequently as the queues of Group 1 (the configuration item that controls the hierarchical partition of bandwidth is not shown in the table). The arrival rate at Queues 1 and 2 in Group 1 is much lower than the provisioned scheduling rate. The arrival rate of Queues 7 and 8 in both groups is much higher than their provisioned GBS rate. The two pairs of queues receive the services that the GBS hands to the EBS due to the low arrival rate to Queues 1 and 2 of Group 1.

FIG. 11 illustrates the experimental results from the second simulation scenario depicted in FIG. 10. FIG. 11 timeslots of a periodic service sequence. It will be appreciated that, although primarily presented as being performed serially, at least a portion of the functions of method 1300 may be performed contemporaneously or in a different order than as presented with respect to FIG. 13. At block 1301, method 1300 begins. At block 1310, support, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element. At block 1320, determine, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence. At block 1330, associate, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence. At block 1399, the method 1300 ends. It will be appreciated that various aspects of FIGS. 1-11 may be incorporated within the method 1300 of FIG. 13.

Various example embodiments presented herein may be configured to provide an implementation of a scheduling hierarchy where the complexity of finding the next packet to transmit for a queue with bandwidth, delay, and jitter guarantees is independent of the depth and width of the scheduling hierarchy, and the complexity of finding the next packet to transmit for a queue without guarantees only grows linearly with the depth of the hierarchy (i.e., the time complexity of this search is O(D) where D is the depth of the hierarchy). These features not only eliminate the dependency of the overall complexity on the width of the hierarchy, but also prevent the complexity of the hierarchy from compromising the QoS guarantees of queues that have explicitly specified delay and jitter requirements. Various example embodiments presented herein may be configured to provide a simple building block for easy construction of flexible scheduling hierarchies, where any bandwidth in excess of the minimum guarantees is distributed per criteria that can be configured independently of the minimum guarantees. Various example embodiments presented herein may be configured to utilize an as-a-Service model for concurrent configuration of the scheduling hierarchy by independent network link tenants. These and various other example embodiments, as well as associated advantages or potential advantages of example embodiments presented herein, may be further understood by first considering various aspects of networking, network virtualization, packet scheduling, or the like, as well as various combinations thereof.

Network virtualization has established a new paradigm for the instantiation of network functions where monolithic network appliances made of custom hardware and specialized embedded software are replaced by general-purpose hardware loaded with portable software. A primary benefit of this architectural shift is the increased flexibility in the realization of network functions, because feature differentiation and expansion can now be achieved entirely through new software releases and are no longer hindered by the slower design lifecycle of hardware platforms. A second effect of the shift is a radical change in the marketing model for network functions. Instead of purchasing hardware with massive up-front costs and uncertain returns, communication service providers (CSPs) can now subscribe to network function services and pay for them using the revenues that they extract concurrently from their own subscribers.

Network functions that can be marketed by such Network-as-a-Service (NaaS) model include well-identified building blocks of standard network architectures, such as the functional components of the 5G radio access network (RAN): the radio unit (RU), the distributed unit (DU), the centralized unit (CU), and the RAN intelligent controller (RIC). However, the same model can also be extended first to functions that are found generally in any network, such as routing, admission control, and packet scheduling, and then to finer-grained network capabilities that can be activated exclusively for the network flows of selected applications. Offering control of such network capabilities directly to application providers, without requiring CSP involvement, is another benefit of the NaaS model.

Packet scheduling is the network function in charge of selecting the next packet to be transmitted over the network link and is essential to the enforcement of QoS guarantees in network links that may become oversubscribed while in operation. Scheduling-as-a-Service (ScaaS) is the packet scheduling instantiation of the NaaS model. It allows CSPs to dynamically add scheduling features for support of QoS guarantees at the service level, and application providers to customize and fine-tune scheduling capabilities at the granularity of individual flows, activating them only when they are needed, i.e., when the application is running.

Hierarchical scheduling is commonly deployed in packet networks for segregating link bandwidth resources based on topological or administrative criteria. An example of bandwidth segregation based on topological criteria is found in the ingress line cards of multi-stage packet switches. The line card transmits packets to the switch fabric (the center stage of the multi-state switch) over a single interface. In order to avoid the Head-of-Line (HoL) blocking effect, the ingress line card queues packets destined for different egress line cards into separate Virtual Output Queues (VOQs). The top layer of the line card scheduler serves the VOQs based on their nominal bandwidth allocations and on the level of congestion reported by the switch fabric and the egress line cards. Within each VOQ, multiple service priorities can be established through a set of traffic classes. Each traffic class can be associated with a single FIFO queue, or with a set of queues associated with end-to-end flows, where each queue may be associated with a bandwidth allocation. In such an arrangement, every time the switch fabric interface is available for a packet transmission the VOQ scheduler selects the next VOQ that should send a packet over the interface. The priority scheduler of the VOQ then selects the traffic class that should consume that transmission opportunity, and finally the scheduler of the traffic class identifies the flow queue from which the head packet should be extracted for transmission.

An example of bandwidth segregation based on administrative criteria can be found in the Smart Network Interface Cards (NICs) of the servers of a data center. In a public-cloud data center, virtual switching networks can be used to enforce traffic isolation between data center tenants. Individual tenants may run multiple services over network slices within their virtual networks. A physical server may host multiple virtualized compute units (virtual machines or containers) for each service, and each compute unit may terminate multiple traffic flows. Each of these levels of traffic isolation may require some degree of bandwidth segregation, which translates into a corresponding layer added to a scheduling hierarchy.

Various example embodiments presented herein may be configured to provide a simple model for efficient realization of such virtually unconstrained hierarchies, where efficiency is expressed by the link throughput that a given level of compute power can sustain. In order to fulfill the flexibility and efficiency promises of the ScaaS model, a virtualized hierarchical scheduler generally will offer a broad variety of hierarchy combinations, with virtually no restrictions on the depth of the hierarchy (number of scheduling layers) and on the width of each layer (number of child nodes supported by each scheduling node in the hierarchy). Various example embodiments presented herein, by supporting flexible scheduling hierarchies, overcome various limitations of scheduling hierarchies that would otherwise be built with fixed depth, width, and choice of scheduling nodes.

Various example embodiments presented herein may be configured to provide a new approach for efficient implementation of a virtualized hierarchical scheduler, to be implemented in custom hardware or offered as a service over general-purpose hardware platforms. After deploying the scheduling hierarchy like any other virtualized network function, CSPs can dynamically reconfigure it as new services and network slices are added to the network. Through a dedicated interface, application providers can also add their own layers and scheduling nodes to the hierarchy, for better support of their applications and without compromising the performance guarantees previously established for other services and applications. Various example embodiments may be configured to support a virtually unlimited set of hierarchy layouts with respect to scheduler types, depth of the hierarchy, and width of each hierarchical layer. It will be appreciated that these and various other example embodiments for providing hierarchical schedulers may be further understood by first considering various aspects of hierarchical schedulers in general.

A hierarchical scheduler generally is composed of a set of scheduling nodes arranged in a tree topology. The root of the tree is the top-layer scheduler that controls the distribution of the overall link bandwidth. The leaves of the tree are the queues that contain the packets waiting for transmission. The distance between the leaves and the root node may not necessarily be the same for all the leaves. A scheduling path is a sequence of scheduling nodes that are hierarchically connected. The length of a path is the number of scheduling nodes it contains. The longest path defines the depth D of the hierarchical scheduler. The maximum number of child nodes (or leaves) that one scheduling node can handle defines the width W of the hierarchical scheduler. The hierarchical scheduler is used to make scheduling decisions, where a hierarchical scheduling decision combines decisions made sequentially by the nodes in the hierarchy, starting from the root node and continuing until a non-empty leaf is found.

In an ideal realization of a hierarchical scheduler, every node in the hierarchy can be instantiated as one of the following scheduler types: First-In-First-Out (FIFO), Strict Priority (SP), Weighted Round Robin (WRR), or simply Round Robin (RR) when weights are not used for service differentiation, Weighted Fair Queuing (WFQ), Worst-case-Fair Weighted Fair Queuing (WF2Q), and possibly others. Also, the depth and width of the ideal hierarchy are virtually unlimited (e.g., large numbers of scheduling layers and children nodes per parent scheduling node). Most practical scheduler hierarchies, however, are limited to a fixed, relatively small depth and a fixed maximum number of children nodes per layer, typically different for each layer. An example of such rigid realization of the scheduling hierarchy is the default scheduling structure of the Linux Foundation's Data Plane Development Kit (DPDK). The default DPDK scheduler consists of four layers where each scheduling node can be configured as either a WRR or an SP scheduler and each node (including the leaves) is associated with a traffic shaper (either single-rate or dual-rate) to limit the amount of consecutive packets that can be extracted from the node during a single visit by its parent node.

Existing solutions for the implementation of hierarchical schedulers generally lack flexibility in the configuration of the hierarchy (choice of depth, width, and types of scheduling nodes) and efficiency in the execution of the scheduling decision. The lack of efficiency is a primary reason for the lack of flexibility, because it imposes limits on the two dimensions of the hierarchy. The inefficiency of the hierarchy generally originates from the inefficiency of realization of its most complex nodes, namely the WFQ and WF2Q schedulers. The primary reason for the complexity of existing WFQ and WF2Q implementations is the fundamental assumption that only non-empty queues (or child nodes: for simplicity of presentation, child nodes are referred to as queues in the remainder of the present disclosure) should be included in the search for the next queue to be served. In other words, the current state of occupancy of the queues served by the scheduler contributes the majority of the scheduling complexity when it is included in the set of conditions that drive the operation of the scheduler.

In a WFQ scheduler, the order of queue selection is typically determined by per-queue timestamps that express the latest time that the non-empty queues can tolerate until they receive the next service visit from the scheduler. The next queue to be visited is the one with the smallest timestamp. The WF2Q policy adds a notion of eligibility that restricts the set of timestamps to be considered for selection. The ineligible timestamp of a non-empty queue may become eligible at any increment of the scheduler's time reference. In a WFQ scheduler that serves N queues, the complexity of sorting the timestamp is $O(\log_2 N)$ if the sorting is done with a binary tree. Lower complexity can be achieved with alternative sorting structures like a calendar queue; however, any simplification of the sorting structure introduces restrictions to the range of configurable service rates and degradations of the delay guarantees. The eligibility condition of WF2Q adds complexity to the plain binary tree implementation and also to its possible simplifications.

Since conventional WFQ and WF2Q implementations only consider non-empty queues for selection, a queue is removed from the timestamp sorting structure when it becomes empty and added again when it receives the next packet. The insertion of a previously empty queue in the sorting structure must be done at the right position given the state of occupancy and service of all other queues. The new queue should be served not too late, in order not to violate its QoS guarantees, and not too early, in order not to violate the QoS guarantees of the other queues. The insertion in the sorting structure is done using a queue variable (the timestamp) that tracks the amount of service received so far by the queue. The timestamp is computed based on another variable (called the virtual time or the system potential) that tracks the service received so far by all other queues. The timestamp is yet another variable that keeps changing with time, together with its eligibility condition and the queue occupancy state. The overall scheduling complexity results from the continuous evolution of the variables that control the scheduling decision before it is made. The scheduling parameters (service rate) and variables (timestamp) also occupy space in memories that have to be accessed at line-rate speed in order not so slow down the transmission rate of the link. Such memories generally are very expensive in high-end chipsets for packet switching. Their cost may limit the number of queues that a WFQ or WF2Q scheduler can support.

It is noted that a fundamental result from the theory of hierarchical schedulers states that the delay guarantees of a leaf in a hierarchy can be accurately enforced only if the scheduling path between the leaf and the root node is made entirely of WF2Q nodes (possibly with the exception of the lowest node, which can be a WFQ scheduler if all leaves do not have jitter requirements). This condition compounds the complexity of each scheduling layer into the overall complexity of the scheduling hierarchy. The reason is that the head packet of every node in the hierarchy can only be determined at the time of the scheduling decision, because of the effect of the eligibility condition of WF2Q on the identification of the next packet to be served by each node, at each layer in the hierarchy.

The scheduling decision starts with setting the time reference for the eligibility of all queues in the hierarchy. The scheduler must identify the candidate packet for every node at the bottom of the hierarchy, and gradually move up through the hierarchy to find the target queue for the root node. While logically the scheduling decision propagates from top to bottom, in practice the information (packet length) needed for the timestamp calculation and determination of the eligibility condition at the intermediate nodes must travel from the bottom to the top of the hierarchy. The amount of processing steps needed to complete the hierarchical decision increases linearly with the depth D of the hierarchy and logarithmically with its width W (formally, the time complexity of the scheduler is O(D log W)). This is why existing scheduling hierarchies are tightly limited in flexibility, restricting the overall depth of the hierarchy and the number of WFQ and WF2Q nodes that can be found in it. Additionally, another problem with conventional WFQ/WF2Q schedulers is the coupling of the throughput guarantees with the criterion for distribution of bandwidth in excess of those guarantees. If, for example, a WFQ/WF2Q scheduler has allocated 50% of its capacity to two queues, with a 40% allocation to the first queue and 10% to the second, it can only distribute the remaining 50% proportionally to the two allocations (40% to the first queue, 10% to the second). If the two queues are receiving packets at higher rate than the bandwidth available to the scheduler, the first queue will receive service at 80% of the scheduler bandwidth and the second queue at 20%. It would be much better, instead, if the owner of the scheduling hardware or ScaaS subscriber could freely choose how to distribute the bandwidth in excess of the minimum throughput guarantees based on criteria that are independent of those guarantees (e.g., in equal shares for the two queues, so that in the above example the first queue ends up with 65% of the scheduler bandwidth and the second queue receives a 35% share).

In a hierarchical scheduler that includes WF2Q schedulers at every layer of the hierarchy (such an arrangement typically is strictly necessary for the enforcement of tight delay and jitter guarantees), every WF2Q node requires an efficient sorting structure for the timestamps and for handling the eligibility condition. Whatever the structure of choice, it must be replicated for each WF2Q node in the hierarchy. The spatial (memory) cost of this requirement imposes heavy limitations on the size and flexibility of the hierarchy. Even in the optimal case where WF2Q schedulers are employed at every node of the hierarchy, the depth D of the hierarchy has linear impact on the delay guarantees that the hierarchical scheduler can enforce, because every layer in the hierarchy adds its own contribution to the overall delay.

In a virtualized realization of the hierarchical scheduler, the time complexity, which derives from the number of processing steps needed to complete the selection of a leaf node in between packet transmissions, is even more critical than the spatial complexity, because a software implementation cannot rely on parallelism for the execution of timestamp comparisons as much as a hardware implementation. Pipelining can still be utilized, but it negatively affects the accuracy of enforcement of latency guarantees and limits the depth of the scheduling hierarchy. Another way to simplify the operation of the hierarchical scheduler is to reduce the number of scheduling decisions by transmitting packets back-to-back out of the last selected queue. The default DPDK scheduler follows this approach, using token bucket shapers to limit the amount of consecutive services granted to each queue. The cost of this simplification is the high service burstiness experienced by the queues, which is detrimental in networks that aim at supporting deterministic services.

Various example embodiments presented herein, as indicated above, may be configured to overcome various limitations of existing hierarchical schedulers by providing an implementation of a scheduling hierarchy where the complexity of finding the next packet to transmit for a queue with bandwidth, delay, and jitter guarantees is independent of the depth and width of the scheduling hierarchy, and the complexity of finding the next packet to transmit for a queue without guarantees only grows linearly with the depth of the hierarchy (i.e., the time complexity of this search is O(D)). These improvements not only eliminate the dependency of the overall complexity on the width of the hierarchy, but also prevent the complexity of the hierarchy from compromising the QoS guarantees of queues that have explicitly specified delay and jitter requirements. Various example embodiments presented herein, as indicated above, also may provide a simple building block for easy construction of flexible scheduling hierarchies, where any bandwidth in excess of the minimum guarantees is distributed per criteria that can be configured independently of the minimum guarantees. Various example embodiments presented herein, as indicated above, also may enable use of the as-a-Service model for concurrent configuration of the scheduling hierarchy by independent network link tenants.

Various example embodiments presented herein may be configured to leverage scheduling decomposition first identified as a Fair Airport scheduler and subsequently adapted to distributed scheduling architectures for multi-stage packet switches. In a Fair Airport scheduler, a non-work-conserving WF2Q scheduler (also referred to as a shaper) takes care of enforcing throughput, delay, and jitter guarantees, and a second scheduler with minimal complexity distributes bandwidth in excess of the throughput guarantees according to an independent criterion. The shaper may be called the GBS and the secondary scheduler may be called the EBS. An example was previous depicted in FIG. 2. As depicted in FIG. 2, an SPS serves the GBS and the EBS, giving high priority (HP) to the GBS and low priority (LP) to the EBS. A packet queue can generally be served by both schedulers, but practical configurations may exist where a queue is served exclusively by the GBS (the queue has no access to excess bandwidth) or exclusively by the EBS (the queue has no throughput, delay, and jitter guarantees). Various example embodiments may be configured to apply the Fair Airport decomposition to the realization of the scheduling hierarchy with the exception that, instead of decomposing every node in the hierarchy into a distinct GBS-EBS pair, a single GBS instance is combined with a hierarchy of EBS nodes. A primary benefit of using a single GBS instance is the reduction of the delay and jitter guarantees to the values enforced by that instance, as opposed to the accumulation of per-layer contributions that might otherwise occur if each node in the hierarchy were to be decomposed into a distinct GBS-EBS pair.

Various example embodiments presented herein, as indicated above, may be configured to implement a scheduling hierarchy that improves the flexibility of its configuration and the efficiency of its operation. Various example embodiments may be configured to leverage the Fair Airport scheduling concept to decouple the scheduling for enforcement of throughput, delay, and jitter guarantees (through a GBS) from the scheduling for segregation of link bandwidth based on topological and administrative criteria (through a hierarchy of EBSs). Various example embodiments, as indicated above, are configured such that the GBS-EBS decoupling is not applied to the individual nodes of the hierarchy, but, rather, to the overall hierarchy. In other words, in such example embodiments, the overall hierarchy includes only one GBS instance instead of up to H instances, where H is the number of scheduling nodes in the hierarchy. An example is presented in FIG. 14.

Figure 14:
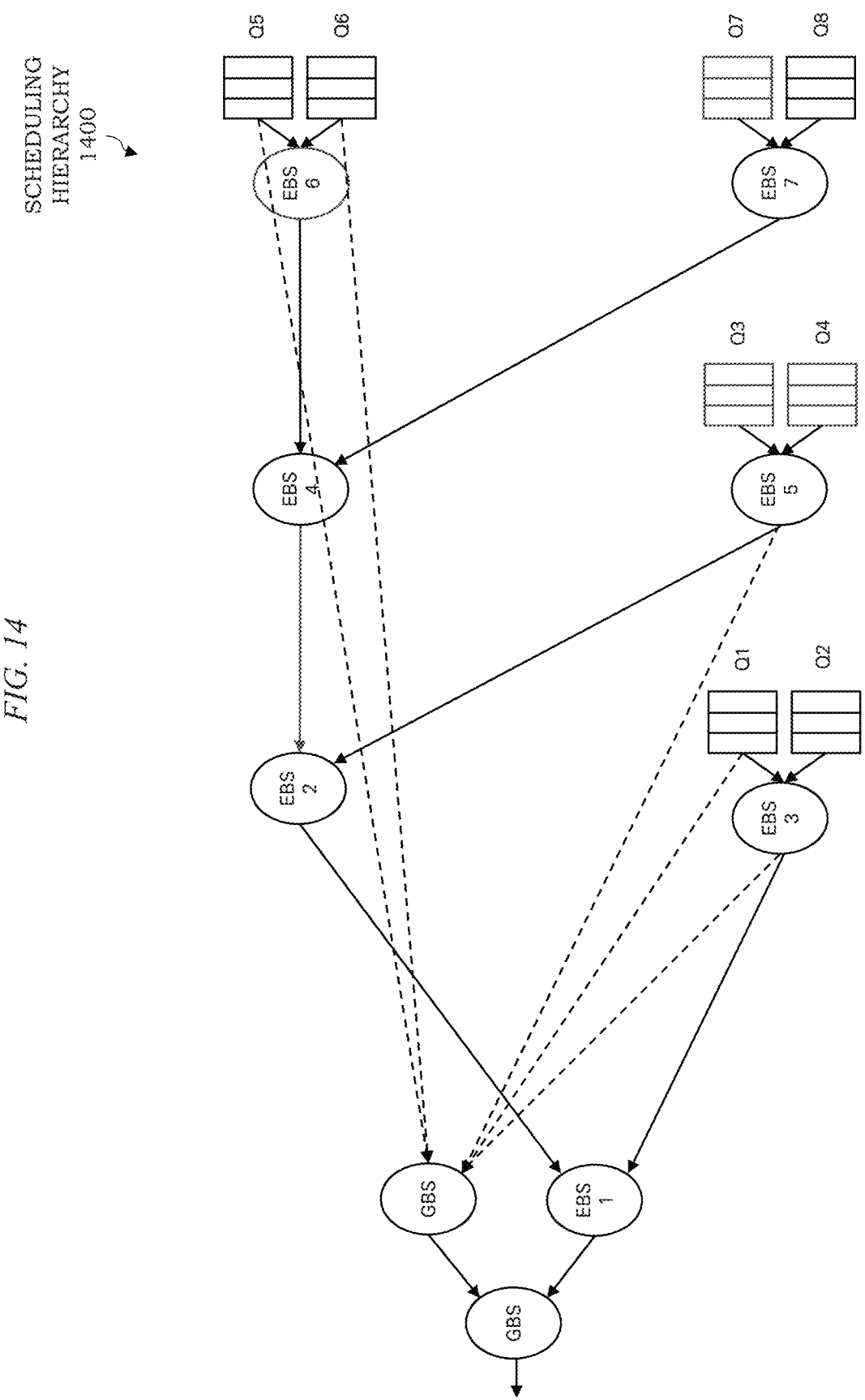
FIG. 14 depicts an example embodiment of a scheduling hierarchy including a single GBS and a hierarchy of EBSs.

FIG. 14 depicts an example embodiment of a scheduling hierarchy including a single GBS and a hierarchy of EBSs. As depicted in FIG. 14, in the scheduling hierarchy 1400, every queue (where it will be appreciated that the term "queue" refers not only to actual packet queues, but also to child nodes of a scheduling node) can receive service from the GBS, an EBS instance, or both the GBS and an EBS instance. In FIG. 14, all queues are served by an EBS instance. Additionally, some queues are also served by the GBS (illustratively, packet queues Q1, Q5, and Q6, as well as EBS nodes 3 and 5). An EBS instance that receives service from the GBS can have queues in its portion of the hierarchy tree that are also served by the GBS. It is noted that a necessary condition for proper operation of the GBS is that the sum of the service rates allocated to the queues it serves does not exceed the overall service capacity of the scheduler. It will be appreciated that the scheduling hierarchy 1400 is merely one example of a scheduling hierarchy and that various other scheduling hierarchies (e.g., in terms of depth, width, numbers of packet queues supported, numbers of EBS instances supported, arrangement of the packet queues with respect to the EBS instances, arrangement of the packet queues with respect to the GBS, arrangement of the EBS instances with respect to each other, arrangement of the EBS instances with respect to the GBS, or the like, as well as various combinations thereof) may be supported.

The GBS of the scheduling hierarchy may be implemented in various ways. In one example embodiment, the GBS may be implemented as a conventional Shaped Virtual Clock (Sh-VC) shaper with per-queue service rates and timestamps. In one example embodiment, the GBS may be implemented as a periodic service schedule composed of fixed-duration timeslots, where each timeslot is associated with a single GBS queue (or no queue at all) and the association does not depend on the occupancy state of the queue.

Figure 15:
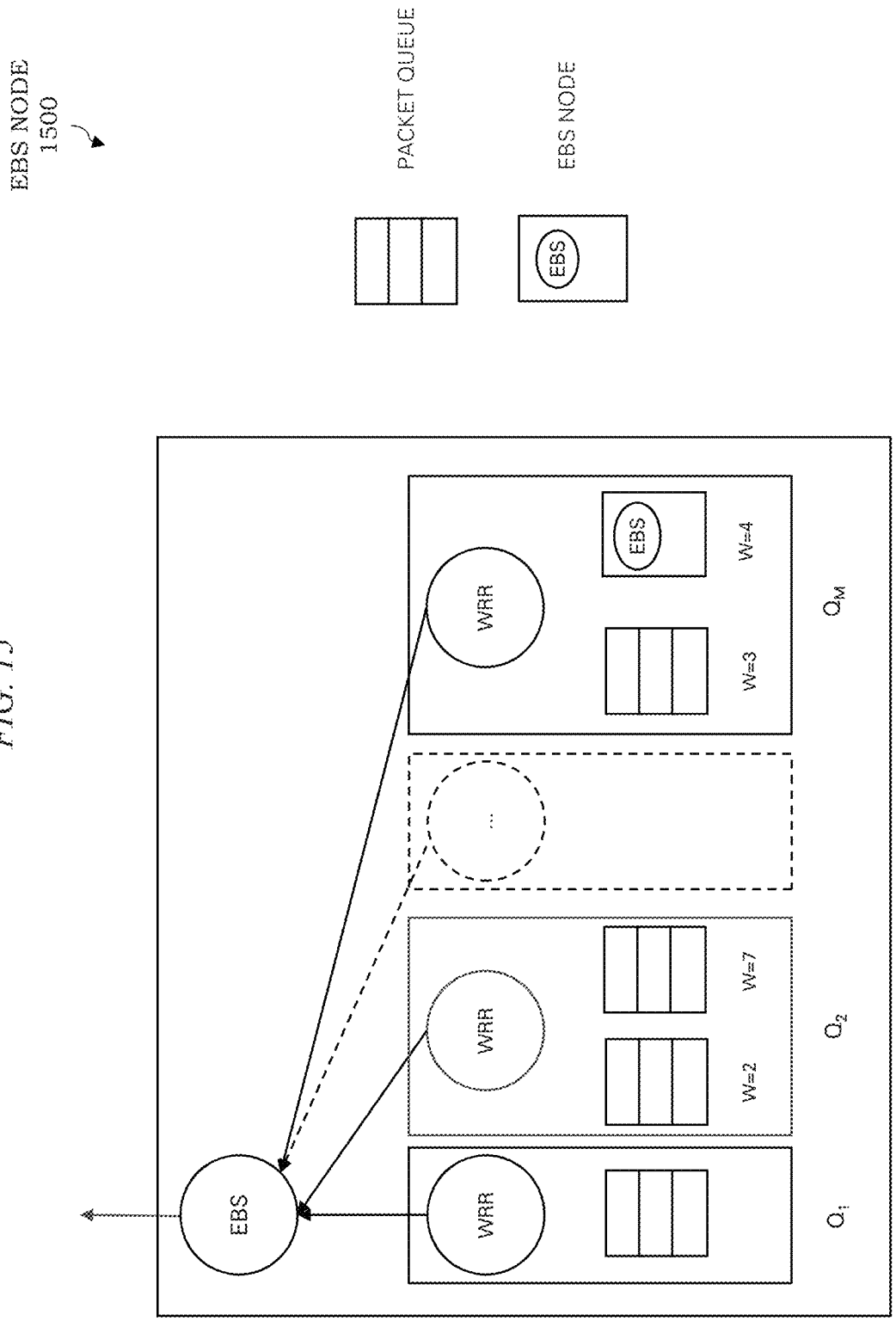
FIG. 15 depicts an example embodiment of an EBS node for use in a scheduling hierarchy.

The EBS node of the scheduling hierarchy may be implemented in various ways. In one example embodiment, as depicted in FIG. 15, the EBS node 1500 consists of a set of M queues that are served in strict-priority order (queue $Q_1$ has the highest service priority and $Q_M$ has the lowest). Every queue in the array consists of a Weighted Round Robin (WRR) scheduler that serves one or more queues. A queue served by a WRR scheduler may be a packet queue (and therefore a leaf in the hierarchy) or an EBS node that serves up to M queues at a lower layer of the scheduling hierarchy.

The WRR of the EBS node may handle a single queue (in which case it is practically transparent to the scheduling process), multiple queues with identical scheduling weights (in which case it can be simply referred to as a Round Robin (RR) scheduler), or multiple queues with different scheduling weights. Many options exist for the implementation of the WRR scheduler. For example, one WRR embodiment for the EBS node of the scheduling hierarchy is one that provides immediate identification of the next queue to be served as soon as the EBS node has selected the queue of the WRR for the next service. It will be appreciated that a variety of WRR embodiments may be configured to provide such immediate identification and that a common feature of such embodiments is the use of a minimal set of linked lists of busy queues. Only one list is considered for service at any time and the queue at the head of that list is the next queue to be served. If the head queue is an EBS node, the head queue of that EBS node is the next queue to be served. Overall, the EBS node of FIG. 15 offers a large set of options for the distribution of excess bandwidth. The node can be configured as a FIFO queue, a plain SP scheduler, a plain WRR scheduler, or a hybrid of the three scheduler instances.

Within each EBS node, the time complexity of finding the next queue to be served is fixed (since the number of queues served in strict-priority order is small and the head queue of every WRR instance is immediately identified by the head of its linked list). Accordingly, the time complexity of finding the next EBS queue to serve grows linearly with the depth of the EBS hierarchy and is independent of its width. Furthermore, the time complexity of the individual steps of traversing the depth of the hierarchy is minimal.

Since a WRR queue also may be served directly by the GBS, the WRR linked list must be double-linked, so that a queue that becomes empty after receiving a GBS service can be removed without breaking the sequence of links. Besides bridging the gap in the WRR double linked list of a queue that becomes empty after receiving a GBS service, every EBS node must keep track of the busy/empty state of the M priority queues that it handles. When all M queues are empty, the EBS node is removed from its double linked list of busy queues in the WRR scheduler that serves it.

Various example embodiments are configured to support realization of a scheduling hierarchy that simplifies the scheduling process while enabling the extension of the depth, width, and bandwidth segregation flexibility of the hierarchy. Various example embodiments configured to support realization of a scheduling hierarchy that simplifies the scheduling process while enabling the extension of the depth, width, and bandwidth segregation flexibility of the hierarchy may be based on use of a GBS that enforces bandwidth and delay guarantees for selected queues, an EBS that distributes bandwidth left unused by the GBS and that can be used as a building block for the creation of a scheduling hierarchy that enforces topological and administrative criteria for the segregation of excess bandwidth, and an Application Programming Interface (API) that is exposed to application and service providers for independent configuration of the scheduling hierarchy.

Various example embodiments of the scheduling hierarchy may be configured to support a GBS-EBS decomposition of the scheduling hierarchy in which the scheduling hierarchy includes a single GBS and a tree of EBSs. The use of a single GBS instance for the scheduling hierarchy not only simplifies the scheduling process, because it eliminates the time-consuming cascading of GBS decisions that must be based on current state information every time a new packet transmission opportunity becomes available, but also enables the enforcement of tighter delay guarantees because the GBS services are distributed directly without traversing a multi-layer hierarchy. Additionally, having established that one GBS instance is sufficient to enforce the bandwidth and delay guarantees of all queues, independently of their placement within the scheduling hierarchy, the hierarchy itself can be built entirely out of EBS nodes. In this manner, stepping through the hierarchy for identification of the next queue to serve becomes a much faster process, because the notion of real time is irrelevant to EBS scheduling and the next queue to be served by each node does not change in between packet arrivals and departures.

Various example embodiments of the scheduling hierarchy may be configured to support scheduler flexibility. The combination of strict-priority and WRR scheduling within each EBS node, and then the ability to treat the EBS node like a plain packet queue within the strict-priority scheduler, enable a virtually infinite set of combinations for the hierarchical segregation of bandwidth. The GBS-EBS decoupling is also instrumental to the separation of the criteria for distribution of excess bandwidth from the service rate guarantees of the individual queues, which in turn enables the inclusion in the hierarchy of pure best-effort queues with no explicit bandwidth requirements (such queues do not receive GBS services, as is the case for packet queues Q2, Q3, Q4, Q7, and Q8, and EBS nodes 1, 2, 4, 6, and 7 in FIG. 14).

Various example embodiments of the scheduling hierarchy may be configured to support a Scheduling-as-a-Service (ScaaS) model. The construction of the EBS hierarchy consists of the mapping of packet queues onto the GBS and EBS nodes and the mapping of EBS nodes onto parent EBS nodes. Various example embodiments are configured to support configuration of such a scheduling hierarchy based on use of a dedicated API. The API can be made accessible to multiple parties, including communication service providers and application providers, for dynamic adjustment of the scheduling hierarchy to the scheduling requirements of their services and applications. The API backend may include admission control rules for verification of the impact of pending modifications of the scheduling hierarchy, so that the service guarantees of existing queues are not violated by the requested updates.

Figure 18:
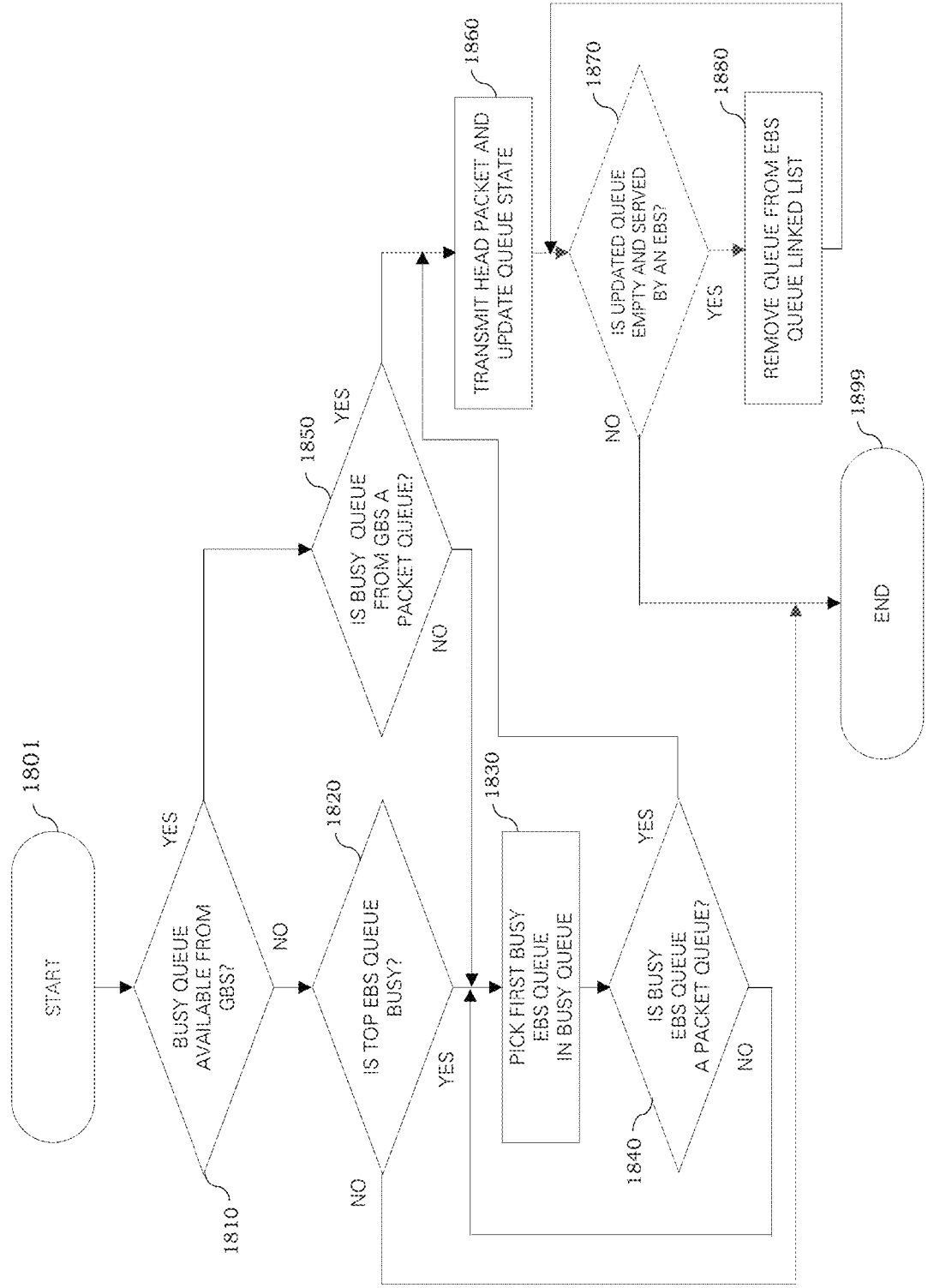
FIG. 18 depicts an example embodiment of a method for use by a scheduler having a scheduling hierarchy to handle selection of the next packet to transmit.
Figure 19:
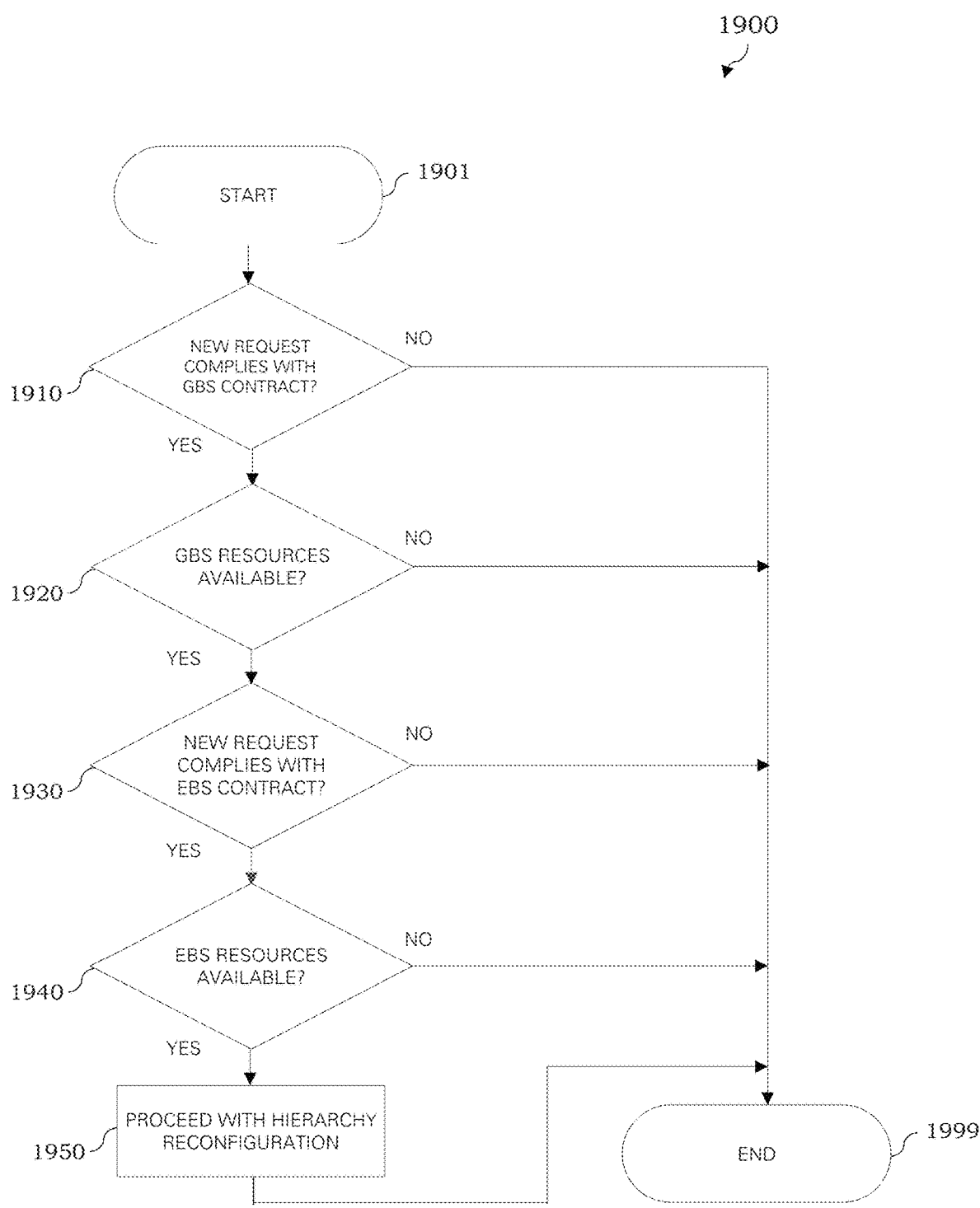
FIG. 19 depicts an example embodiment of a method for use by a scheduler having a scheduling hierarchy to handle a request for reconfiguration of the scheduling hierarchy of the scheduler.

It will be appreciated that the operation of a scheduler based on the scheduling hierarchy may be further understood by way of reference to the following methods for handling the arrival of a new packet (e.g., an example embodiment of which is presented in FIG. 17), handling selection of the next packet to transmit (e.g., an example embodiment of which is presented in FIG. 18), and handling a request for reconfiguration of the scheduling hierarchy of the scheduler (e.g., an example embodiment of which is presented in FIG. 19).

As indicated above, a scheduler having a scheduling hierarchy may be configured to handle the arrival of a new packet, handle selection of the next packet to transmit, and handle a request for reconfiguration of the scheduling hierarchy of the scheduler. An example method for supporting such functions is presented with respect to FIG. 16.

Figure 16:
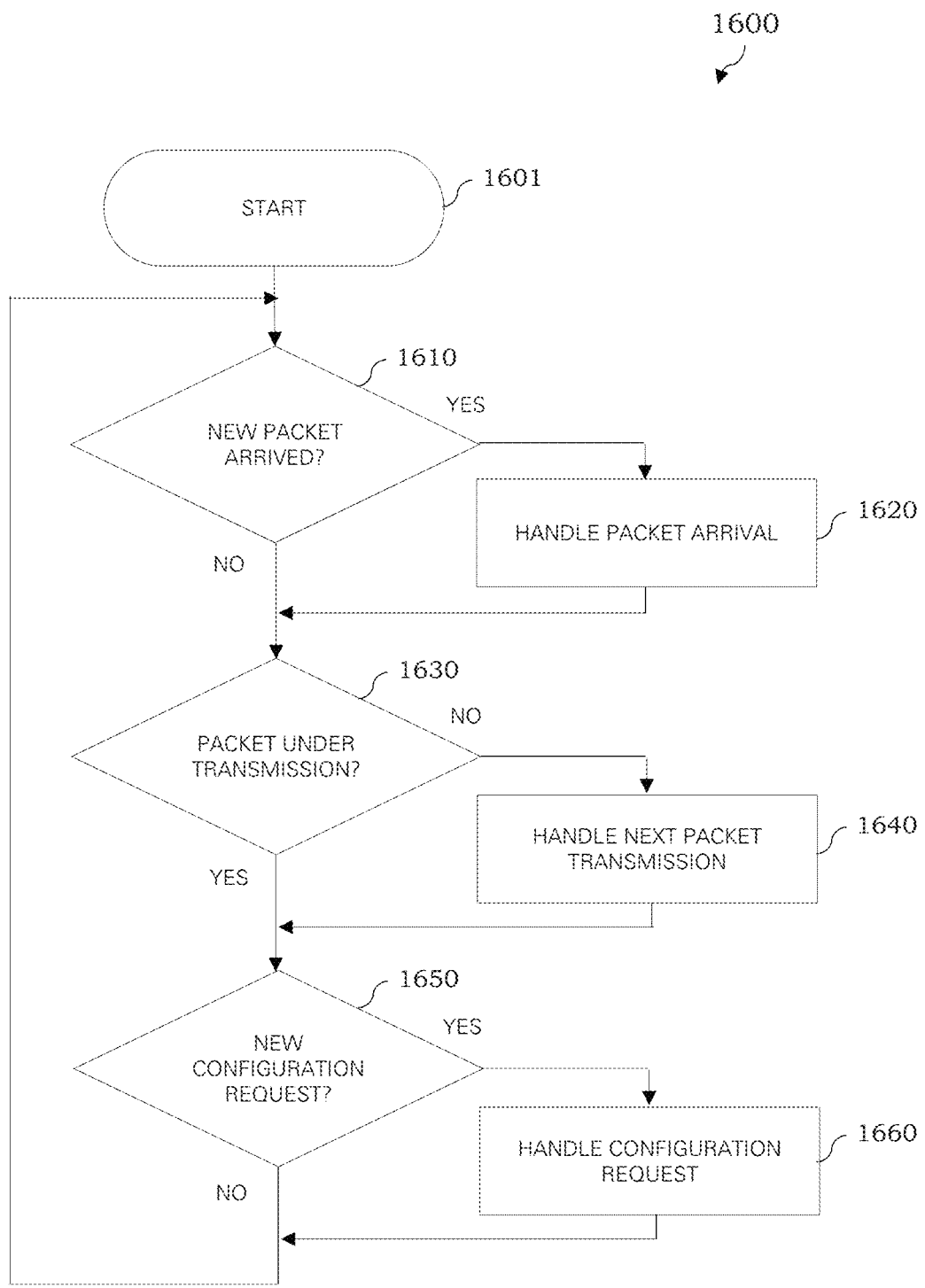
FIG. 16 depicts an example embodiment of a method for operating a scheduler having a scheduling hierarchy through methods for handling the arrival of a new packet, handling selection of the next packet to transmit, and handling a request for reconfiguration of the scheduling hierarchy of the scheduler.

FIG. 16 depicts an example embodiment of a method for operating a scheduler having a scheduling hierarchy through methods for handling the arrival of a new packet, handling selection of the next packet to transmit, and handling a request for reconfiguration of the scheduling hierarchy of the scheduler. It will be appreciated that, although primarily presented as being performed serially, at least a portion of the functions of method 1600 may be performed contemporaneously or in a different order than as presented in FIG. 16. At block 1601, the method 1600 begins. At block 1610, a determination is made as to whether a new packet has arrived. If a new packet has not arrived, the method 1600 proceeds to block 1630. If a new packet has arrived, the method 1600 proceeds to block 1620. At block 1620, the packet arrival is handled. In one example, the packet arrival may be handled as presented with respect to FIG. 17. From block 1620, the method 1600 proceeds to block 1630. At block 1630, a determination is made as to whether a packet is to be transmitted. If a packet is not to be transmitted, the method 1600 proceeds to block 1650. If a packet is to be transmitted, the method 1600 proceeds to block 1640. At block 1640, the next packet transmission is handled. In one example, the next packet transmission may be handled as presented with respect to FIG. 18. From block 1640, the method 1600 proceeds to block 1650. At block 1650, a determination is made as to whether a new configuration request, requesting reconfiguration of the scheduling hierarchy of the scheduler, is received. The new configuration request for the scheduling hierarchy, when received, may be received via an API. If a new configuration request is not received, the method 1600 returns to block 1610 to continue to execute the method 1600. If a new configuration request is received, the method 1600 proceeds to block 1660. At block 1660, the configuration request is handled. In one example, the new configuration request may be handled as presented with respect to FIG. 19. From block 1660, the method 1600 returns to block 1610 to continue to execute the method 1600.

As indicated above, a scheduler having a scheduling hierarchy may be configured to handle the arrival of a new packet (e.g., as discussed with respect to block 1620 of FIG. 16).

When a new packet arrives, it is first processed by a classifier function that identifies its destination packet queue, which is a leaf in the scheduling hierarchy. Next, the packet is processed by a buffer manager that determines whether the packet should be accepted into the packet queue. The decision depends on the current state of occupancy of the packet queue, on the current state of occupancy of the overall packet buffer from which the scheduler draws packets for transmission, and possibly on the state of occupancy of the portion of the scheduling hierarchy that includes the destination packet queue of the packet. If the packet is accepted into its destination packet queue, the method recursively checks the state of occupancy of the queues in the portion of scheduling hierarchy of the destination packet queue that connects the packet queue to the top of the EBS hierarchy, starting with the destination packet queue. If the first queue checked is empty before the arrival of the new packet, after receiving the new packet it is added to the respective WRR scheduler. If the WRR had previously no busy queues to serve, the state of the corresponding queue in the strict-priority set of the corresponding EBS node is switched to busy. If the EBS node was previously empty, its state is turned to busy and the EBS node is added to the WRR scheduler that serves it in its parent EBS node. The process of setting the busy state for the queues that include the destination packet queue of the packet in their portion of the scheduling hierarchy ends when a non-empty queue (WRR scheduler or EBS Node) is found. In the worst case, the number of status updates needed upon the arrival of a new packet is equal to the depth of the scheduling hierarchy. If the GBS implementation is based on the invention disclosed herein, no state modification is required for any of the queues in the hierarchy with respect to the GBS scheduler.

Figure 17:
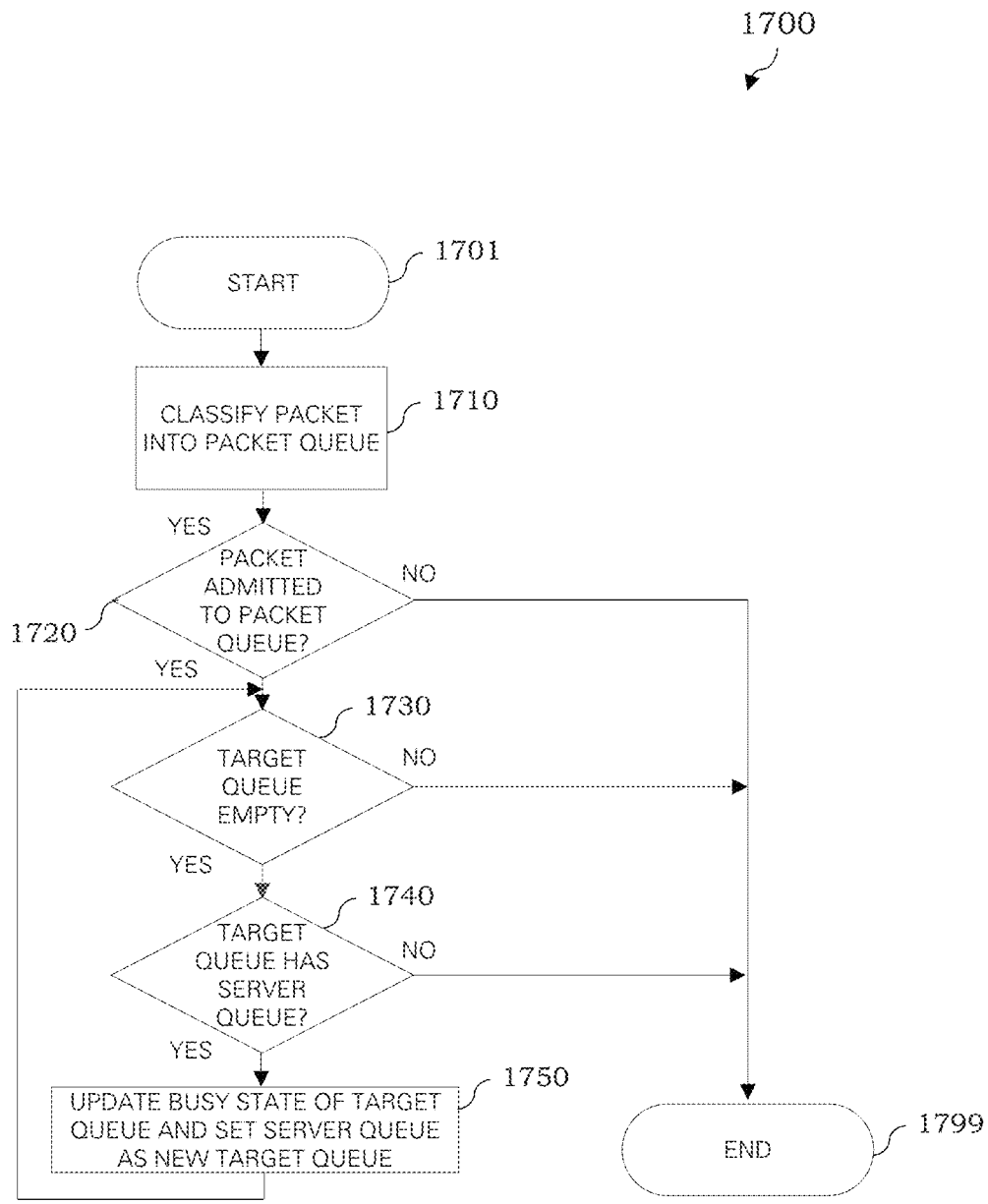
FIG. 17 depicts an example embodiment of a method for use by a scheduler having a scheduling hierarchy to handle the arrival of a new packet.

An example method for handling the arrival of a new packet is presented with respect to FIG. 17.

FIG. 17 depicts an example embodiment of a method for use by a scheduler having a scheduling hierarchy to handle the arrival of a new packet. It is noted that the method 1700 may be used to provide block 1620 of the method 1600 of FIG. 16. It will be appreciated that, although primarily presented as being performed serially, at least a portion of the functions of method 1700 may be performed contemporaneously or in a different order than as presented in FIG. 17. At block 1701, the method 1700 begins. At block 1710, a new packet that arrives is classified into a packet queue. The arriving packet may be classified into a packet queue by a classifier function that identifies the destination packet queue of the arriving packet, which is a leaf in the scheduling hierarchy. At block 1720, a determination is made as to whether the arriving packet is admitted to the packet queue. The determination as to whether the arriving packet is admitted into the packet queue may be performed by a buffer manager. The determination as to whether the arriving packet is admitted into the packet queue may be based on the current state of occupancy of the packet queue, on the current state of occupancy of the overall packet buffer from which the scheduler draws packets for transmission, and possibly on the state of occupancy of the portion of the scheduling hierarchy that includes the destination packet queue of the packet. If the arriving packet is not admitted into the destination packet queue, the method 1700 proceeds to block 1799, where the method 1700 ends. If the arriving packet is admitted into the destination packet queue, the method 1700 recursively executes blocks 1730, 1740, and 1750 to check the state of occupancy of the queues in the portion of scheduling hierarchy of the destination packet queue that connects the packet queue to the top of the EBS hierarchy, starting with the destination packet queue. At block 1730, a determination is made as to whether the target queue is empty. If the target queue is not empty, the method 1700 proceeds to block 1799, where the method 1700 ends. If the target queue is empty, the method 1700 proceeds to block 1740. At block 1740, a determination is made as to whether the target queue has a server queue. If the target queue does not have a server queue, the method 1700 proceeds to block 1799, where the method 1700 ends. If the target queue does have a server queue, the method 1700 proceeds to block 1750. At block 1750, the busy state of the target queue is updated, and the server queue is set as the new target queue. From block 1750, the method 1700 returns to block 1730. At block 1799, the method 1700 ends.

As indicated above, a scheduler having a scheduling hierarchy may be configured to handle a next packet transmission (e.g., as discussed with respect to block 1640 of FIG. 16).

When the transmission of a previously selected packet is completed, the SPS checks if the GBS has a queue available for service. A capability for selection of the next GBS queue to serve is described hereinabove. If the GBS has a packet queue available for service, its head packet is extracted from the packet queue and passed to the transmitter. If the packet queue just selected by the GBS becomes empty after the packet is extracted for transmission, the method checks if the packet queue is currently included in a WRR scheduler. If yes, the packet queue is removed from the WRR scheduler. If the WRR scheduler becomes empty after removal of the packet queue, the state of the queue corresponding to the WRR scheduler in the serving EBS node is switched from busy to empty. If the EBS node becomes empty as a consequence of the packet extraction, the EBS node is removed from the WRR scheduler that serves it. The removal of queues from the respective WRR schedulers continues until a queue is found that does not become empty as a consequence of the packet extraction. In the worst case, the number of queue removal steps required after a GBS selection of the next packet to transmit is equal to the depth of the scheduling hierarchy. If the GBS does not have a packet queue ready for service, it may have an EBS node ready for service. In that case, the sequence of steps to find the next packet to transmit is the same as in the description that follows, with the only difference that the first EBS node checked in the search is most likely not the one at the top of the EBS hierarchy. If the GBS has no queue to serve, neither a packet queue nor an EBS node, the search for the next packet queue to serve starts from the top node in the EBS hierarchy. The first EBS node checked for service searches through its M queues in strict-priority order, looking for the first one that is busy. If such a busy queue is not found, the method returns to the initial state where it waits for the next opportunity to search for a new packet to transmit. Such opportunity can be created by the arrival of a new packet to a packet queue, or by an advance of a time reference in the GBS that triggers a new search for a packet queue to serve in the GBS. If, instead, the root EBS node finds a queue that can be served, the method searches iteratively through the portion of the hierarchy controlled by the busy queue until it finds the packet queue that will provide the packet to be transmitted. In every step of the search, the method finds the next queue to be served by the WRR of the queue found in the EBS node, then serves the head packet of the queue if the queue is a packet queue (leaf of the hierarchy), or searches through the next set of M queues in strict-priority order if the queue is a lower-layer EBS node. In the latter case, the method selects the queue at the head of the WRR, then continues until it finds an actual packet queue. In the worst case, the number of steps needed for EBS identification of the next packet to transmit is equal to the depth of the scheduling hierarchy. After the head packet of the served packet queue is transmitted, the same sequence of iterations is started as in the case of a GBS service to handle the possible depletion of a sequence of EBS queues going upwards through the EBS hierarchy. An example method for handling a next packet transmission is presented with respect to FIG. 18.

FIG. 18 depicts an example embodiment of a method for use by a scheduler having a scheduling hierarchy to handle selection of the next packet to transmit. It is noted that the method 1800 may be used to provide block 1640 of the method 1600 of FIG. 16. It will be appreciated that, although primarily presented as being performed serially, at least a portion of the functions of method 1800 may be performed contemporaneously or in a different order than as presented in FIG. 18. At block 1801, the method 1800 begins. At block 1810, when the transmission of a previously selected packet is completed, the SPS checks if the GBS has a queue available for service. A capability for selection of the next GBS queue to serve is described hereinabove. If the GBS does not have a packet queue available for service, the method 1800 proceeds to block 1820. If the GBS has a packet queue available for service, the method 1800 proceeds to block 1850. At 1820, a determination is made as to whether the top EBS queue is busy. If the top EBS queue is not busy, the method 1800 proceeds to block 1899, where the method 1800 ends. If the top EBS queue is busy, the method 1800 proceeds to block 1830. At block 1830, the first busy EBS queue in the busy queue is picked, and then the method 1800 proceeds to block 1840. At block 1840, a determination is made as to whether the busy EBS queue is a packet queue. If the busy EBS queue is not a packet queue, then the method 1800 returns to block 1830. If the busy EBS queue is a packet queue, then the method 1800 proceeds to block 1860. At block 1850, a determination is made as to whether the busy queue from the GBS is a packet queue. If the busy queue from the GBS is not a packet queue, the method 1800 proceeds to block 1830. If the busy queue from the GBS is a packet queue, the method 1800 proceeds to block 1860. At block 1860, the head packet is transmitted, and the associated queue state is updated, and the method 1800 then proceeds to block 1870. At block 1870, a determination is made as to whether the updated queue is empty and served by the EBS. If the updated queue is not empty and served by the EBS, the method 1800 proceeds to block 1899, where the method 1800 ends. If the updated queue is empty and served by the EBS, the method 1800 proceeds to block 1880. At block 1880, the queue is removed from the EBS linked list. From block 1880, the method 1800 returns to block 1870. At block 1899, the method 1800 ends.

As indicated above, a scheduler having a scheduling hierarchy may be configured to handle a modification request requesting reconfiguration of the scheduling hierarchy of the scheduler (e.g., as discussed with respect to block 1660 of FIG. 16).

The modification request received through the configuration API includes a formal description of the set of packet queues to be added to the scheduling hierarchy and their respective WRR schedulers and EBS nodes. For each packet queue and EBS node it also includes indication of a requested GBS service rate (the service rate value is null if no GBS scheduling is requested). The method validates the GBS service rate requests, ensuring first that they comply with the Scheduling-as-a-Service contract previously agreed with the source of the modification request and second that the new GBS service rates do not overflow the overall service capacity of the GBS. If all GBS validations are successful, the method proceeds with the validation of the EBS modification requests. The EBS validation includes verification that the EBS modification request complies with the Scheduling-as-a-Service contract previously agreed with the source of the modification request and that the scheduling hierarchy currently has packet queues and EBS nodes available at the scheduling hierarchy coordinates (hierarchy layer and service priority) indicated in the modification request. If all EBS validations are successful, the method proceeds with the modification of the GBS service schedule and with the modification of the EBS hierarchy. An example method for handling a request for reconfiguration of the scheduling hierarchy of the scheduler is presented with respect to FIG. 19.

FIG. 19 depicts an example embodiment of a method for use by a scheduler having a scheduling hierarchy to handle a request for reconfiguration of the scheduling hierarchy of the scheduler. It is noted that the method 1900 may be used to provide block 1660 of the method 1600 of FIG. 16. It will be appreciated that, although primarily presented as being performed serially, at least a portion of the functions of method 1900 may be performed contemporaneously or in a different order than as presented in FIG. 19. At block 1901, the method 1900 begins. At block 1910, a determination is made as to whether the request for reconfiguration of the scheduling hierarchy of the scheduler complies with the GBS contract. If the request for reconfiguration of the scheduling hierarchy of the scheduler does not comply with the GBS contract, then the method 1900 proceeds to block 1999 where the method 1900 ends. If the request for reconfiguration of the scheduling hierarchy of the scheduler complies with the GBS contract, then the method 1900 proceeds to block 1920. At block 1920, a determination is made as to whether GBS resources are available. If GBS resources are not available, then the method 1900 proceeds to block 1999 where the method 1900 ends. If GBS resources are available, then the method 1900 proceeds to block 1930. At block 1930, a determination is made as to whether the request for reconfiguration of the scheduling hierarchy of the scheduler complies with the EBS contract. If the request for reconfiguration of the scheduling hierarchy of the scheduler does not comply with the EBS contract, then the method 1900 proceeds to block 1999 where the method 1900 ends. If the request for reconfiguration of the scheduling hierarchy of the scheduler complies with the EBS contract, then the method 1900 proceeds to block 1940. At block 1940, a determination is made as to whether EBS resources are available. If EBS resources are not available, then the method 1900 proceeds to block 1999 where the method 1900 ends. If EBS resources are available, then the method 1900 proceeds to block 1950. At block 1950, the scheduling hierarchy of the scheduler is reconfigured based on the request for reconfiguration of the scheduling hierarchy of the scheduler. From block 1950, the method 1900 proceeds to block 1999, where the method 1900 ends. At block 1999, the method 1900 ends.

Figure 20:
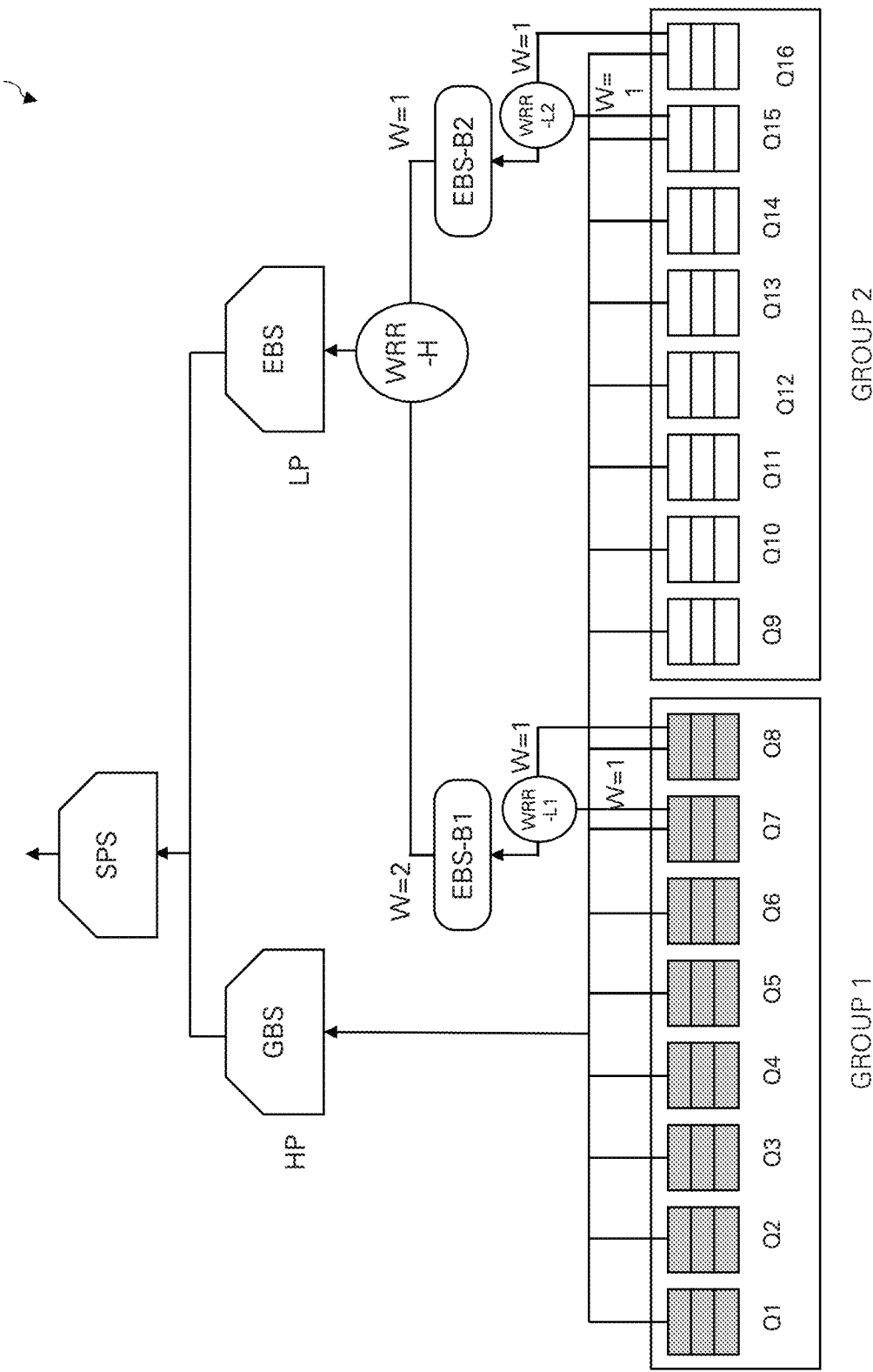
FIG. 20 depicts an example embodiment of a scheduling hierarchy used for a simulation experiment.

FIG. 20 depicts an example embodiment of a scheduling hierarchy used for a simulation experiment. The scheduling hierarchy 2000 is used in an ns-3 simulation experiment. The scheduler serves 16 queues, organized in 8 sets of 2 queues each. Within each set, the two queues receive packets at the same arrival rate and are configured with identical scheduling parameters. The 16 queues are also divided into two groups of 8 queues each (four sets in each group). Within each group, the queues of the first 3 sets (Q1-Q6 in Group 1 and Q9-Q14 in Group 2) are served only by the GBS. The queues of the last set (Q7-Q8 and Q15-Q16) are also served by the EBS. The EBS presents two hierarchical layers. The top EBS node assigns one of its priority levels to a WRR scheduler (WRR-H) that serves two queues (EBS-B1 and EBS-B2). EBS-B1 consists of an EBS node that assigns one of its priority levels to a WRR scheduler (WRR-L1) that serves packet queues Q7 and Q8 of Group 1. Queue EBS-B1 has service weight W=2. Queue EBS-B2 consists of an EBS node that assigns one of its priority levels to a WRR scheduler (WRR-L2) that serves packet queues Q15 and Q16 of Group 2. Queue EBS-B2 has service weight W=1. Within the respective WRR schedulers, the queues Q7-Q8 and Q15-Q16 are served with identical weights (W=1). The configuration of the packet arrival rates and scheduling parameters for the queues of FIG. 20 is presented in Table 3.

TABLE 3

| | Group 1 | | | | Group 2 | | |
|---|---|---|---|---|---|---|---|
| Queue ID | GBS Rate [Mb/s] | EBS Weight | Arrival Rate [Mb/s] | Queue ID | GBS Rate [Mb/s] | EBS Weight | Arrival Rate [Mb/s] |
| 1,2 | 125 | 0 | 187.582 | 9,10 | 125 | 0 | 15.633 |
| 3,4 | 62.5 | 0 | 93.792 | 11,12 | 62.5 | 0 | 93.792 |
| 5,6 | 41.666 | 0 | 62.528 | 13,14 | 41.666 | 0 | 62.528 |
| 7,8 | 20.833 | 1 (2) | 312.64 | 15,16 | 20.833 | 1 (1) | 312.64 |

In Table 3, in the EBS weight columns, the first number is the weight of the packet queues in the WRR scheduler that serves them (WRR-L1 or WRR-L2), while the second number (in parentheses) is the weight of the EBS node (EBS-B1 or EBS-B2) that serves the packet queues, as enforced by scheduler WRR-H of the upper-layer EBS node. During the experiment, the first 6 flows of Group 1 oversubscribe their allocated GBS rates by about 50%. The oversubscription ratio is much higher (1500%) for the flows of the last set in Group 1. Within Group 2, the flows of queues Q11-Q16 oversubscribe their GBS rates by the same ratio as queues Q3-Q8. Instead, queues Q1-Q2 receive traffic at much lower rate (⅛ of the allocated GBS rate).

It will be appreciated that the scenario of FIG. 20 and Table 3 can be associated with a server for real-time video transcoding that processes video streams for two ScaaS subscribers and divides them accordingly into Groups 1 and 2. Within each group, the first three sets of queues are allocated to video streams with fixed guaranteed rate. The last set is for adaptive video streams, for which the encoding rate can be adjusted based on the excess bandwidth currently available along the end-to-end data path. The ScaaS subscriber of Group 1 receives a larger portion of the excess bandwidth in exchange for a higher subscription fee. When video streams with guaranteed rate do not consume their full bandwidth share, they make room available for the distribution of excess bandwidth, to the benefit of the rate-adaptive video streams.

Figure 21:
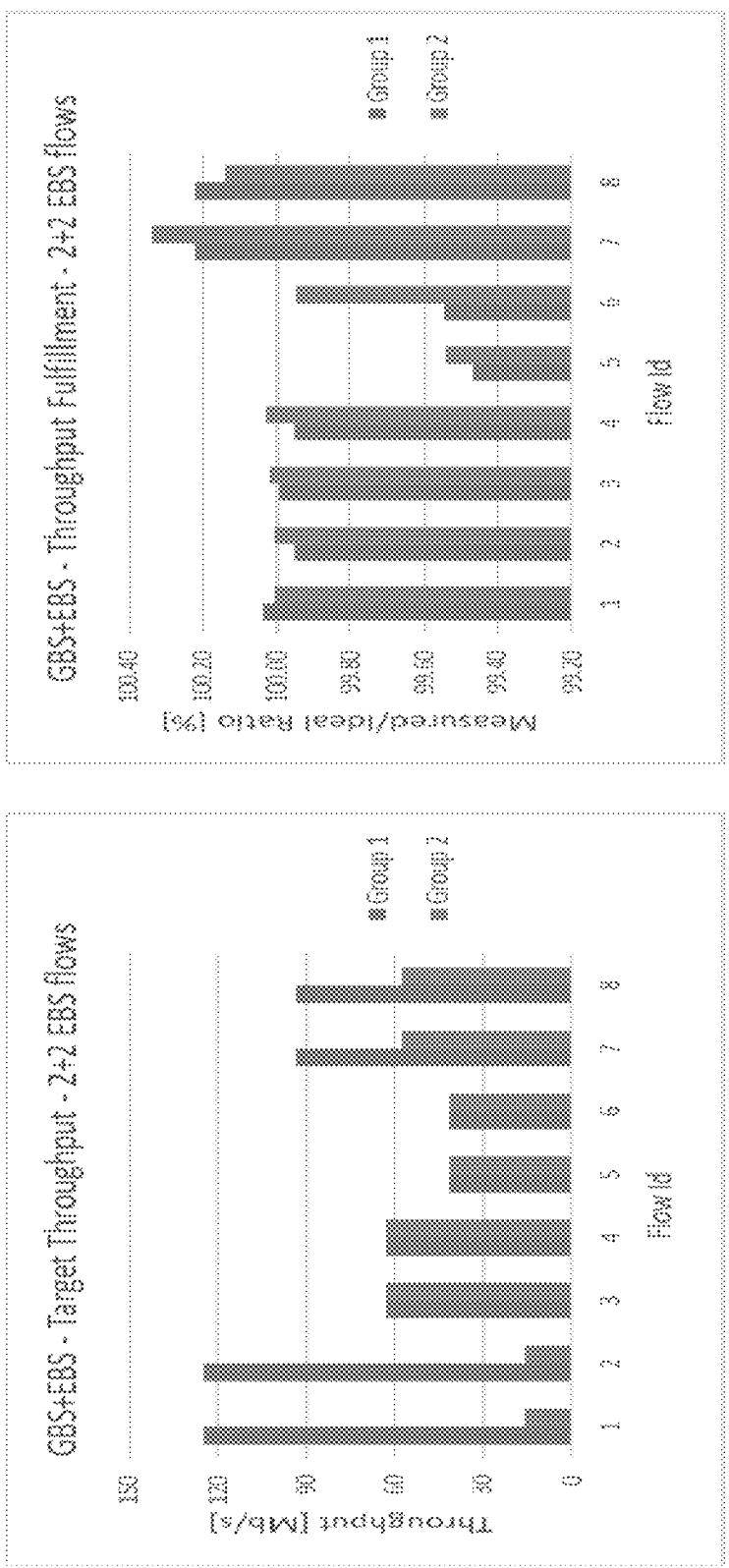
FIG. 21 depicts the absolute throughput measured at the end of the simulation experiment of FIG. 20.

FIG. 21 depicts the absolute throughput measured at the end of the simulation experiment of FIG. 20. More specifically, FIG. 21 depicts the absolute throughput measured at the end of the simulation experiment for the flows of the 16 queues (left-hand plot), and the ratio between the measured throughput and the throughput that is expected based on the flow arrival rates and the overall configuration of the scheduler (right-hand plot). The expected throughput takes into account the bandwidth that the GBS transfers to the EBS and the hierarchical configuration of the EBS. The throughput fulfilment plot of FIG. 21, never lower than 99.45%, testifies to the accuracy of the GBS engine and EBS hierarchy in distributing service per their configuration. Most prominently, the EBS hierarchy manages to distribute excess bandwidth in a way that is independent of the GBS rate configuration. This way of handling the distribution of excess bandwidth is not achievable with a hierarchy of plain WFQ or WF2Q schedulers (the oversubscribed queues Q1-Q6 and Q11-Q14 would grab large shares of the excess bandwidth proportionally to their rate allocations instead of leaving the entire lot available to queues Q7-Q8 and Q15-Q16). The separation between the GBS engine and the EBS hierarchy introduced by example embodiments of the scheduling hierarchy presented herein enables the flexible distribution of excess bandwidth while simplifying the realization of the scheduling hierarchy.

FIG. 22 depicts the throughput measured in a DPDK realization of the simulation experiment of FIG. 20. The plots of FIG. 22 are obtained from the replication of the experiment of FIG. 20, Table 3 on a preliminary DPDK realization of the scheduling hierarchy. While the throughput fulfillment measurements are not as closely tied to the 100% mark as in the simulation plots of FIG. 21, the maximum service lag is still only slightly larger than 2% and the largest excess in received service (about 4%) is only observed for the queues with lowest expected throughput, where the relative impact of a unit excess packet transmission is the highest. The performance of the DPDK implementation is also affected by internal DPDK dynamics that may be investigated and, in at least some cases, mitigated.

Table 4 shows link throughput measurements collected with the queue configuration of FIG. 20 when the link rate and all GBS service rates are scaled up by a factor of 10 (so that the link rate is 10 Gb/s). Every row in Table 4 is associated with a different packet size (since every packet handling operation requires a fixed number of steps, decreasing the packet size increases the load on the CPU that runs the DPDK code). The hierarchical scheduler of FIG. 20 saturates the packet processing capacity (CPU Load at about 100%) at 6.65 Mpkt/s. This is a major improvement over the default configuration of the DPDK scheduler which, in the same traffic scenario, saturates the processing capacity at 3.19 Mpkt/s. Even if still in a preliminary, not fully optimized implementation, the hierarchical scheduler of FIG. 20 more than doubles the processing speed of the default DPDK hierarchy.

TABLE 4

| Pkt Length [bytes] | CPU Load | Pkt Rate [Mpkt/s] | Bit Rate [Gb/s] |
| --- | --- | --- | --- |
| 1500 | 10.8% | 0.80 | 9.80 |
| 800 | 17.4% | 1.46 | 9.68 |
| 400 | 32.1% | 2.75 | 9.46 |
| 200 | 57.4% | 5.02 | 9.24 |
| 160 | 69.7% | 5.83 | 8.86 |
| 120 | 99.7% | 6.65 | 7.98 |

Figure 23:
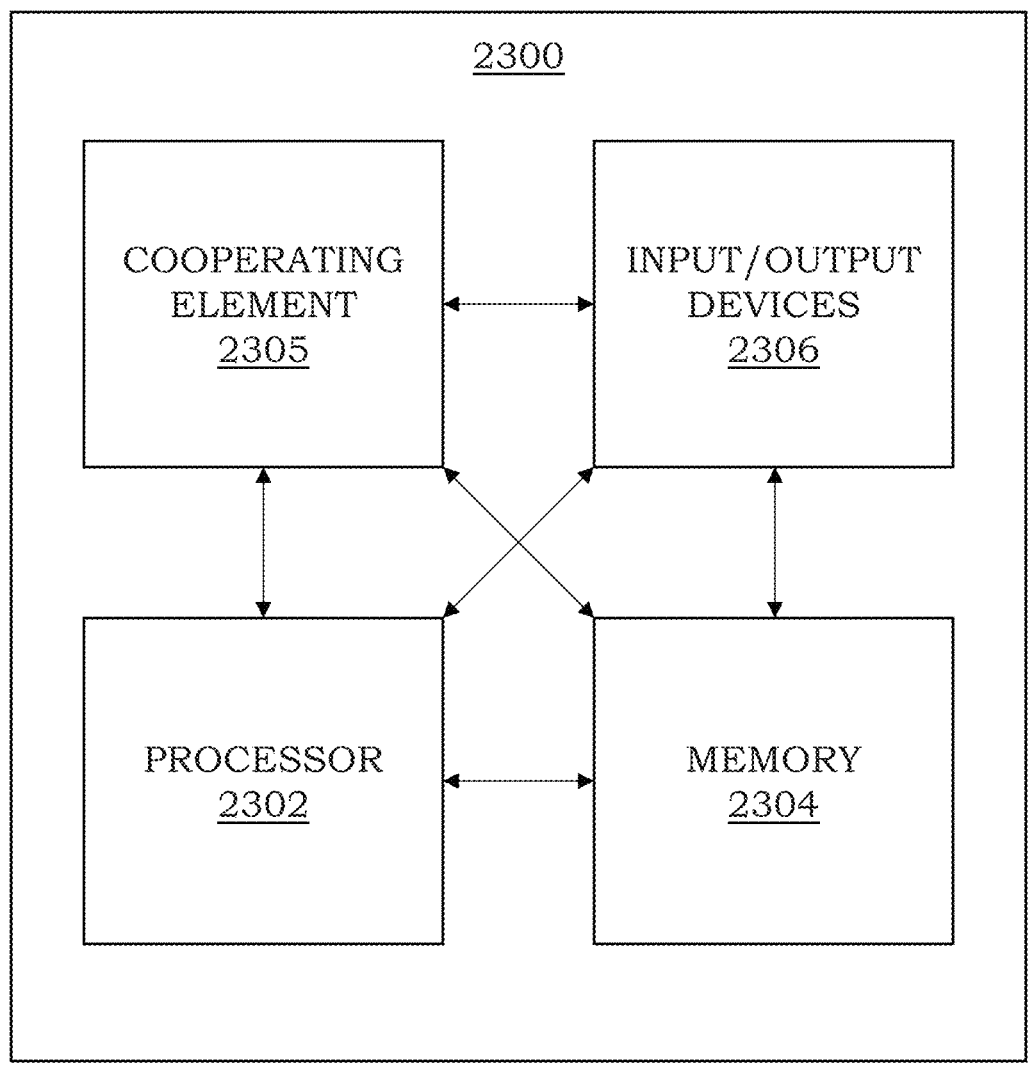
FIG. 23 depicts an example of a computer suitable for use in performing various functions presented herein.

FIG. 23 depicts an example embodiment of a computer suitable for use in performing various functions presented herein.

The computer 2300 includes a processor 2302 (e.g., a central processing unit, a processor, a processor having a set of processor cores, a processor core of a processor, or the like) and a memory 2304 (e.g., a random access memory, a read only memory, or the like). The processor 2302 and the memory 2304 may be communicatively connected. In at least some embodiments, the computer 2300 may include at least one processor and at least one memory including instructions wherein the instructions are configured to, when executed by the at least one processor, cause the apparatus to perform various functions presented herein.

The computer 2300 also may include a cooperating element 2305. The cooperating element 2305 may be a hardware device. The cooperating element 2305 may be a process that can be loaded into the memory 2304 and executed by the processor 2302 to implement various functions presented herein (in which case, for example, the cooperating element 2305 (including associated data structures) can be stored on a non-transitory computer-readable storage medium, such as a storage device or other suitable type of storage element (e.g., a magnetic drive, an optical drive, or the like)).

The computer 2300 also may include one or more input/output devices 2306. The input/output devices 2306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2300 may represent a general architecture and functionality suitable for implementing functional elements described herein, portions of functional elements described herein, or the like, as well as various combinations thereof. For example, computer 2300 may provide a general architecture and functionality that is suitable for implementing one or more elements presented herein, such as a communication device 100 or a portion thereof, a packet classifier 110 or a portion thereof, a queuing element 121 or a portion thereof, a link scheduler 125 or a portion thereof, a timeslot-based transmission element 127 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various example embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including a set of instructions;
   wherein the set of instructions is configured to, when executed by the at least one processor, cause the apparatus to at least:
   support, by a packet scheduler configured to schedule transmission of packets of a set of queuing elements via a link, a periodic service sequence including a set of timeslots, wherein the timeslots are associated with the respective queuing elements, wherein the timeslots have associated therewith respective sets of transmission credits for transmissions from the respective queuing elements during the respective timeslots.

2. The apparatus of claim 1, wherein each of the timeslots has associated therewith a respective queuing element identifier indicative of the one of the queuing elements with which the timeslot is associated and a respective transmission credit counter configured to track the respective set of transmission credits for the respective timeslots.

3. The apparatus of claim 1, wherein the transmission credits associated with the respective timeslots are indicative as to respective amounts of transmission permitted from the respective ones of the queuing elements during the respective timeslots.

4. The apparatus of claim 1, wherein the packet scheduler is configured to, during a first cycle of the periodic service sequence based on a determination that data from a first one of the queuing elements associated with a first one of the timeslots is transmitted during a second one of the timeslots, increase the transmission credits for the second one of the timeslots.

5. The apparatus of claim 4, wherein the packet scheduler is configured to, during a second cycle of the periodic service sequence based on a determination that the set of transmission credits for the first one of the timeslots is zero during the first one of the timeslots, schedule transmission of data from a second one of the queuing elements associated with the second one of the timeslots during the first one of the timeslots.

6. The apparatus of claim 5, wherein the first cycle of the periodic service sequence and the second cycle of the periodic service sequence are adjacent cycles of the period service sequence.

7. The apparatus of claim 5, wherein the first cycle of the periodic service sequence and the second cycle of the periodic service sequence are separated by at least one additional cycle of the periodic service sequence.

8. The apparatus of claim 1, wherein the packet scheduler is configured to, based on a determination that data from a first one of queuing elements associated with a first one of the timeslots is transmitted during a second one of the timeslots, schedule transmission of data from a second one of the queuing elements associated with the second one of the timeslots during the first one of the timeslots.

9. The apparatus of claim 8, wherein the transmission of data from the second one of the queuing elements associated with the second one of the timeslots during the first one of the timeslots is based on an additional transmission credit associated with the second one of the timeslots based on the determination that data from the first one of queuing elements associated with the first one of the timeslots is transmitted during the second one of the timeslots.

10. The apparatus of claim 9, wherein the additional transmission credit associated with the second one of the timeslots is based on a length of time during which the data from the first one of queuing elements associated with the first one of the timeslots is transmitted during the second one of the timeslots.

11. The apparatus of claim 1, wherein the set of instructions is configured to, when executed by the at least one processor, cause the apparatus to at least:
   perform, by the packet scheduler during a first cycle of the periodic service sequence, transmission of data from a first one of the queuing elements associated with a first one of the timeslots using the first one of the timeslots associated with the first one of the queuing elements and at least a portion of a second one of the timeslots associated with a second one of the queuing elements; and
   associate, by the packet scheduler with the second one of the timeslots based on the transmission of the data using the at least a portion of the second one of the timeslots during the first cycle of the periodic service sequence, an additional transmission credit configured to support transmission of data of the second one of the queuing elements using the first one of the timeslots during a second cycle of the periodic service sequence.

12. The apparatus of claim 11, wherein the set of instructions is configured to, when executed by the at least one processor, cause the apparatus to at least:

determine, by the packet scheduler based on the additional transmission credit, scheduling of transmission of at least a portion of at least one packet of the second one of the queuing elements using the first one of the timeslots during the second cycle of the periodic service sequence.

13. The apparatus of claim 1, wherein the timeslots of the periodic service sequence have a fixed duration.

14. The apparatus of claim 1, wherein a number of timeslots in the periodic service sequence is based on a ratio between a link capacity of the link and a minimum throughput guaranteed by the packet scheduler.

15. The apparatus of claim 1, wherein a length of the periodic service sequence is calculated based on running of a Shaped Virtual Clock (Sh-VC) algorithm for a time that is based on a time duration of a period of the periodic service sequence.

16. The apparatus of claim 1, wherein the periodic service sequence is updated based on at least one quality-of-service guarantee associated with a new flow provisioned on the link.

17. The apparatus of claim 1, wherein the set of instructions is configured to, when executed by the at least one processor, cause the apparatus to at least:

identify, by the packet scheduler, a given timeslot in the periodic service sequence that corresponds to a current time;

increase, by the packet scheduler, a credit counter for the given timeslot in the periodic service sequence by an amount based on a time since a previous credit update for the given timeslot in the periodic service sequence;

determine, by the packet scheduler for the given timeslot in the periodic service sequence based on the credit counter for the given timeslot in the periodic service sequence and a credit counter of a previous timeslot in the periodic service sequence, whether the given timeslot in the periodic service sequence is eligible for service; and determine, by the packet scheduler based on a determination that the given timeslot in the periodic service sequence is eligible for service, whether the one of the queuing elements associated with the given timeslot in the periodic service sequence is empty.

18. The apparatus of claim 17, wherein the set of instructions is configured to, when executed by the at least one processor, cause the apparatus to at least:

designate, based on a determination that the given timeslot in the periodic service sequence is not eligible for service or that the one of the queuing elements associated with the given timeslot in the periodic service sequence is empty, the next timeslot adjacent to the given timeslot in the periodic service sequence as the given timeslot.

19. The apparatus of claim 17, wherein the set of instructions is configured to, when executed by the at least one processor, cause the apparatus to at least:

pass, by the packet scheduler to a second packet scheduler based on a determination that the given timeslot in the periodic service sequence is not eligible for service or that the one of the queuing elements associated with the given timeslot in the periodic service sequence is empty, control of a scheduling decision.

20. The apparatus of claim 17, wherein the set of instructions is configured to, when executed by the at least one processor, cause the apparatus to at least:

decrease, by the packet scheduler based on a determination that the one of the queuing elements associated with the given timeslot in the periodic service sequence is not empty, the credit counter for the given timeslot in the periodic service sequence by an amount that depends on the time that it will take to transmit the packet multiplied by the number of timeslots in the periodic service sequence.

21. The apparatus of claim 1, wherein the packet scheduler is a guaranteed bandwidth scheduler configured to cooperate with an excess bandwidth scheduler.

22. The apparatus of claim 1, wherein the set of instructions is configured to, when executed by the at least one processor, cause the apparatus to at least:

pass, by the packet scheduler to a second packet scheduler, control of a scheduling decision.

23. The apparatus of claim 22, wherein the second packet scheduler is a hierarchical packet scheduler.

24. The apparatus of claim 23, wherein the set of instructions is configured to, when executed by the at least one processor, cause the apparatus to at least:

receive, via an application programming interface, an indication of a hierarchical configuration for the second packet scheduler; and configure a scheduling hierarchy of the second packet scheduler based on the indication of the hierarchical configuration for the second packet scheduler.

25. A method, comprising:

supporting, by a packet scheduler configured to schedule transmission of packets of a set of queuing elements via a link, a periodic service sequence including a set of timeslots, wherein the timeslots are associated with the respective queuing elements, wherein the timeslots have associated therewith a respective set of transmission credit counters configured to track transmission credits for the respective timeslots.

26. An apparatus, comprising:

at least one processor; and at least one memory including a set of instructions;

wherein the set of instructions is configured to, when executed by the at least one processor, cause the apparatus to at least:

support, by a packet scheduler configured to schedule transmission of packets from a set of queuing elements via a link, a periodic service sequence including a set of timeslots associated with the set of queuing elements, wherein the set of queuing elements includes a first queuing element and a second queuing element, wherein the set of timeslots includes a first timeslot associated with the first queuing element and a second timeslot associated with the second queuing element;

determine, by the packet scheduler for a first cycle of the periodic service sequence, that transmission of data from the first queuing element during the first cycle of the periodic service sequence uses at least a portion of the first timeslot during the first cycle of the periodic service sequence and at least a portion of the second timeslot during the first cycle of the periodic service sequence; and associate, by the packet scheduler with the second timeslot based on the transmission of the data using the at least a portion of the second timeslot during the first cycle of the periodic service sequence, a transmission credit configured to support transmission of at least one packet of the second queuing element using the first timeslot during a second cycle of the periodic service sequence.

* * * * *